(12) United States Patent
Lee

(10) Patent No.: US 10,604,255 B2
(45) Date of Patent: Mar. 31, 2020

(54) LIFTING SYSTEM MACHINE WITH METHODS FOR CIRCULATING WORKING FLUID

(71) Applicant: Dennis S. Lee, Gaithersburg, MD (US)

(72) Inventor: Dennis S. Lee, Gaithersburg, MD (US)

(73) Assignee: Dennis S. Lee, Gaithersburg, MD (US)

( * ) Notice: Subject to any disclaimer, the term of this patent is extended or adjusted under 35 U.S.C. 154(b) by 267 days.

(21) Appl. No.: 15/613,189

(22) Filed: Jun. 3, 2017

(65) Prior Publication Data

US 2018/0347508 A1 Dec. 6, 2018

(51) Int. Cl.
| | |
|---|---|
| B64C 39/06 | (2006.01) |
| B64D 27/16 | (2006.01) |
| F02K 3/12 | (2006.01) |
| F02C 6/08 | (2006.01) |
| F02K 99/00 | (2009.01) |
| F02C 9/18 | (2006.01) |
| F01D 15/02 | (2006.01) |

(52) U.S. Cl.
CPC ............ B64C 39/064 (2013.01); B64D 27/16 (2013.01); F01D 15/02 (2013.01); F02C 6/08 (2013.01); F02C 9/18 (2013.01); F02K 3/12 (2013.01); F02K 99/00 (2013.01); *F05D 2220/90* (2013.01)

(58) Field of Classification Search
CPC ....... B64C 39/00; B64C 39/001; B64C 39/06; B64C 39/062; B64C 39/064
See application file for complete search history.

(56) References Cited

U.S. PATENT DOCUMENTS

| | | | | |
|---|---|---|---|---|
| 3,051,415 A | * | 8/1962 | Meadows | ............. B64C 39/001 244/23 C |
| 3,051,417 A | * | 8/1962 | Meadows | ............. B64C 39/001 244/23 C |
| 3,752,419 A | * | 8/1973 | Richter | ................. B64C 39/001 244/23 C |
| 4,197,869 A | | 4/1980 | Moncrieff-Yeates | |
| 4,519,562 A | * | 5/1985 | Willis | ..................... B64C 29/00 244/12.2 |
| 5,111,757 A | | 5/1992 | Reindl et al. | |
| 5,666,012 A | | 9/1997 | Gongwer | |
| 6,351,937 B1 | | 3/2002 | Matsuda et al. | |
| 6,412,232 B1 | | 7/2002 | Provitola | |
| 6,464,459 B2 | | 10/2002 | Illingworth | |

(Continued)

OTHER PUBLICATIONS

John D. Anderson, Fundamentals of Aerodynamics, Fifth Edition, McGraw-Hill, Inc., 2010, Chapters 2, 3, 7, 10 and 15.

(Continued)

*Primary Examiner* — Joseph W Sanderson
(74) *Attorney, Agent, or Firm* — James R. McDaniel

(57) ABSTRACT

An apparatus configured with two subsystems comprising a torus tube, linear flow, and turboplant assemblies that form of cavity for externally supplied and rotating subsonic working fluid. The working fluid rotation is provided by turboplant assemblies with throttle control. The rotating working fluid inside the cavities will conserve angular momentum. As a result of the conservation of angular momentum, poinsot flow fields are seen within the working fluid. A stable, resultant force is generated from the pressure and area forces inside the cavity. The apparatus usage is either with manual operation or as an unmanned, autonomous vehicle.

19 Claims, 20 Drawing Sheets

(56) References Cited

U.S. PATENT DOCUMENTS

| | | | |
|---|---|---|---|
| 6,544,347 | B2 | 4/2003 | Lucey, Jr. et al. |
| 6,616,094 | B2 | 9/2003 | Illingworth |
| 7,726,116 | B2 | 6/2010 | Kemper et al. |
| 8,276,391 | B2 | 10/2012 | Berry et al. |
| 8,640,464 | B2 | 2/2014 | Condevaux et al. |
| 8,855,839 | B2 | 10/2014 | Frazier et al. |
| 8,857,191 | B2 | 10/2014 | Hyde et al. |
| 8,960,592 | B1 | 2/2015 | Windisch |
| 8,967,326 | B2 | 3/2015 | Schlosser |
| 8,967,951 | B2 | 3/2015 | Klingler |
| 9,026,274 | B2 | 5/2015 | Hartman et al. |
| 9,045,227 | B1* | 6/2015 | Gramling ............... B64C 39/064 |
| 2004/0164203 | A1* | 8/2004 | Billiu ................... B64C 29/005 |
| | | | 244/35 R |
| 2013/0181095 | A1* | 7/2013 | Akhmejanov .......... B64C 39/00 |
| | | | 244/23 C |

OTHER PUBLICATIONS

Gordon C, Oates, Aerothermodynamics of Gas Turbine and Rocket Propulsion, J.S. Przemieniecki (Editor-In-Chief), Third Edition, 1997, Chapters 2, 5, 6 and 10.

Marshall H. Kaplan, Modern Spacecraft Dynamics & Control, John Wiley & Sons, Inc., 1976, Chapter 2.

Peter W. Likins, "Effects of Energy Dissipation on the Free Body Motion of Spacecraft," JPL Technical Report No. 32-860, Jul. 1, 1966, Appendix A, B, and C.

T. Miloh, "The Virtual Mass of a Closed Torus in Axisymmetric Motion," Journal of Engineering Mathematics, vol. 13, No. 1 (1979), 1-6.

* cited by examiner

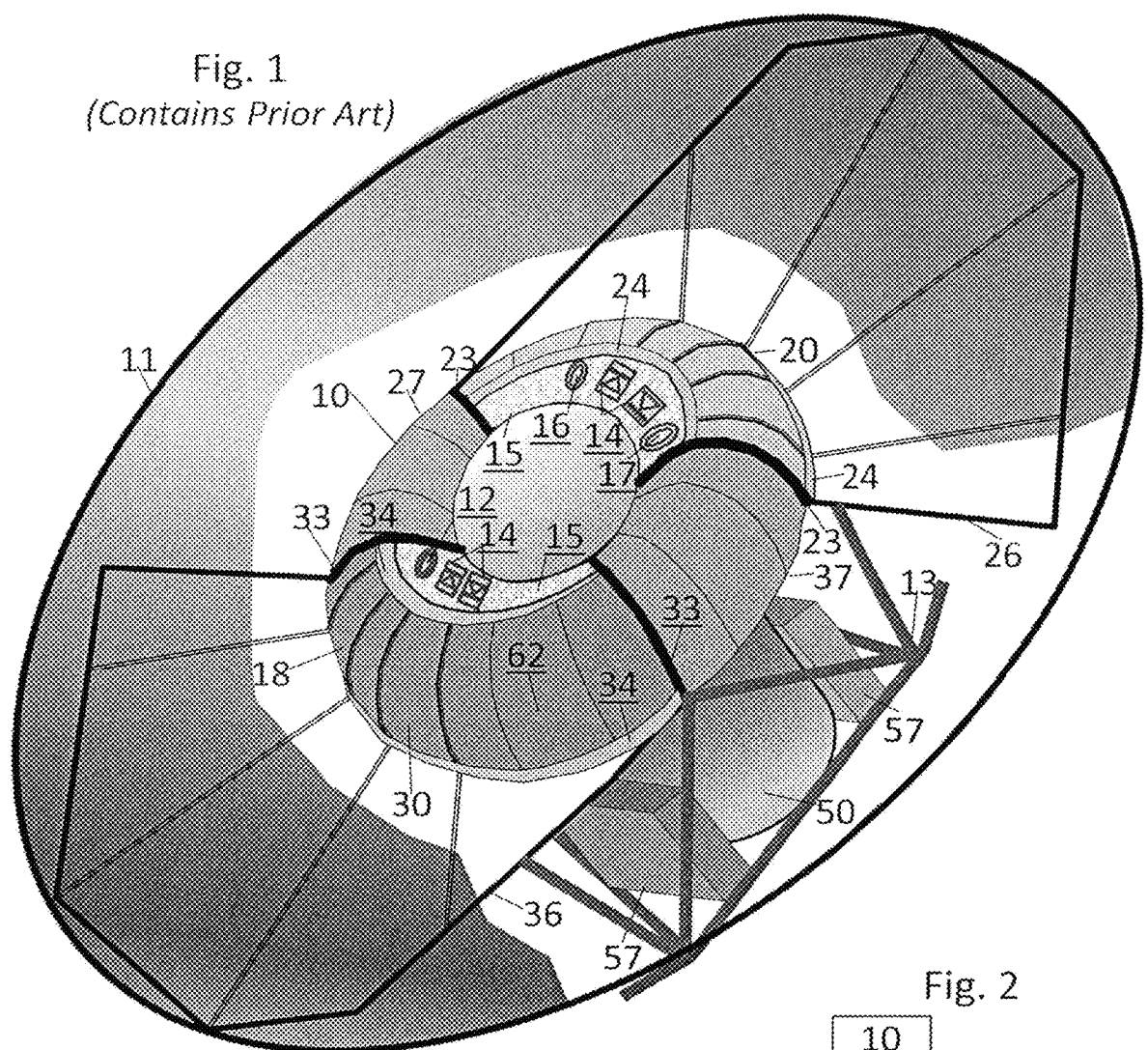
Fig. 1
(Contains Prior Art)
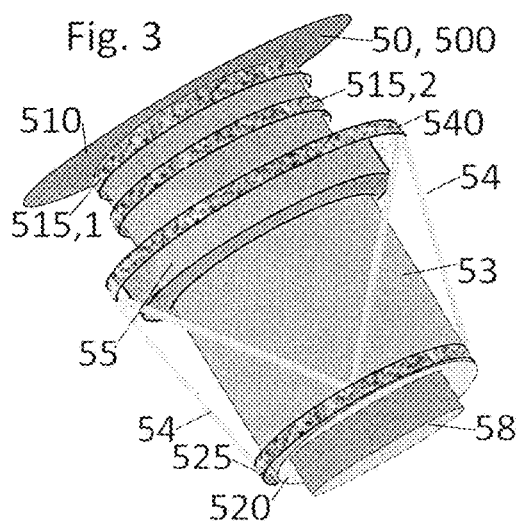
Fig. 3
Fig. 2

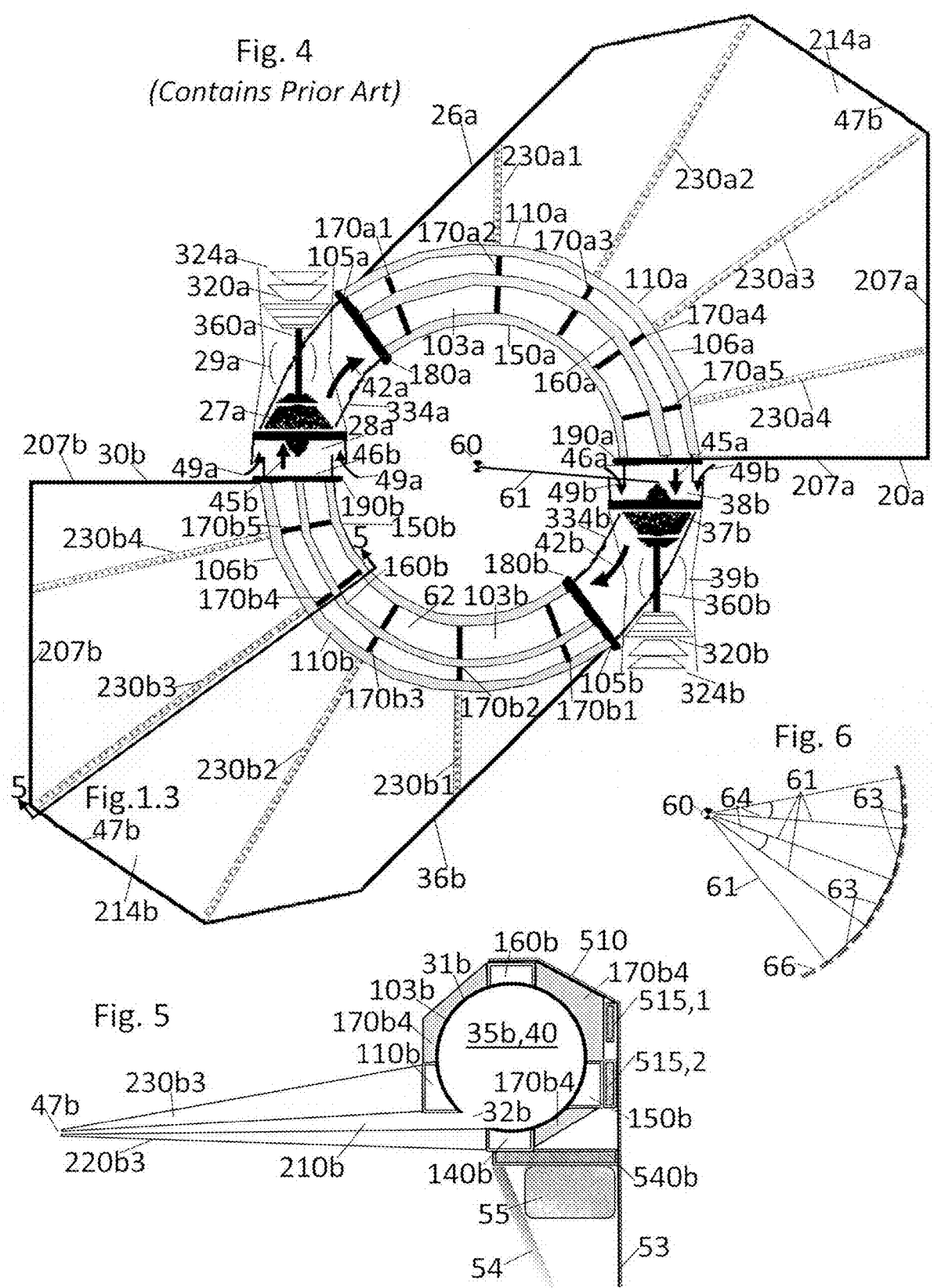

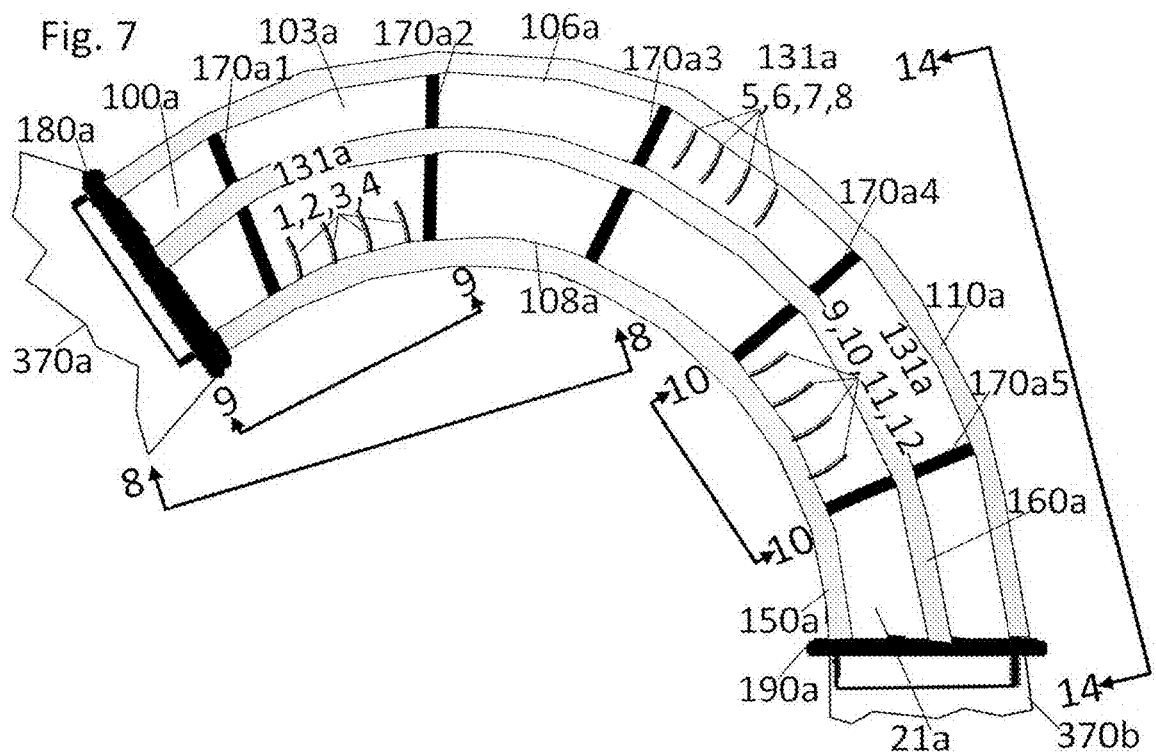
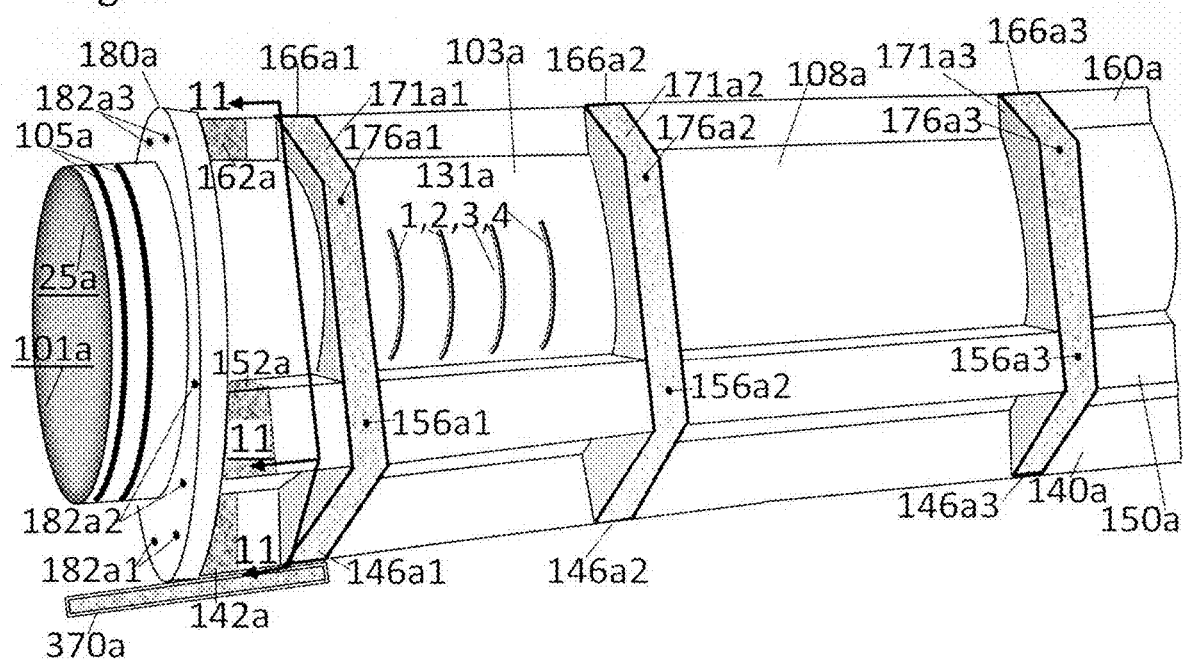

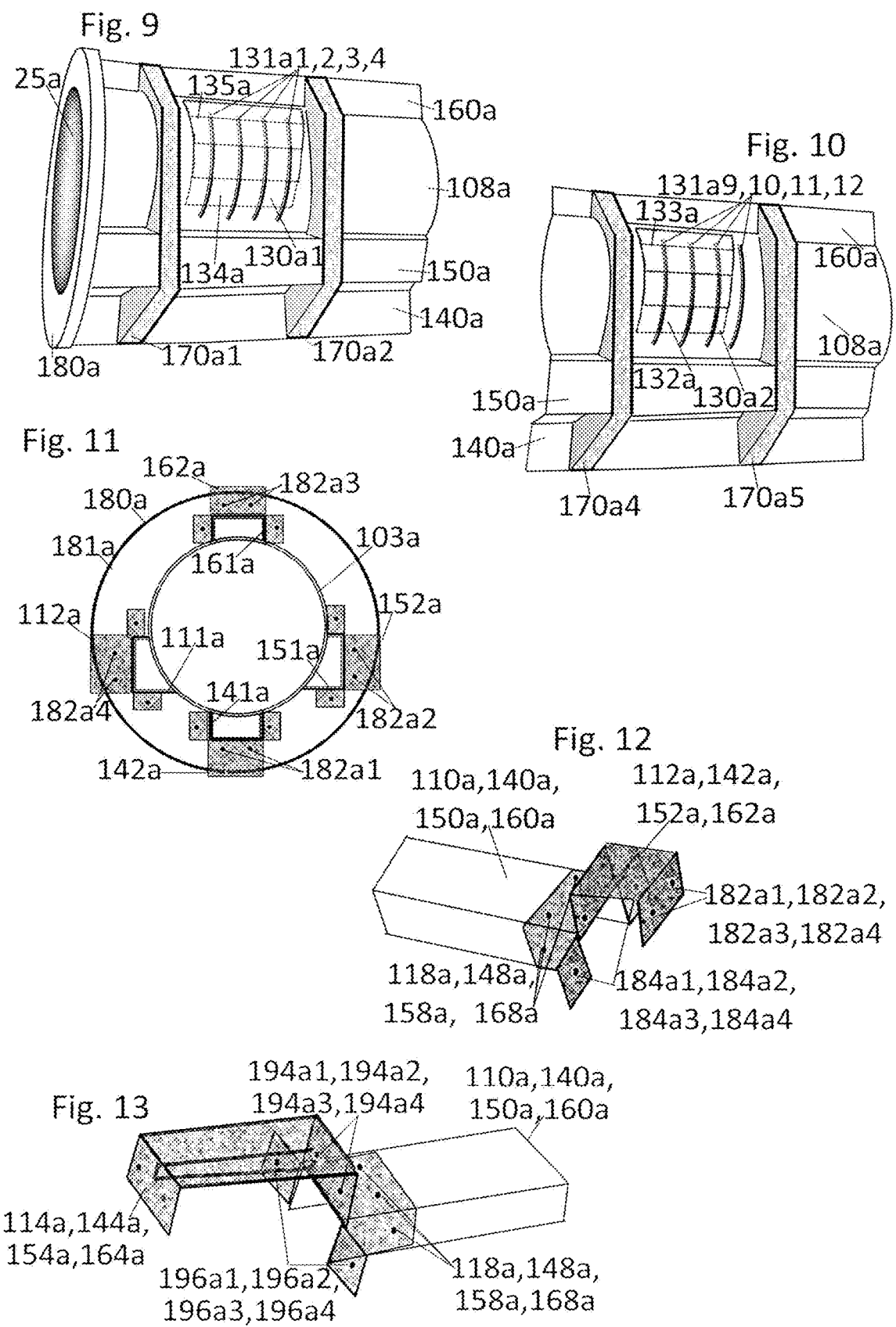

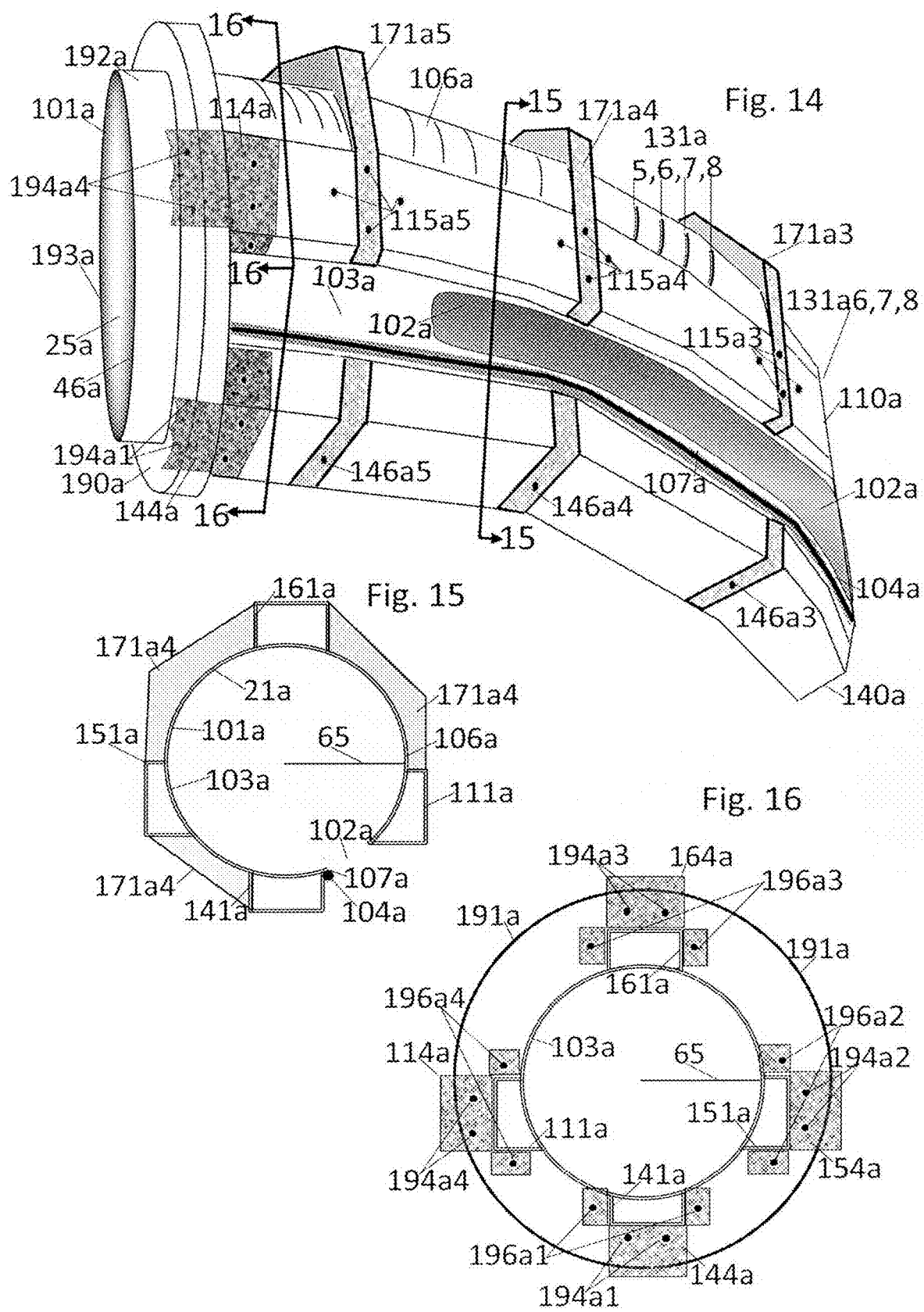

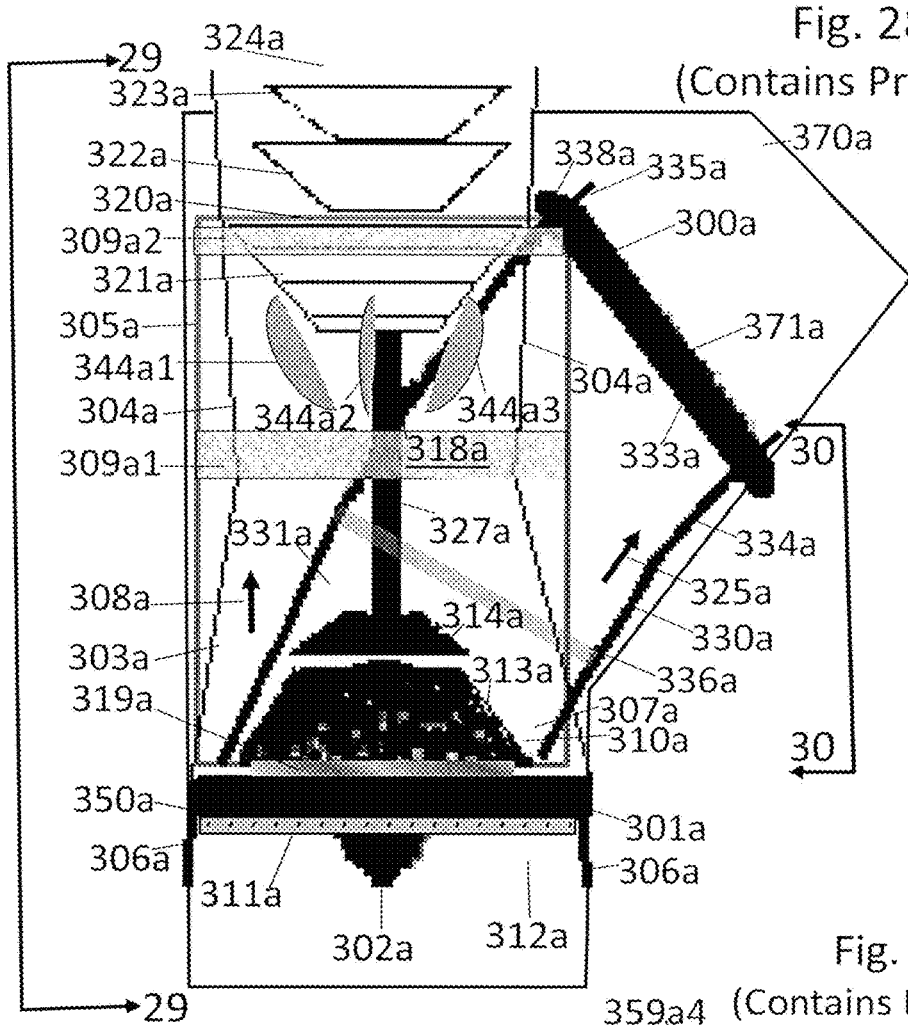
Fig. 28 (Contains Prior Art)
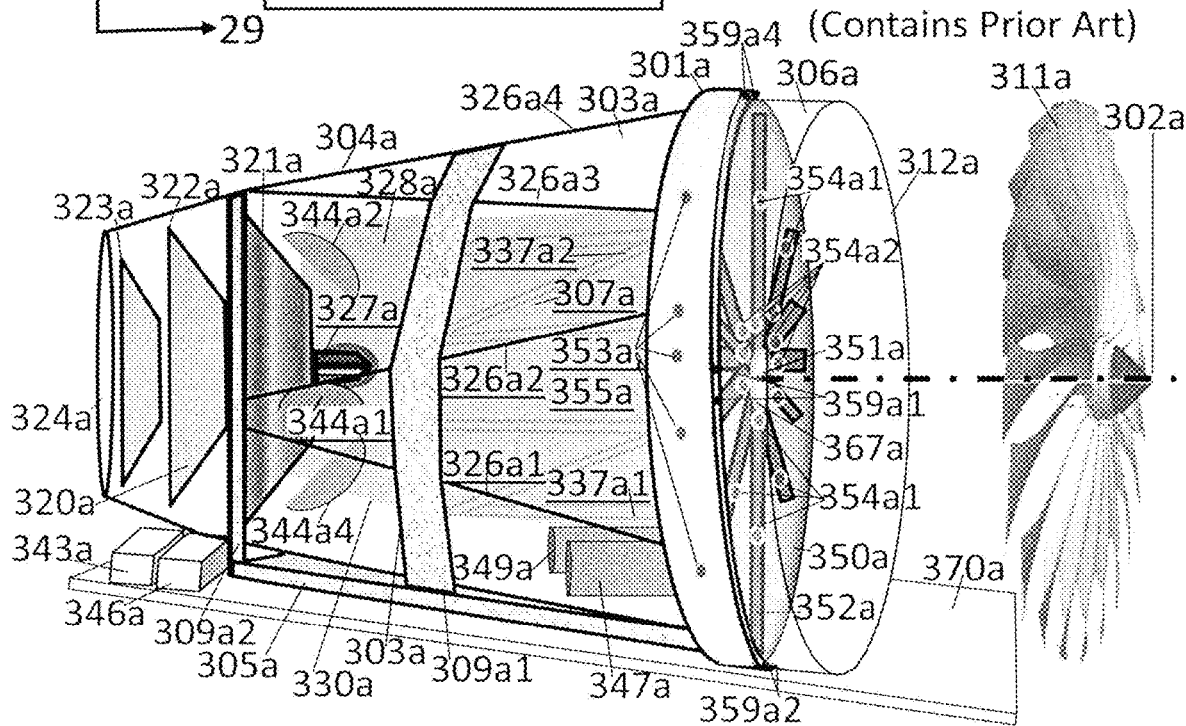
Fig. 29 (Contains Prior Art)

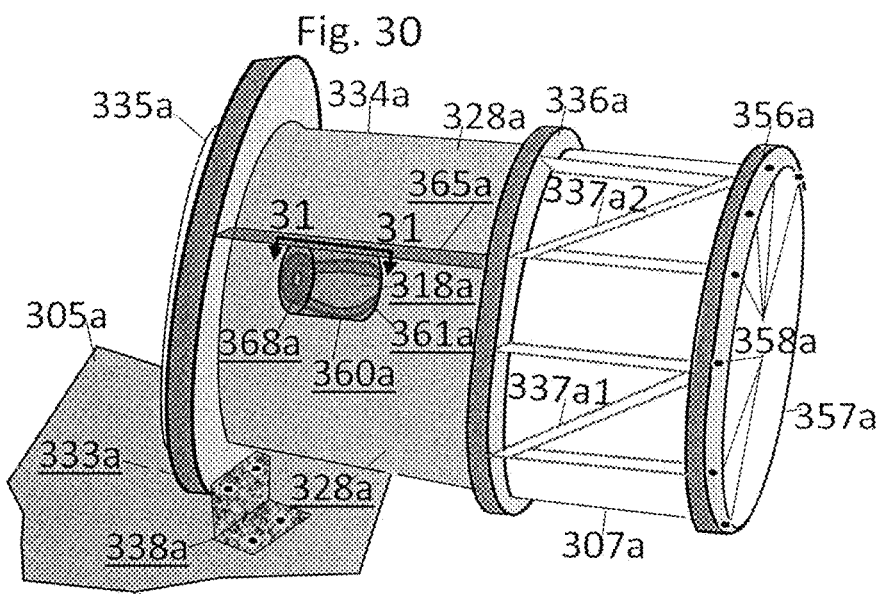
Fig. 30
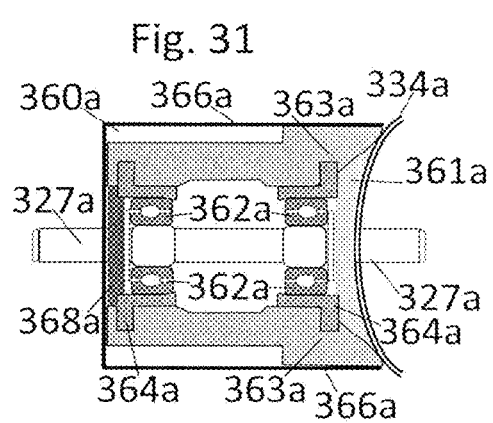
Fig. 31
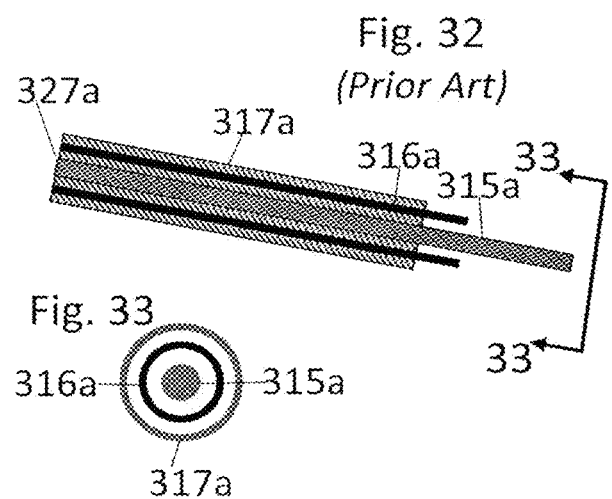
Fig. 32 (Prior Art)
Fig. 33
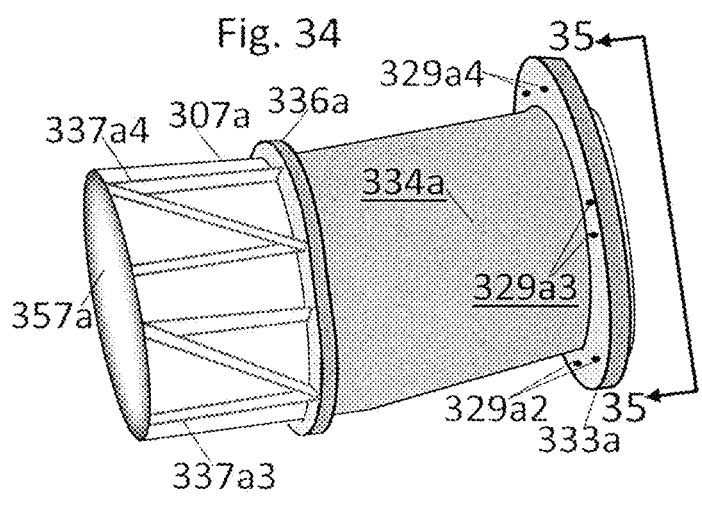
Fig. 34
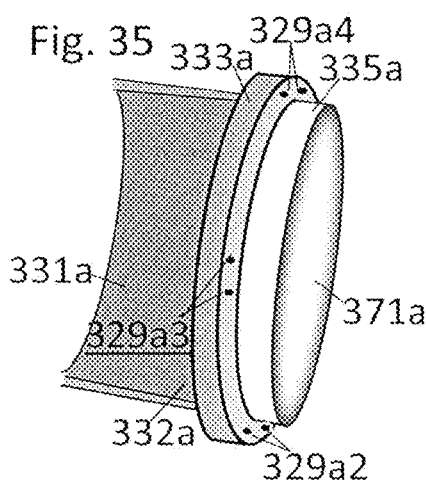
Fig. 35

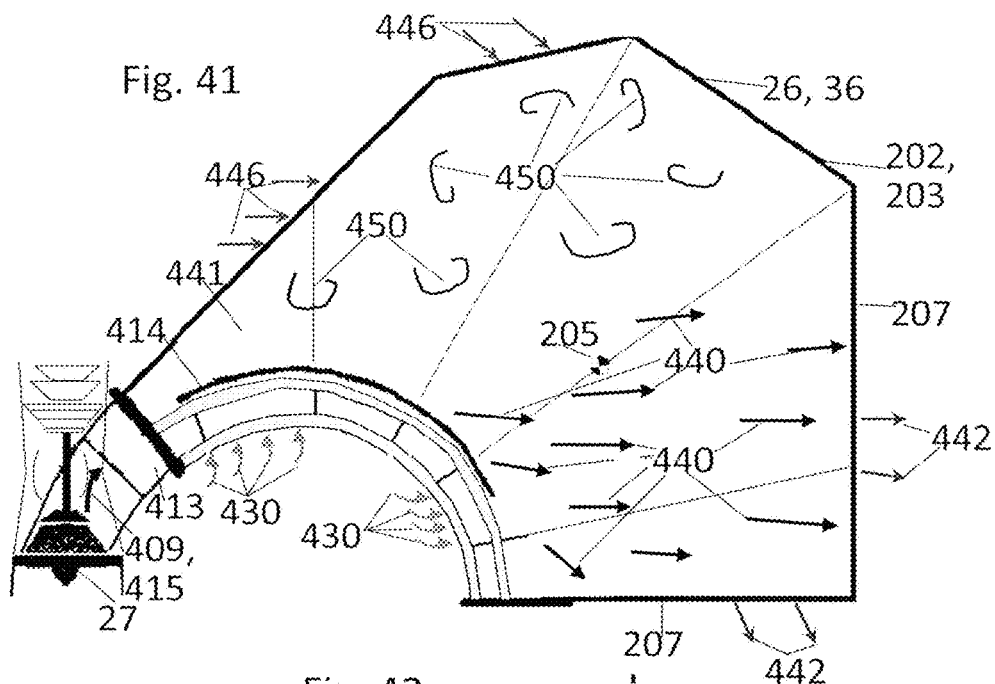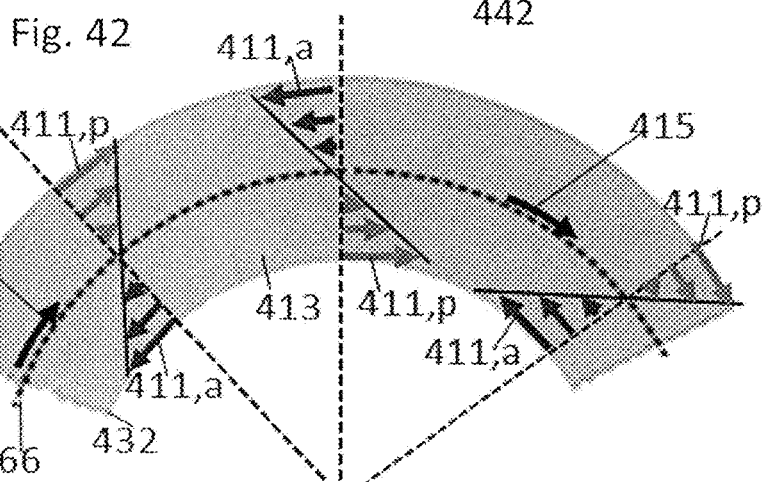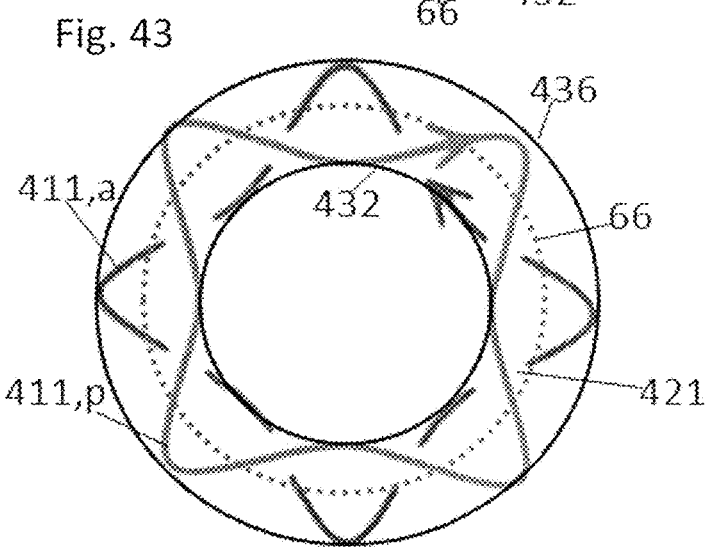

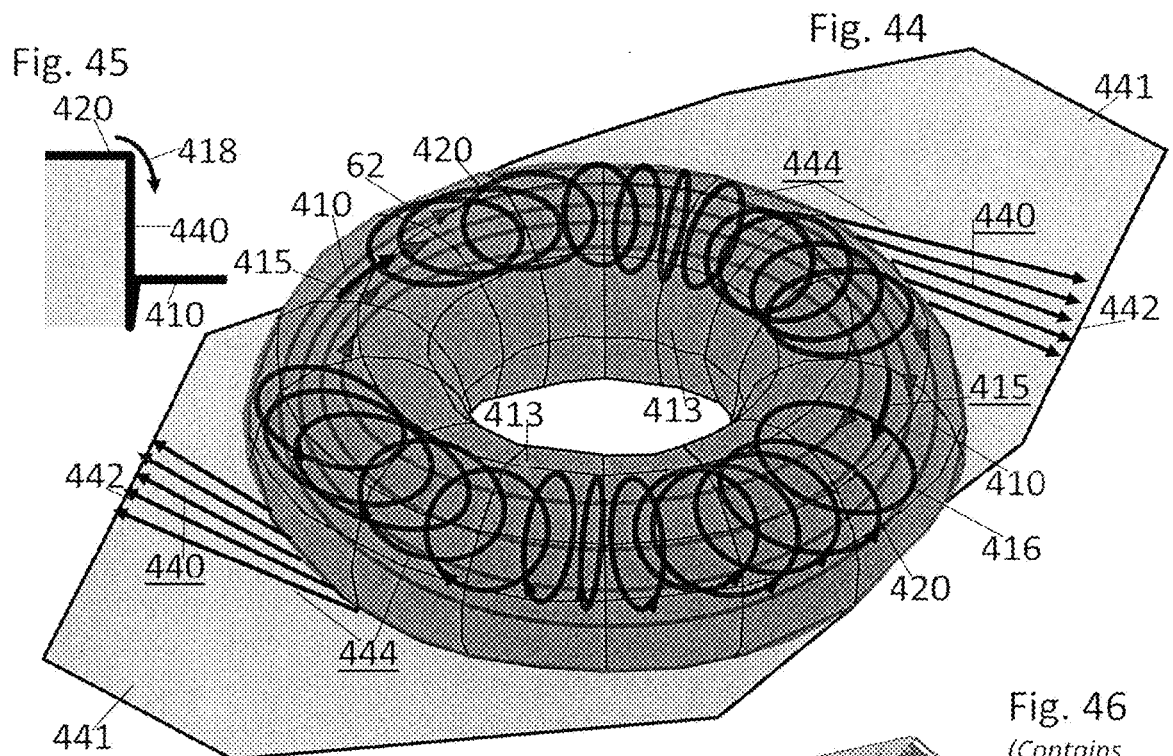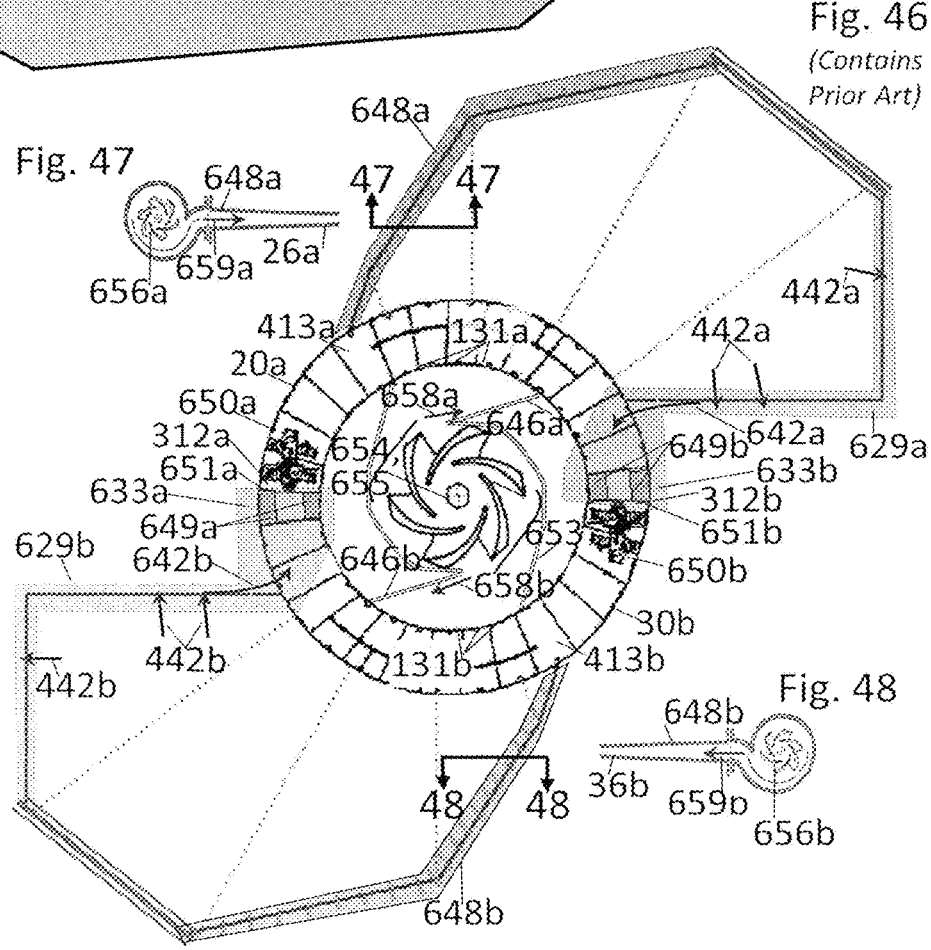

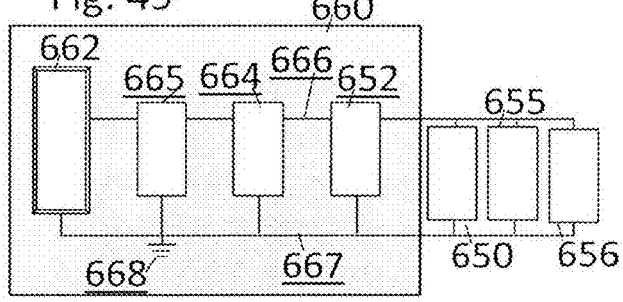
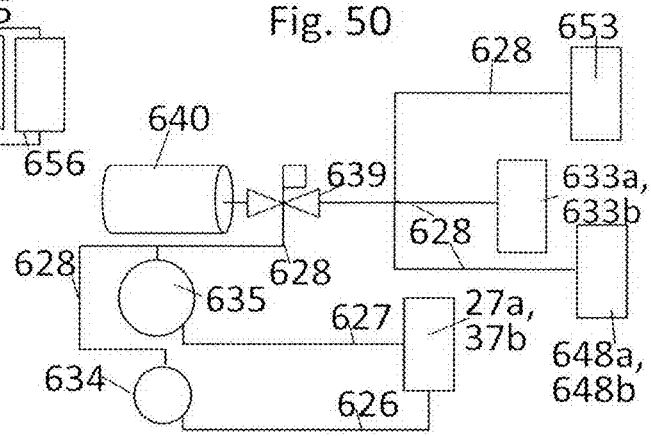
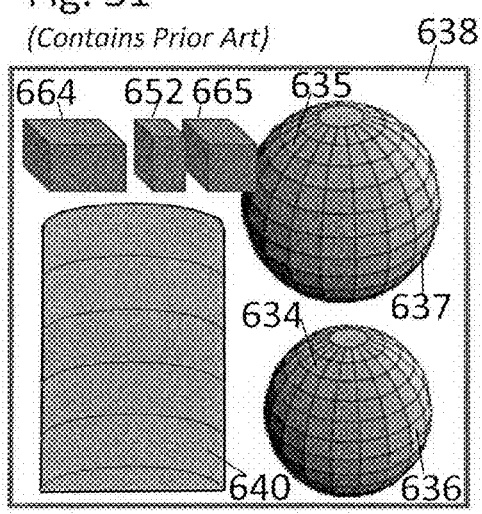
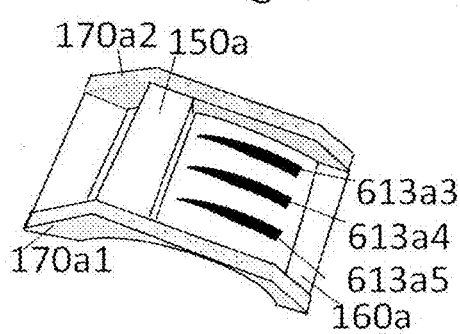
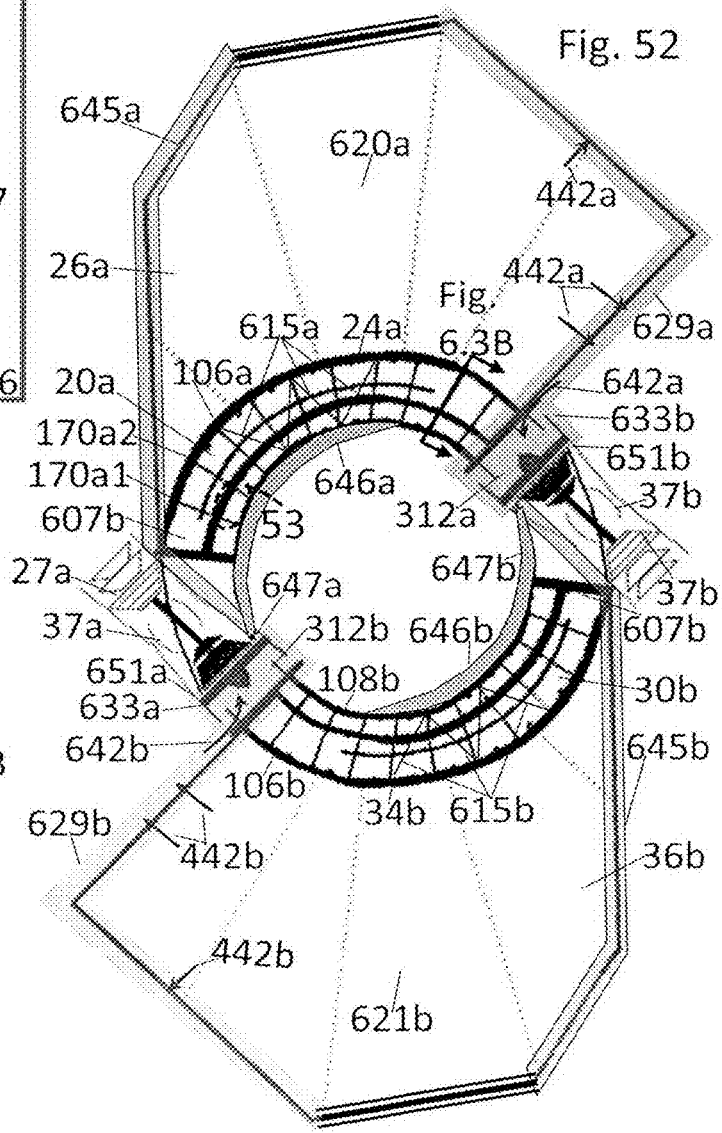

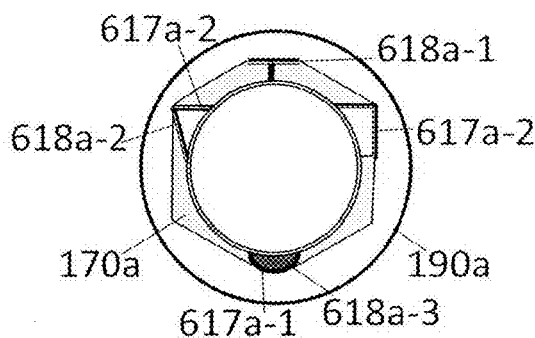
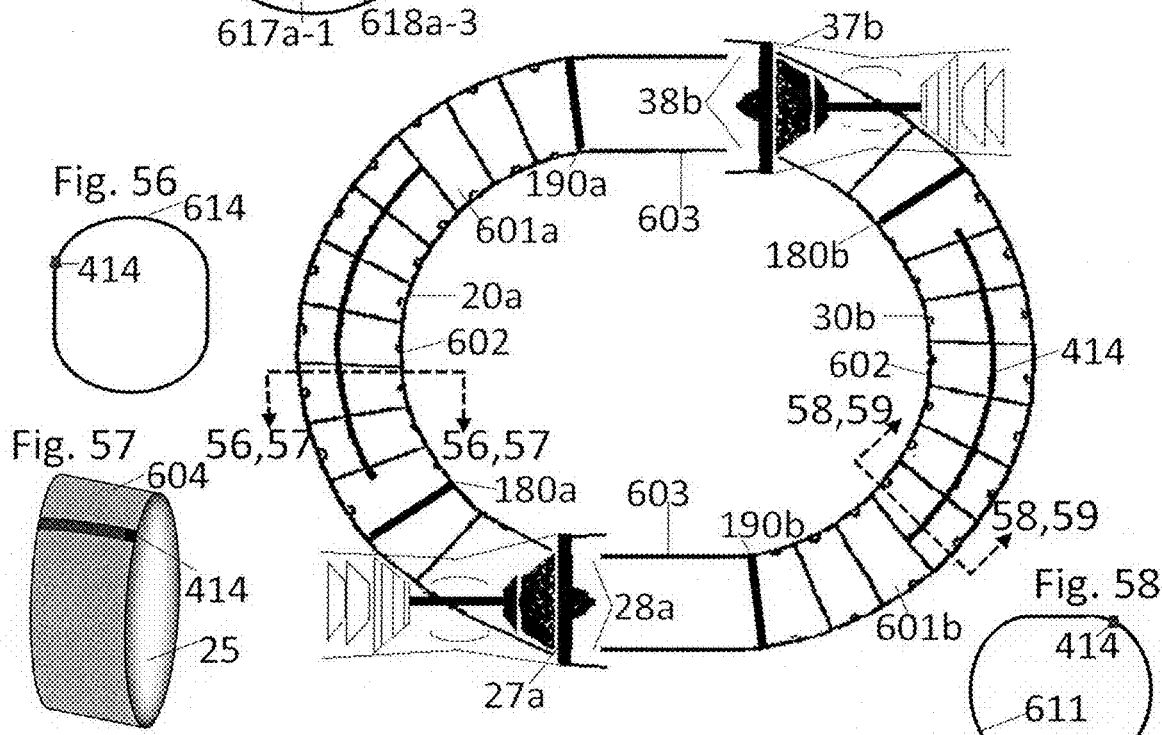
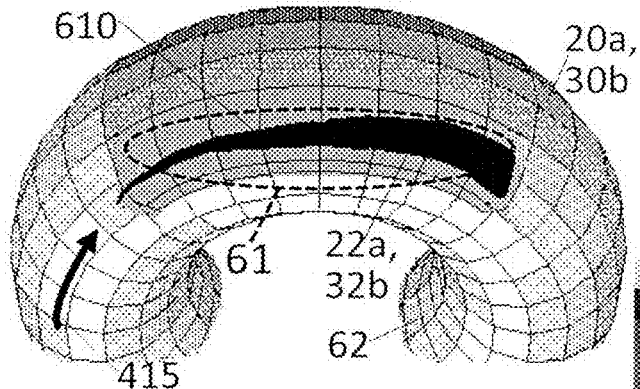
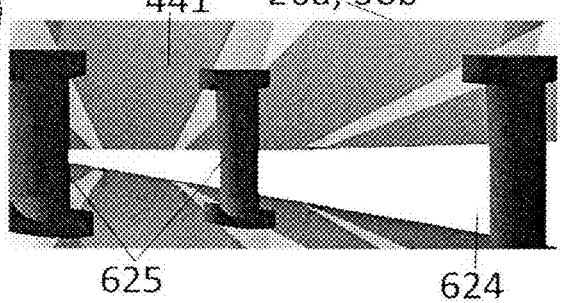

LIFTING SYSTEM MACHINE WITH
METHODS FOR CIRCULATING WORKING
FLUID

TECHNICAL FIELD

This patent application is a machine apparatus for lifting useful payloads. Applications for useful payloads include personal vehicles, unmanned aerial and orbital vehicles. The vehicles are capable of providing functions for, but not limited to, medical ambulance and emergency evacuation, civil police and fire activities, including search and rescue missions.

This patent application details a lifting system that creates force by circulating air as a working fluid at large angular rates. The circulating working fluid is contained in a curve form toroid structure. The circulating working fluid motion creates a single vortex flow. The machine's FIRST EMBODIMENT is completely or partially sustained in atmospheric air. Additional novel art is identified in ALTERNATIVE EMBODIMENT sections.

BACKGROUND

Discussion of Prior Art

The background of this problem includes a vertical lifting vehicle using turboplant technologies and performance and is based on concepts in turboplant engineering, angular momentum mechanics, and rotational energy kinematics. Turboplants have the advantage of providing a large amount of thrust performance in a small volume. Fixed wing aerovehicles must have forward motion through air for the wings to generate lifting force. Aircraft flight operations need long runways for take-off and landings. Rotary winged aircraft (i.e. helicopters) operations are hazardous in close proximity to buildings and fixed obstacles. Rocket engine using turboplants are efficient in delivering performance over a relatively short period of time. Additionally, rocket lifting performance is at the expense of fuel efficiency and overall operating economy, since rocket propellant and fuel are used as the working fluid.

The following referenced prior art citations are noted and presently may appear relevant:

| Pat. | Kind Code | Patentee | Issue Date |
| --- | --- | --- | --- |
| 6,412,232 | B1 | Provitola | Jul. 2, 2002 |
| 6,544,347 | B1 | Lucey, Jr., et al. | Apr. 8, 2003 |
| 5,111,757 | B1 | Reindl, et al. | May 12, 1992 |
| 4,197,869 | B1 | Moncrieff-Yeates | Apr. 15, 1980 |
| 6,464,459 | B1 | Illingworth | Oct. 15, 2002 |
| 6,616,094 | B1 | Illingworth | Sep. 9, 2003 |
| 7,726,116 | B1 | Kemper, et al. | Jun. 1, 2010 |
| 8,857,191 | B1 | Hyde, et al. | Oct. 14, 2014 |
| 8,967,951 | B1 | Klingler | Mar. 3, 2015 |
| 6,351,937 | B1 | Matsuda, et al. | Mar. 5, 2002 |
| 8,640,464 | B1 | Condevaux, et al. | Feb. 4, 2014 |
| 8,276,391 | B1 | Berry, et al. | Oct. 2, 2012 |
| 8,855,839 | B1 | Frazier, et al. | Oct. 7, 2014 |
| 5,666,012 | B1 | Gongwer | Jul. 29, 1994 |
| 8,967,326 | B1 | Schlosser | Mar. 3, 2015 |
| 8,960,592 | B1 | Windisch | Feb. 24, 2015 |
| 9,026,274 | B1 | Hartman, et al. | May 5, 2015 |

Several disadvantages are evident in the noted prior art, which address toroidal forms and vortex structures. In U.S. Pat. No. 6,412,232 to Provitola (Jul. 2, 2002), the prior art does not detail force loads for toroidal elements with structural elements other than toroidal element interlinking. This prior art focuses narrowly on an application of static or quasi-static structure loading. The patent directly identifies static structural frameworks of solid toroidal elements, but does not specifically address any applications other than homogenous toroidal structure. Further in U.S. Pat. No. 6,412,232, the toroidal structure elements are not augmented by other non-toroidal structural members. In U.S. Pat. No. 6,544,347 to Lucey, Jr., et al. (Apr. 8, 2003), the patent addresses only methods of vortex rings without reference to external, non-uniform forces. In U.S. Pat. No. 6,544,347 to Lucey, Jr., et al, applications are limited specifically to vortex generation upon external platen surfaces. U.S. Pat. No. 5,111,757 to Reindl, et al. (May 12, 1992), provides a stable vortical motion defined in a dynamically rotating cylindrical containment vessel. U.S. Pat. No. 5,111,757 shows a superposed ring vortical and line vortex flows containment vessel for limited applications of fluid particle separation. U.S. Pat. No. 4,197,869 to Moncrieff-Yeates (Apr. 15, 1980) produces vortical fluid flow patterns that remain stable and persistent throughout varying conditions. The applications are limited to only flow controllers and heat exchangers, which is a disadvantage of U.S. Pat. No. 4,197,869.

In U.S. Pat. No. 6,464,459 to Illingworth (Oct. 15, 2002) provides various propulsive propeller driven devices, momentum exchange apparatus, and methods for lifting platforms. This patent does not fully utilize fluid flow pressure driven lift forces, and fluid flow stability of external toroidal vortex is not fully explained or detailed. The U.S. Pat. No. 6,616,094 to Illingworth (Sep. 9, 2003) is essentially the same as U.S. Pat. No. 6,464,459 with added methods claim.

Patents dealing with turboplants are commonplace in aerospace applications. Turboplants are used in jet airliners, helicopters, watercraft, and power generating devices. The majority of patent searches result in prior art with turboplant assemblies. In U.S. Pat. No. 7,726,116 to Kemper, et al. (Jun. 1, 2010), prior art relates to methods for airflow through a fan duct area with hinged flaps. U.S. Pat. No. 7,726,116 has a downside, with regards to a hinged flap failure causing serious damage inside turbojet cavity. Several prior art citations are applicable only to turbine or compressor assemblies. These citations include U.S. Pat. No. 8,857,191 to Hyde, et al. (Oct. 14, 2014); U.S. Pat. No. 8,967,951 to Klingler (Mar. 3, 2015); and U.S. Pat. No. 6,351,937 to Matsuda, et al. (Mar. 5, 2002). These turbine or compressor patents are defined at lower level assemblies.

Next set of prior art citations are applicable only to fuel system and combustor assemblies. U.S. Pat. No. 8,640,464 to Condevaux, et al. (Feb. 4, 2014) provides methods for fuel and air injected in a poloidal flow direction within the annular combustor. U.S. Pat. No. 8,640,464 has one disadvantage: Poloidal flows are associated with annular manifold forms and not with any other flow structures. U.S. Pat. No. 8,276,391 to Berry, et al. (Oct. 2, 2012) improves a uniform cooling of transition regions between the combustor liner and the transition duct. U.S. Pat. No. 8,276,391 defines a combustor lower level assemblies and method for cooling. U.S. Pat. No. 8,855,839 to Frazier, et al. (Oct. 7, 2014) provides fuel assembly comprising storage tank, fuel control and fuel data storage. U.S. Pat. No. 8,855,839 has limited application to railroad locomotives and train tracked vehicles. In U.S. Pat. No. 5,666,012 to Gongwer (Jul. 29, 1994), shows sealing a rotating shaft against high fluid pressure. U.S. Pat. No. 5,666,012 is specifically applied to electric motor sealing for rotating shaft mechanism.

U.S. Pat. No. 8,967,326 to Schlosser (Mar. 3, 2015) shows utility and efficient application of small, passive circular vortex flows. Yet, U.S. Pat. No. 8,967,326 does not demonstrate forces from vortex flow inside circular cavities, and has limited application to acoustic suppression devices. U.S. Pat. No. 8,960,592 to Windisch (Feb. 24, 2015), provides ducted fan VTOL airplane and method with bypass ducts. The disadvantage of U.S. Pat. No. 8,960,592 is a limited application to a blow-down propulsive vehicle. U.S. Pat. No. 9,026,274 to Hartman, et al. (May 5, 2015) provides a switching device and method for controlling output torque and rate of change of electric motors. U.S. Pat. No. 9,026,274 is a method for control of electric aero-propulsion system, which operates at speeds greater than 3,200 RPM, not implemented with ducted fan motors.

The following references are cited for relevant subject matter on aerodynamics, turboplants, mechanics of angular momentum and rotational kinetic energy:
1. John D. Anderson, Jr., Fundamentals of Aerodynamics, Fifth Edition, McGraw-Hill, Inc., 1984, Chapters 2, 3, 7, 10 and 15. [0012]
2. Gordon C. Oates, Aerothermodynamics of Gas Turbine and Rocket Propulsion, J. S. Przemieniecki (Editor-In-Chief), Third Edition, 1997, Chapters 2, 5, 6 and 10. [0013]
3. Marshall H. Kaplan, Modern Spacecraft Dynamics & Control, John Wiley & Sons, Inc., 1976, Chapter 2. [0014]
4. Peter W. Likins, "Effects of Energy Dissipation on the Free Body Motion of Spacecraft," JPL Technical Report No. 32-860, Jul. 1, 1966, Appendix A, B, and C.

Review was done on archived scientific journals and published papers. Results showed research into toroidal flow and torus forms has not progressed significantly in the last 35 years. As referenced in T. Miloh, "The Virtual Mass of a Closed Torus in Axisymmetric Motion," Journal of Engineering Mathematics, Volume 13, No. 1 (1979), 1-6. In the introduction, Miloh states, "Toroidal shapes are also frequently encountered in plasma physics, bio-physics and hydrodynamics of super fluids." Current scientific research represents two toroidal research topics, including plasma physics and motion of micro-organisms. Aerodynamic and academic research of toroidal flows or toroid structural forms is not in vogue.

SUMMARY OF FIRST EMBODIMENT

First embodiment identifies the machine apparatus and method to circulate atmospheric working fluid at high angular rates inside the lifting system. The machine is physically defined by a working fluid with dynamic energy transfer, where the working fluid is altered and transformed by moving from high energy state to a stable low energy state, as described in the SUBSONIC WORKING FLUID and OPERATION sections. Circulating working fluid generates vortex flow and lifting forces. The first embodiment identifies the lifting system with a carrier subsystem and torus linear flow subsystems. The systems and subsystems are detailed with assemblies, subassemblies, components, and elements. Fueled turboplants provide power to drive compressors that force atmospheric working fluid into the lifting system at angular rates greater than 9 Hertz (Hz), i.e. cycles per second. Exo-atmospheric designs and other apparatus ramifications are identified in the ALTERNATIVE EMBODIMENTS section.

The present invention includes methods for generating resultant force with circulating working fluid inside a nearly confined volume. Where a toroidal flow field is globally stable and confined within a torus cavity. A poloidal flow field is a locally stable flow. Separation of internal working fluid and external fuel resource is a novel and unique distinction in the embodiments of the present invention. Compared to other lifting systems and thrust generating technologies, such as chemical rocket motors, this embodiment offers an economic advantage by separating the circulating working fluid and resource fuel propellant.

BRIEF DESCRIPTION OF DRAWINGS

The drawings include:
FIGS. 1 through 6 identify the machine with the lifting system, torus linear flow subsystems, carrier subsystem, atmospheric air, and fuel resource. FIG. 1 is a modified form, perspective view to allow a view below the aero cover. FIG. 2 is an architectural design block diagram in a plan view. FIG. 3 is a perspective view of a carrier subsystem. FIGS. 4 and 6 are plan views. FIG. 5 is an enlarged view of the lifting system.

FIGS. 7 through 17 show a torus tube assembly with beams for structural stability. FIG. 7 is a plan view. FIGS. 8, 9, 10, 12, 13, 14, and FIG. 16 are sectional perspective views. FIGS. 11, 15, and 16 are sectional views.

FIGS. 18 and 23 are perspective views. FIGS. 19 and 21 are enlarged views. FIGS. 25, 26, and 27 are sectional views. FIGS. 20, 22, and 24 are in a plan view.

FIGS. 38 through 45 show a working fluid with uniform flow field, toroidal flow field, and poloidal flow field as plan views, except as follows.
FIGS. 39 and 40 are enlarged views.
FIGS. 38 and 44 are perspective views.

FIGS. 46 through 68 show design concepts for several alternative embodiments as plan views, except as follows. FIGS. 47 and 48 are sectional views. FIGS. 53, 57, 59, 61, and 62 are enlarged views. FIGS. 51, 60, 63, and 65 are perspective views.

DESIGN DEFINITION AND NUMERATION

Figure 2:
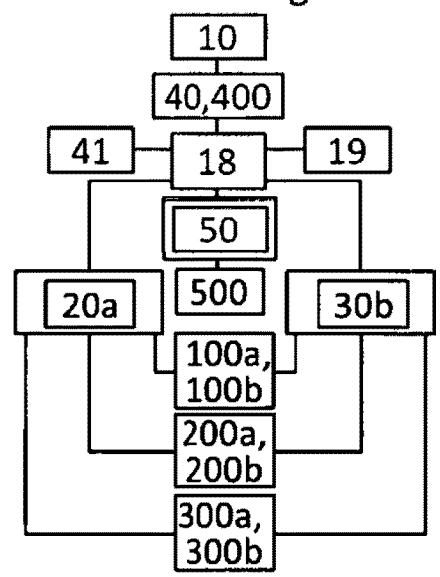

The architecture is defined with design structure and modularity. FIG. 2 shows the machine's architecture design block diagram in a plan view, hierarchical flowdown, and modular features down to assemblies. Modularity features are defined in the ADVANTAGES section. The design is identified by numerals. The machine (10) represents the top level design. The machine (10) includes a lifting system (18). Lifting system (18) is composed of carrier subsystem (50) and at least two nearly identical torus linear flow subsystems (20a, 30b). Carrier assembly (500) and other useful payloads are part of the carrier subsystem (50).

Torus linear flow subsystems (20a, 30b) include part designs for lower level assembly, subassemblies, subassembly components and elements. The subsystems are in the shaded boxes of FIG. 2. Subsystems (20a, 30b) and their independent constituent parts are uniquely defined as 'a' or 'b' side. From bottom up, the design architecture starts with parts including elements, components, subassemblies, and assemblies. Assemblies include torus tube (100a and 100b), linear flow (200a and 200b), turboplant (300a and 300b), and carrier (500). Assemblies (100a, 100b), (200a, 200b), (300a, 300b), and (500) are combined to become subsystems (20a, 30b, 50). Fuel resource (19) enables turboplants (27a, 37b in FIG. 4) to operate. Atmospheric air (41) is transformed into working fluid (40) when passed through turboplants (27a, 37b) within lifting system (18), FIG. 2. Atmospheric air (41) also is needed for combustion with fuel resource (19) for turboplant (27a, 37b) operations. Working fluid is forced into torus linear flow subsystems (20a, 30b) at high angular flow rates.

From top down, lifting system (18) has nearly identical subsystems, assemblies, subassemblies, components, and elements, identified as either 'a' or 'b' side, FIG. 2. In design flowdown, constituent parts are assigned numerals consistently based on subsystem, assembly, and subassembly. Numerals are 'a' or 'b' side to identify the subsystem and assembly. Further identification is given by sequential numbering. For example in FIG. 4, shell beam subassembly is identified with number 170. Then for assembly and subsystem 'b' side, shell beam number is 170b. There are five shell beam subassemblies on each assembly, which are represented as numbers 170b1 through 170b5. Another example in FIG. 19 at the assembly level, attachment hardware elements are designated with sequential numerals, such as cantilever beam attach hardware (234b2,1; 234b2,2; 234b2, 3).

LIST OF NUMERALS

Although Figures illustrate a general form, the detailed machine's explanation is provided from system, subsystem, to lower levels of assembly. In the FIRST EMBODIMENT section, the detailed description and numerals are shown to subassembly level, including components and elements. Details of fabrication, construction, and materials are provided for subsystem, assembly, subassembly, component, and element.

| | |
|---|---|
| 10 | Machine |
| 11 | Aero Cover |
| 12 | Turboplant Gauge |
| 13 | Landing Skid |
| 14 | Throttle Control |
| 15 | Auxiliary Panel |
| 16 | Fuel Indicator |
| 17 | Pressure Indicator |
| 18 | Lifting System |
| 19 | Fuel Resource |
| 20 | Torus Linear Flow Subsystem-a |
| 21 | Constant Circular Cross Section |
| 22 | Torus Opening |
| 23 | Turboplant Support Beams |
| 24 | External Curved Beams |
| 25 | Torus Cavity |
| 26 | Linear Flow Structure |
| 27 | Turboplant |
| 28 | Turboplant Inlet |
| 29 | Turboplant Combustor |
| 30 | Torus Linear Flow Subsystem-b |
| 31 | Constant Circular Cross Section |
| 32 | Torus Opening |
| 33 | Turboplant Support Beams |
| 34 | External Curved Beams |
| 35 | Torus Cavity |
| 36 | Linear Flow Structure |
| 37 | Turboplant |
| 38 | Turboplant Inlet |
| 39 | Turboplant Combustor |
| 40 | Working Fluid |
| 41 | Atmospheric Air |
| 42 | Working Fluid Velocity |
| 45 | Ram Fluid Flow |
| 46 | Torus Cavity Exit |

-continued

| | |
|---|---|
| 47 | Linear Exit Flow |
| 49 | Turbofan Suction |
| 50 | Carrier Subsystem |
| 53 | Carrier Shell |
| 54 | Waist Strut |
| 55 | Carrier Storage |
| 57 | Cargo Stowage |
| 58 | Flywheel Compensator |
| 60 | Torus Centroid |
| 61 | Large Torus Radius |
| 62 | Geometric Torus |
| 63 | Chord Arc Length |
| 64 | Angular Displacement |
| 65 | Small Radius |
| 66 | Torus Centerline |
| 100 | Torus Tube Assembly |
| 101 | Torus Cavity Surface |
| 102 | Torus Tube Opening |
| 103 | Torus Shell |
| 104 | Torus Opening Seal |
| 105 | Torus Pressure Seal |
| 106 | Torus Convex Surface |
| 107 | Torus Opening Seal Surface |
| 108 | Torus Concave Surface |
| 110 | Linear Beam Subassembly |
| 111 | Linear Beam Element |
| 112 | Linear Beam Engine Bracket |
| 114 | Linear Beam Exit Bracket |
| 115 | Linear Beam Threaded Inserts |
| 118 | Linear Beam Bracket Bolt |
| 130 | Torus Aspiration Subassembly |
| 131 | Aspiration Site |
| 132 | Control Panel-3 Hole |
| 133 | Mechanical Actuator-3 Hole |
| 134 | Control Panel-4 Hole |
| 135 | Mechanical Actuator-4 Hole |
| 140 | Flow Tube Beam Subassembly |
| 141 | Flow Tube Beam Element |
| 142 | Flow Tube Beam Engine Bracket |
| 144 | Flow Tube Beam Exit Bracket |
| 146 | Flow Tube Beam Threaded Inserts |
| 147 | Flow Tube Beam Bracket Hardware |
| 148 | Flow Tube Beam Bracket Bolt |
| 150 | Concave Beam Subassembly |
| 151 | Concave Beam Element |
| 152 | Concave Beam Engine Bracket |
| 154 | Concave Beam Exit Bracket |
| 156 | Concave Beam Threaded Inserts |
| 158 | Concave Beam Bracket Bolt |
| 160 | Keel Beam Subassembly |
| 161 | Keel Beam Element |
| 162 | Keel Beam Engine Bracket |
| 164 | Keel Beam Exit Bracket |
| 166 | Keel Beam Threaded Inserts |
| 168 | Keel Beam Bracket Bolt |
| 170 | Shell Beam Subassembly |
| 171 | Shell Beam Element |
| 172 | Shell Beam Meshed Facesheet |
| 174 | Internal Mesh |
| 176 | Shell Beam Threaded Inserts |
| 177 | Bonded Facesheet |
| 180 | Engine Bulkhead Beam Subassembly |
| 181 | Engine Bulkhead Beam Element |
| 182 | Engine Bulkhead Beam Hole |
| 184 | Engine Bulkhead Beam Interface |
| 190 | Exit Bulkhead Beam Subassembly |
| 191 | Exit Bulkhead Beam Element |
| 192 | Exit Tube |
| 193 | Exit Tube Plane |
| 194 | Exit Bulkhead Bracket Hole |
| 196 | Bulkhead Beam Bracket Interface |
| 200 | Linear Flow Assembly |
| 201 | Cantilever Sheet |
| 202 | Cantilever Subassembly |
| 203 | Flow Tube Subassembly |
| 204 | Flow Tube Sheet |
| 205 | Subassembly Center of Mass |
| 206 | Linear Flow Opening |
| 207 | Uniform Flow Exit |

-continued

| | |
|---|---|
| 208 | Cantilever Beam Screws |
| 209 | Cantilever Assembly Bracket |
| 210 | Linear Flow Cavity |
| 214 | Linear Pressure Vessel |
| 215 | Flat Linear Surface |
| 216 | Internal Spacers |
| 218 | Pressure Washer |
| 220 | Linear Cantilever Beam |
| 221 | Threaded Insert |
| 222 | Cantilever Bracket |
| 223 | Cantilever Bracket Hardware |
| 225 | Cantilever Bracket Bond |
| 226 | Cantilever Beam Doubler |
| 230 | Flow Tube Cantilever Beam |
| 231 | Flow Tube Cantilever Bracket Bolted Hardware |
| 232 | Flow Tube Cantilever Beam Bracket |
| 233 | Flow Tube Cantilever Beam Bond |
| 234 | Flow Tube Cantilever Beam Attach Hardware |
| 235 | Flow Tube Cantilever Beam Hole |
| 236 | Flow Tube Cantilever Doubler |
| 237 | Flow Tube Fence Beam |
| 239 | Flow Tube Cantilever Bracket Hardware |
| 240 | Flow Tube Concentric Rib |
| 241 | Flow Tube Cantilever Beam Bracket Through Hole |
| 242 | Flow Tube Cantilever Bracket Hole |
| 244 | Flow Tube Border Rib |
| 245 | Flow Tube Cantilever Doubler Bond |
| 246 | Flow Tube Diagonal Rib |
| 247 | Flow Tube Cantilever Beam Bond |
| 248 | Flow Tube Beam Rib Fillets |
| 249 | Flow Tube Sheet Rib Fillets |
| 250 | Cantilever Concentric Rib |
| 254 | Cantilever Border Rib |
| 255 | Cantilever Beam Doubler Bond |
| 256 | Cantilever Diagonal Rib |
| 257 | Cantilever Beam Bond |
| 258 | Cantilever Beam Rib Fillets |
| 259 | Cantilever Sheet Rib Fillets |
| 300 | Turboplant Assembly |
| 301 | Turbofan Bulkhead Subassembly |
| 302 | Turbofan Hub |
| 303 | Turbine Bypass Cavity |
| 304 | Turboplant Housing |
| 305 | Turboplant Housing Structure |
| 306 | Turbofan Cowling |
| 307 | Compressor Section |
| 308 | Turbine Bypass Flow |
| 309 | Turboplant Housing Beam |
| 310 | Compressor Subassembly |
| 311 | Low Pressure Turbofan |
| 312 | Turbofan Inlet |
| 313 | Intermediate Pressure Compressor |
| 314 | High Pressure Compressor |
| 315 | Low Pressure Spool Shaft |
| 316 | Intermediate Pressure Spool Shaft |
| 317 | High Pressure Spool Shaft |
| 318 | Spool Shaft Hole |
| 319 | Compressor Gearbox |
| 320 | Turbine Subassembly |
| 321 | Low Pressure Turbine |
| 322 | Intermediate Pressure Turbine |
| 323 | High Pressure Turbine |
| 324 | Turbine Exhaust Duct |
| 325 | Compressor Flow |
| 326 | Turbofan Housing Rib |
| 327 | Multi Spool Drive Shaft |
| 328 | Thermal Barrier Shield |
| 329 | Bulkhead Beam Attachment |
| 330 | Turbofan Tube Subassembly |
| 331 | Compressor Cavity |
| 332 | Tapered Cavity |
| 333 | Tapered Cavity Bulkhead |
| 334 | Compressor Shell |
| 335 | Tapered Flange |
| 336 | Compressor Shell Beam |
| 337 | Compressor Ribs |
| 338 | Tapered Cavity Bulkhead Bracket |
| 339 | Compressor Shell Beam Bracket |
| 340 | Fuel Tank Subassembly |
| 341 | Fuel Storage Tank |
| 342 | Fuel Tank Ribs |
| 343 | Electronic Fuel Control |
| 344 | Turbine Fuel Subassembly |
| 345 | Tank Fuel Lines |
| 346 | Battery Storage |
| 347 | Electric Generator |
| 348 | Turboplant Fuel Pumps |
| 349 | Turboplant Starter |
| 350 | Stator Subassembly |
| 351 | Stator Hole |
| 352 | Stator Vanes |
| 353 | Stator Mount Point |
| 354 | Stator Attach Hardware |
| 355 | Stator Mount Hardware |
| 356 | Stator Shell Beam |
| 357 | Compressor Section Inlet |
| 358 | Stator Shell Beam Inserts |
| 359 | Turbofan Beam Bracket Interface |
| 360 | Thermal Pressure Seal Subassembly |
| 361 | Pressure Seal |
| 362 | Double Roller Bearings |
| 363 | Thermal Seal |
| 364 | Bearing Housing |
| 365 | Seal Bracket |
| 366 | Turboplant Shell Mounting |
| 367 | Turbofan Bearing |
| 368 | Aft Thermal Shield |
| 370 | Turboplant Baseplate |
| 371 | Turboplant Assembly Exit |
| 400 | Subsonic Working Fluid |
| 401 | Atmospheric Total Pressure |
| 402 | Atmospheric Air Pressure Rise |
| 404 | Total Fluid Pressure |
| 405 | Fluid Pressure Gauge |
| 407 | Pressure Pitot Tube |
| 408 | Effective Pressure Area |
| 409 | Flow Tube Working Fluid |
| 410 | Toroidal Flow Field |
| 411 | Poinsot Flow Field |
| 412 | Turbulent Flow |
| 413 | Confined Toroid Volume |
| 414 | Fluid Flow Opening |
| 415 | Torus Tube Flow |
| 416 | Anapole Field |
| 417 | Turboplant Confined Volume |
| 418 | Fluid Energy Flow |
| 419 | Ram Flow |
| 420 | Poloidal Flow Field |
| 421 | Torus Knot |
| 422 | Free Body Diagram |
| 423 | Applied Force Area |
| 424 | Resultant Force |
| 425 | Pressure Force Distribution |
| 426 | Normal Pressure Forces |
| 427 | Low Pressure Cell |
| 428 | Local Normal Pressure |
| 429 | Fluid Pressure Distribution |
| 430 | Air Aspiration Flow |
| 432 | Internal Convex Flow Surface |
| 436 | Internal Concave Flow Surface |
| 440 | Uniform Flow Field |
| 441 | Confined Linear Flow Volume |
| 442 | Linear Exit Flow |
| 443 | Linear Flow Working Fluid |
| 444 | Sigma Effect |
| 446 | Linear Flow Suction |
| 450 | Turbulent Linear Field |
| 500 | Carrier Assembly |
| 510 | Carrier Lateral Lip |
| 515 | Waist Beams |
| 520 | Carrier Baseplate |
| 525 | Baseplate Beam |
| 540 | Carrier Lateral Beam |
| 601 | Racetrack Subsystems |

-continued

| | |
|---|---|
| 602 | Noncircular Cross Section |
| 603 | Extended Kepler Tube |
| 604 | Oblate Cross Section |
| 605 | Double Stacked Tori System |
| 606 | Central Cylinder |
| 607 | Structural Bonded Interface |
| 608 | Prolate Cross Section |
| 609 | Electric Motor Gearbox (not in Fig.) |
| 610 | Variable Area Opening |
| 611 | Prolate Pill Cross Section |
| 613 | Variable Width Aspiration Site |
| 614 | Oblate Pill Cross Section |
| 615 | Flow Tube External Rib Structures |
| 617 | Curve Beam Design |
| 618 | Curve Beam Form |
| 619 | Linear Flow Center of Gravity |
| 620 | Linear Flow Honeycomb Panel |
| 621 | Linear Flow Composite Plate |
| 623 | Linear Flow Cavity Constant Height |
| 624 | Linear Flow Opening Variable Area |
| 625 | Linear Flow Cavity Variable Height |
| 626 | Oxidizer Tank Lines |
| 627 | Propellant Tank Lines |
| 628 | Regulator Pressure Line |
| 629 | Linear Flow Exit Ducts |
| 630 | External Turboplant Mounting |
| 631 | One Spool Turboplant |
| 632 | Two Spool Turboplant |
| 633 | Recirculation Ducts |
| 634 | Oxidizer Tank Reservoir |
| 635 | Propellant Tank Reservoir |
| 636 | Oxidizer Tank Mounting (not in Fig.) |
| 637 | Propellant Tank Mounting (not in Fig.) |
| 638 | Reservoir Panel |
| 639 | Reservoir Flow Regulator |
| 640 | Working Fluid Reservoir |
| 641 | Cylindrical Enclosure Reservoir |
| 642 | Recirculation Flows |
| 643 | Liquid Working Fluids |
| 644 | Gaseous Working Fluids |
| 645 | Linear Flow Suction Ducts |
| 646 | Torus Tube Aspiration Duct |
| 647 | Bypass Compressor Manifolds |
| 648 | Forced Linear Flow Ducts |
| 649 | Turboplant Suction Slots |
| 650 | Electric Motor Compressor Assemblies |
| 651 | Pressure Joints |
| 652 | Electronic Motor Controller |
| 653 | Recirculation Volute Housing |
| 654 | Recirculation Volute Pump |
| 655 | Recirculation Volute Motor |
| 656 | Linear Flow Motor Pumps |
| 658 | Volute Pump Flow |
| 657 | Electronic Throttle Control |
| 659 | Secondary Linear Flows |
| 660 | Electric Power Assembly |
| 662 | Solar Array |
| 664 | Battery Subassembly |
| 665 | Power Processing Subassembly |
| 666 | Input Power |
| 667 | Return Power |
| 668 | Electrical Ground |

ADVANTAGES

Modularity is an advantage and is embedded in the design features of the present invention. Subsystems and assemblies embody nearly identical designs, which provide specific interfaces for modular designs. For example, with compatible interfaces between turboplant and torus tube assemblies, various types of turboplant designs can adapt without changing the torus tube design. This modular feature and design approach have the advantage to achieve efficiency in assembly line manufacturing. Thus, modularity has overall economic advantages in design, development, maintenance, fabrication, and operations.

Detailed Description of First Embodiment

First embodiment is shown referring to FIG. 1 through FIG. 45 in the following detailed description.

Figure 1:
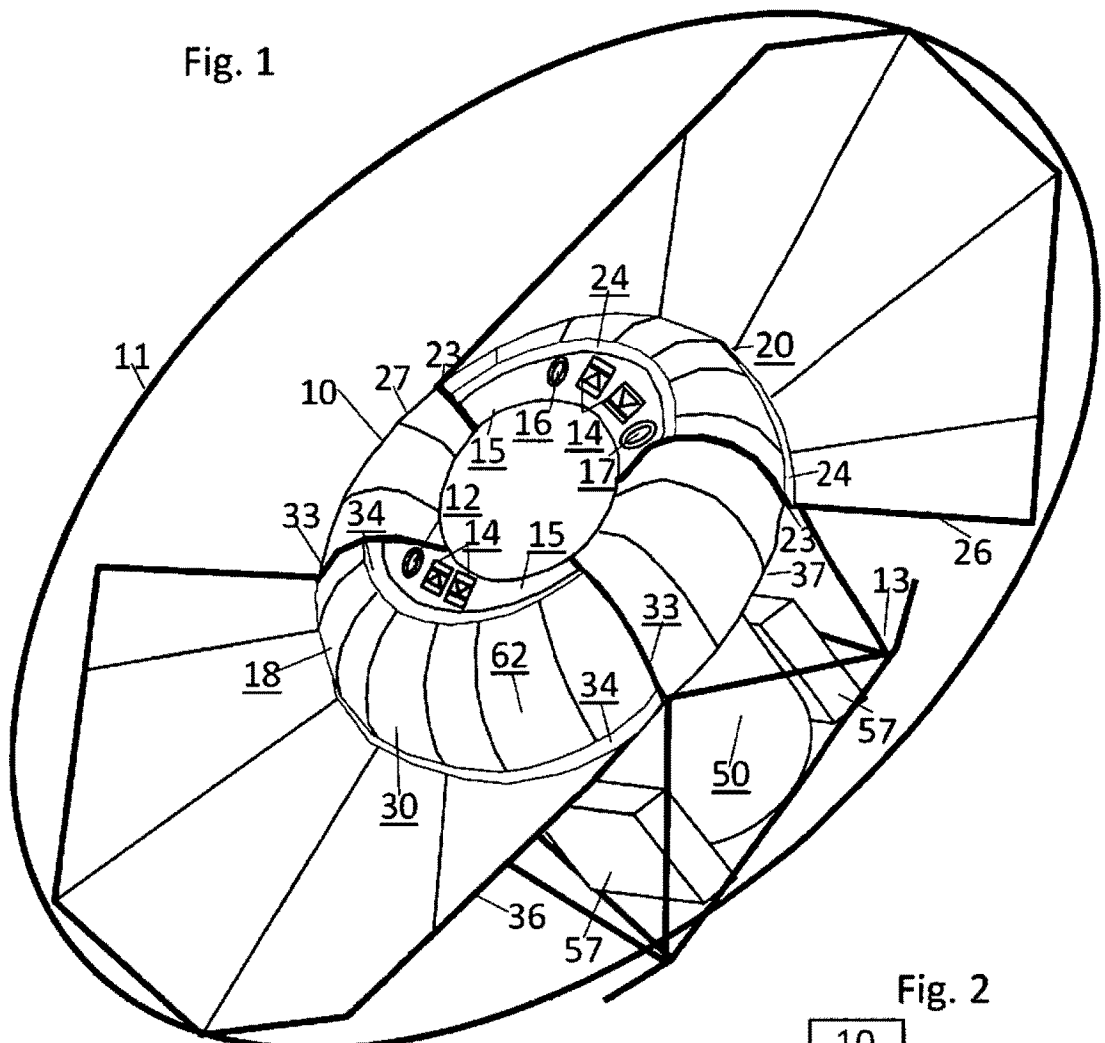

FIG. 1 illustrates a perspective view of the first embodiment. FIGS. 1 through 5 are the machine (10) overview drawings. The machine (10) is defined as combination of lifting system (18), atmospheric air (41), and fuel resource (19), FIG. 2. Atmospheric air (41) is identified for reference. The machine's (10) general form is shown with an aero cover (11), which reduces aerodynamic drag and turboplants (27, 37) acoustic noise. Aero cover (11), shown as a transparent modified form in FIG. 1, is a solid structure constructed from plastic or composite material, physically attaching to linear flow structures (26, 36) and to geometric torus (62) by upper external curved beams (24, 34) and upper turboplant support beams (23, 33). External curved beams (24, 34) terminate at upper turboplant support beams (23, 33). External curved and turboplant support beams are for reference only. Details not seen in FIG. 1 include, turboplants (27, 37), turboplant inlets (28, 38), turbine exhaust duct (324), and fuel tank subassembly (340).

In FIG. 1, the carrier subsystem (50) size is determined by large torus radius (61) of lifting system (18) in FIG. 4. Carrier subsystem (50) attaches to lifting system (18) by concave beams (150a, 150b), keel beams (160a, 160b), and shell beams (170a, 170b) subassemblies, FIG. 5. Mounted to carrier lateral lip (510) is an auxiliary panel (15), FIG. 1, that provides for machine (10) control features and operational devices, such as throttle control (14), fuel indicator (16), pressure indicator (17), and turboplant gauge (12). Typical aero-vehicle landing apparatus is illustrated with landing skid (13), which is prior art.

Figure 3:
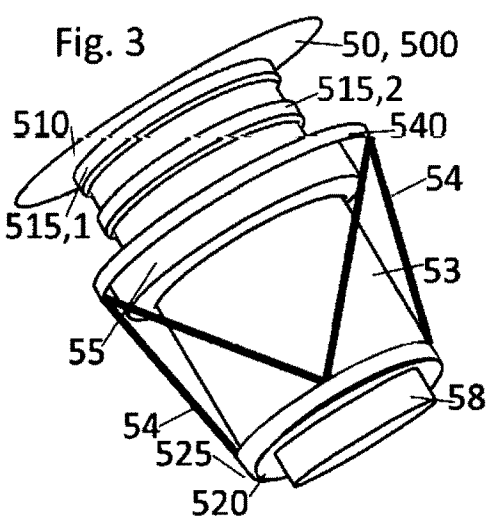

Carrier subsystem (50) provides for useful payloads, FIGS. 1 and 3 in perspective view. Carrier subsystem (50) includes carrier assembly (500), which provides structure load carrying members. Carrier shell (53), carrier baseplate (520), and carrier lateral lip (510) are primary structural members of carrier assembly (500). Carrier lateral lip (510) is formed as stepped cylindrical shape, FIG. 5. Other structural members are waist beams (515,1 and 515,2) and waist strut (54), FIG. 3. Waist strut (54) size is determined by carrier lateral beam (540) and baseplate beam (525); with distributed loads between the carrier lateral (540) beam and baseplate beam (525). Baseplate (520) accommodates a flywheel compensator (58). Carrier storage (55) is located adjacent to carrier shell (53) and below carrier lateral beam (540), FIG. 5, and can extend to the baseplate beam (525). Carrier shell (53) and carrier lateral lip (510) are constructed from thin walled aluminum or metal material with the size determined by lifting system (18).

Figure 17:
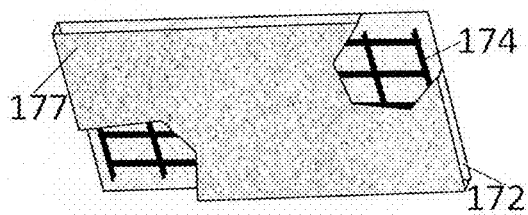

Waist beams (515,1 and 515,2), carrier lateral beam (540) and baseplate beam (525) construction are similar to shell beam meshed facesheet (172), refer to FIG. 17. Meshed facesheet represents a standard aerospace product of varying thickness and load carrying capabilities, which is prior art. Internal mesh (174) includes a light weight material such as bonded facesheet (177), which has two outside sheets of approximately 0.25 centimeter thick aluminum or composite materials. Cargo stowage (57) are compartments for handling useful payload.

FIG. 4 shows the embodiment without carrier subsystem (50) in a plan view. Geometric torus (62) is a torus shell (103a, 103b) and compressor shell (334a, 334b) with a size determined from large torus radius (61) of constant length and a circular cross section (31), FIG. 5. FIG. 5 shows an enlarged sectional view of FIG. 4. Size of constant circular cross section (31) is determined by small radius (65), which is radial distance from the torus cavity (35b) center to inside surface of torus cavity (35b). Refer to FIGS. 14, 15, and 16 for side-a numerals of constant circular cross section (21a), torus cavity (25a) and small radius (65). For the geometric torus (62), the constant circular cross section (21a, 31b) is maintained in-plane and at 90° to the plane defined by rotating large torus radius (61). Large torus radius (61) is a line from torus centroid (60) to constant circular cross section (21a, 31b) center point, with a location at turbofan hub (302a) center, FIG. 28. Equal angular displacement (64) of constant length large torus radius (61) defines a chord arc length (63). Torus centerline (66) is made by successively adding small angular displacement (64) and equally small chord lengths (63). Torus centerline (66) passes through turbofan hubs (302a, 302b) center. An abbreviated circle with four equal segments is shown in FIG. 6. A geometrically perfect torus is determined from constant angular displacement (64) of large torus radius (61) and constant circular cross section (21a, 31b) with a 360° rotation. Geometric torus (62) total runout manufacturing tolerance (end to end) is approximately less than 0.10 degree (6 arc-minute), defined by large torus radius (61) angular offset relative to the plane of constant circular cross section (21, 31).

Torus cavities (25a, 35b) are determined from constant circular cross section (21a, 31b) rotating 360° with large torus radius (61), FIG. 4. The toroid form is embodied in lifting system (18) and torus linear flow subsystems (20a, 30b). Torus shell (103b) forms torus cavity (35b), FIG. 5. Torus shell (103b) is a pressure vessel with at least 0.32 centimeter thick aluminum or composite materials. Torus shell (103b) construction method includes, but not limited to, constant angular sections sized to constant chord arc length (63). In combination, these constant angular sections are weld bonded together to form the torus shell (103b). Manufacture runout tolerance for 15 constant sections is less than 10 microns with respect to large torus radius (61).

Working fluid (40) angular rate is determined from the product of working fluid velocities (42a, 42b) divided by large torus radius (61) in FIG. 4. Lifting system (18) operates when working fluid (40) angular rates exceeds 9 Hz. Working fluid (40) angular rates are not limited to 9 Hz, and depending on torus linear flow subsystems (20a, 30b) design, can exceed 50 Hz. To illustrate an emergency vehicle application, lifting system (18) has an angular rate of 15.9 Hz with large torus radius (61) of 1 meter and bulk working fluid velocity (42) of 100 meters per second. In this example, the vehicle design includes carrier shell (53) diameter of slightly less than 2 meters to accommodate an operator, passengers, and equipment. The carrier shell (53) diameter is determined from large torus radius (61) and torus linear flow subsystems (20a, 30b).

In FIG. 4, torus linear flow subsystems (20a, 30b) structural elements include linear flow structure (26a, 36b), linear beams (110a, 110b), concave beams (150a, 150b), keel beams (160a, 160b), shell beams (170a1 thru 170a5, 170b1 thru 170b5), engine bulkhead beams (180a, 180b), and exit bulkhead beams (190a, 190b) subassemblies. FIG. 5 shows flow tube beam subassembly (140b). The bulkhead beams (180a, 180b, 190a, 190b) are support interfaces to torus linear flow subsystems (20a, 30b) and turboplants (27a, 37b), FIG. 4.

Torus linear flow subsystems (20a, 30b) embodiment provides mechanical and structural integrity for lifting system (18). Structural beams are mounted external to torus shell (103b) with their sizes and shapes determined from torus linear flow subsystems (20a, 30b). External mounting of structural members, which is a novel and unique feature in the present invention, provides unobstructed movement of working fluid (40) inside torus cavities (25a, 35b). Lifting system (18) is structurally stable under non-uniform working fluid (40) pressure forces and externally applied inertial forces. Torus pressure seals (105a, 105b) and thermal pressure seal subassemblies (360a, 360b) are pressure containment devices for working fluid (40). Torus seals (105a, 105b) and thermal seal subassemblies (360a, 360b) are sized from constant circular cross sections (21a, 31b).

Linear flow structures (26a, 36b), are attached to torus convex surfaces (106a, 106b) on torus linear flow subsystems (20a, 30b), FIG. 4. Linear beam subassemblies (110a, 110b) are seen on torus convex surfaces (106a, 106b) of torus linear flow subsystems (20a, 30b). Linear flow structures (26a, 36b) attach to linear beam (110b) and flow tube beam (140b) subassemblies, refer FIG. 5, which are elements of the torus linear flow subsystem (30b). Engine and exit bulkhead beam (180a, 180b, 190a, 190b) subassemblies are connected to linear flow structures (26a, 36b). Flow tube cantilever beams (230a1 thru 230a4, and 230b1 thru 230b4) are connected to shell beams (170a2 thru 170a5, and 170b2 thru 170b5), respectively, shown in FIG. 4. Linear cantilever beams (220a1 thru 220a4, and 220b1 thru 220b4) are hidden in FIG. 4, since these cantilever beams are below the plane of view.

Turboplants (27a, 37b) are common aerospace design for multi-stage, high pressure power plant, FIG. 4, with details provided in TURBOPLANT ASSEMBLY section. Turboplants (27a, 37b) are partially inside toroid structure with their size determined from constant circular cross sections (21a, 31b), FIG. 5. External of torus cavity (25a, 35b) are turboplant combustors (29a, 39b), turbine subassemblies (320a, 320b), and turbine exhaust ducts (324a, 324b). Turboplants (27a, 37b) are connected by a multi spool drive shafts (327a, 327b) into the torus cavity (25a, 35b). Separating the turboplants (27a, 37b) external and internal subassemblies with the torus cavity (25a, 35b), is a novel feature of the present invention. Inside torus cavity (25a, 35b), working fluid (40) is mostly isolated from the thermal, heat producing turbine subassembly (320).

Atmospheric air (41) enters at turboplant inlets (28a, 38b) and turboplants (27a, 37b) force air through torus linear flow subsystems (20a, 30b). When air is forced by turboplants (27a, 37b) into torus cavities (25a, 35b) and linear flow structures (26a, 36b), the air becomes working fluid (40). Air (41) is used as lifting system (18) working fluid (40) inside torus linear flow subsystems (20a, 30b). Turboplants (27a, 37b) operation causes the atmospheric pressure rise inside torus cavities (25a, 35b). Working fluid velocity (42), which represents the bulk fluid flow properties, results directly from interaction of atmospheric air (41) and turboplants (27a, 37b). For reference, atmospheric air (41) is approximately 78% nitrogen and 21% oxygen diatomic molecules, with additional trace gases. The area ratio of turboplant inlet (28a) and torus cavity exit (46a) is determined from size of inlet (28a) and exit (46a) areas. This area ratio is greater than two.

Turboplants (27a, 37b) cause turbofan suction (49b, 49b) of atmospheric air (41). Turboplants (27a, 37b) also ingest ram fluid flows (45a, 45b), at turboplant inlets (28a, 38b). At the torus cavity exits (46a, 46b), the ram fluid flows (45a, 45b) is provided from upstream working fluid. The a-side working fluid velocity (42a) provides ram fluid flow (45a) to b-side turboplant (37b). The b-side working fluid velocity (42*b*) provides ram fluid flow (45*b*) to a-side turboplant (27*a*). Linear exit flow (47*a*, 47*b*) includes uniform flow exits (207*a*1, 207*b*1), FIG. 4.

Linear beam (110*b*), flow tube beam (140*b*), concave beam (150*b*), and keel beam (160*b*) elements are constructed as box beams, FIG. 5 cross-section view. The beams are attached via weld bonding to external torus shell (103*b*) surface. External torus shell (103*b*) maintains torus cavity (35*b*). Shell beam (170*b*3) and beam subassemblies (110*b*, 140*b*, 150*b*, 160*b*) provide structural support for torus shell (103*b*). Beams (110*b*, 140*b*) provide support for maintaining size and shape of torus opening (32*b*). Beams (150*b*, 160*b*) provide support for carrier shell (53) and waist beams (515,1 and 515,2). Constant circular cross section (31) includes, but is not limited to, a circular form shown in FIG. 5. Cross section forms other than circular are identified in ALTERNATIVE EMBODIMENT section. Torus opening (32*b*) allows working fluid (40) to move from torus cavity (35*b*) to linear flow cavity (210*b*). Torus opening (32*b*) area is determined by, but not limited to, a flow rate of approximately 25% to 30% of total working fluid flow rate. Linear flow cavity (210*b*) height converges from torus opening (32*b*) to linear exit flow (47*b*).

In FIG. 5, 'b' side of flow tube beam (140*b*) and linear beam (110*b*) subassemblies are shown supporting linear flow structure (36*b*). FIG. 5 shows linear cantilever beams (220*b*3) interface with flow tube beam (140*b*) and flow tube cantilever beam (230*b*3) interface with linear beam (110*b*). Linear cantilever beams (220*a*, 220*b*) and flow tube cantilever beams (230*a*, 230*b*) interface with torus linear flow subsystems (20*a*, 30*b*) at shell beam subassemblies (170*a*, 170*b*).

Torus Tube Assembly

Figure 7:
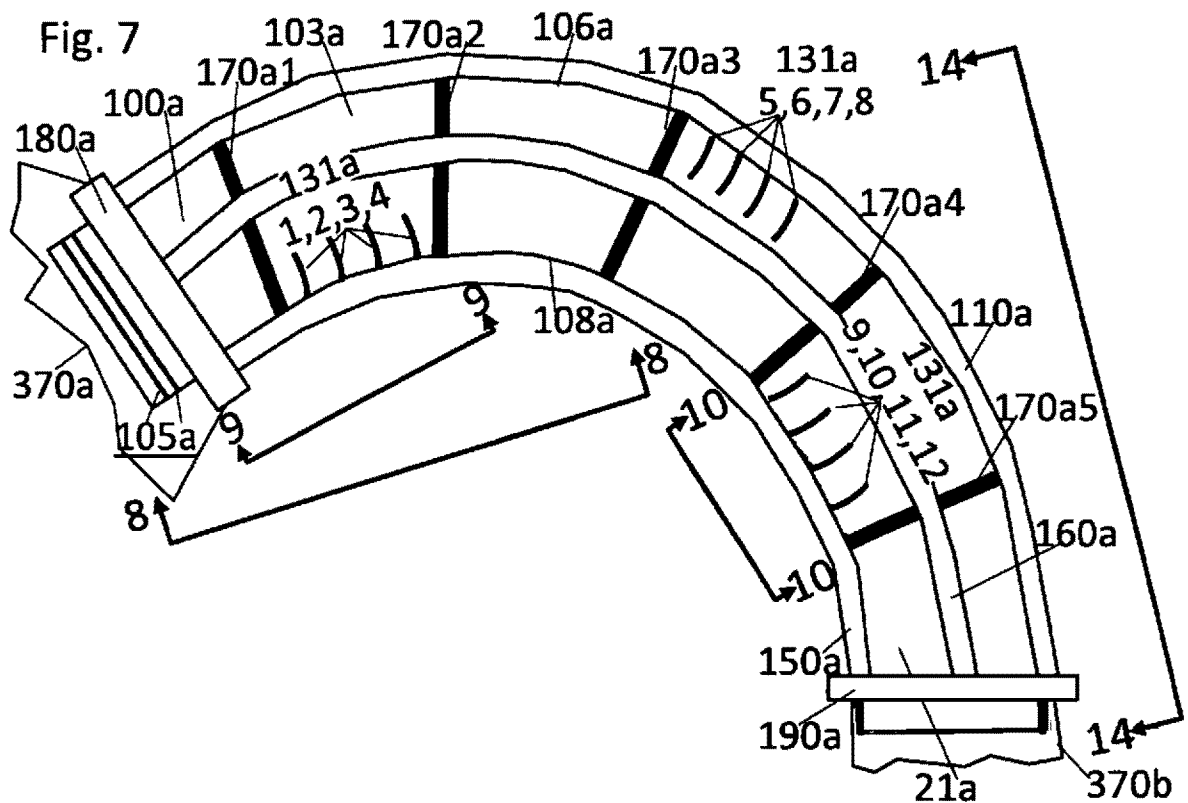

FIG. 7 shows 'a' side subsystem torus tube assembly (100*a*) in a plan view. Features illustrated in FIGS. 7 through 17 are side 'a' torus tube assembly (100*a*), subassemblies, and components, and elements, when designated with series '100' numerals, refer FIG. 2. Nearly identical torus tube assembly (100*b*), side 'b' is similar to FIGS. 7 through 17. Multiple perspective views are shown: for example, an inside view for torus concave surface (108*a*), FIG. 8, and an outside view in FIG. 14 showing torus convex surface (106*a*).

In FIG. 7, shell beam subassemblies (170*a*1 thru 170*a*5) provide rigid support members. Shell beams (170*a*1 thru 170*a*5) intersect and connect with linear beam (110*a*), flow tube beam (140*a*), concave beam (150*a*), and keel beam (160*a*) subassemblies. Between engine bulkhead beam (180*a*) and exit bulkhead beam (190*a*) subassemblies, torus shell (103*a*) is formed by constant circular cross section (21*a*). Beam subassemblies (110*a*, 140*a*, 150*a*, 160*a*) terminate at engine bulkhead beam (180*a*) and exit bulkhead beam (190*a*) subassemblies. Beam subassemblies (110*a*, 140*a*, 150*a*, 160*a*) and shell beams subassemblies (170*a*1 thru 170*a*5) are weld bonded on torus shell (103*a*) external surface. In combination, these subassemblies and components become the torus tube assembly (100*a*) structural unit.

Figure 8:
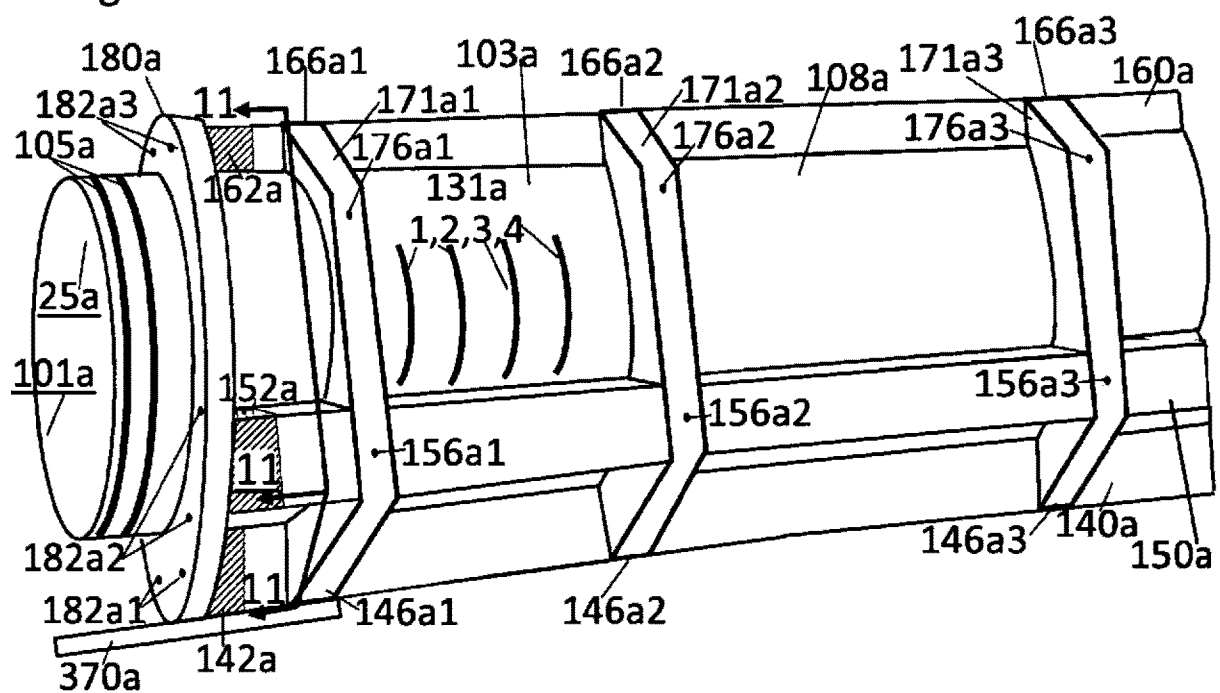
Figure 17:
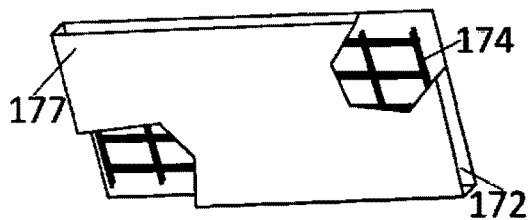
Figure 18:
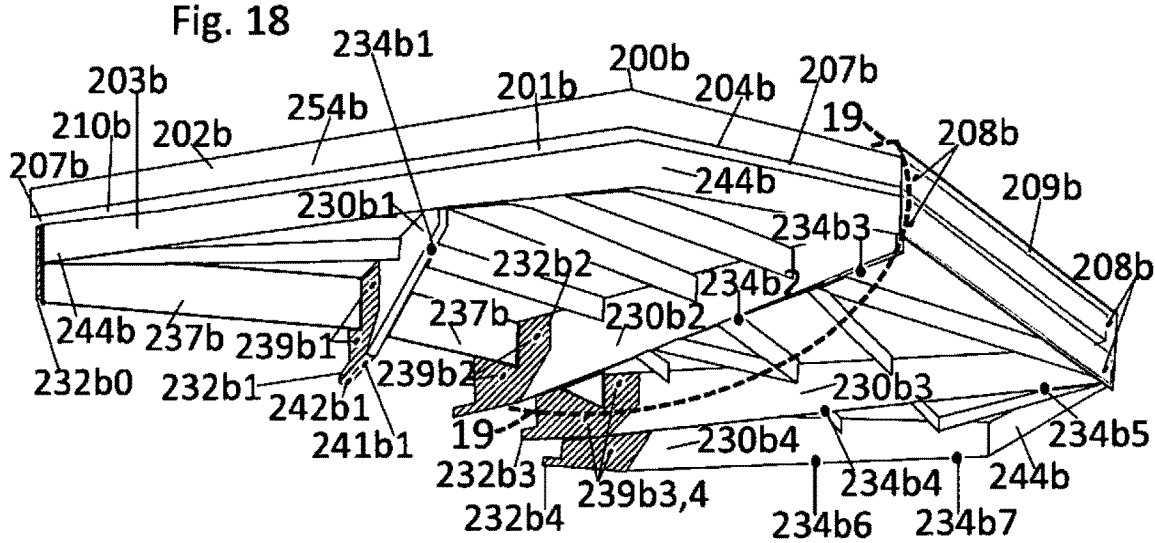
Figure 19:
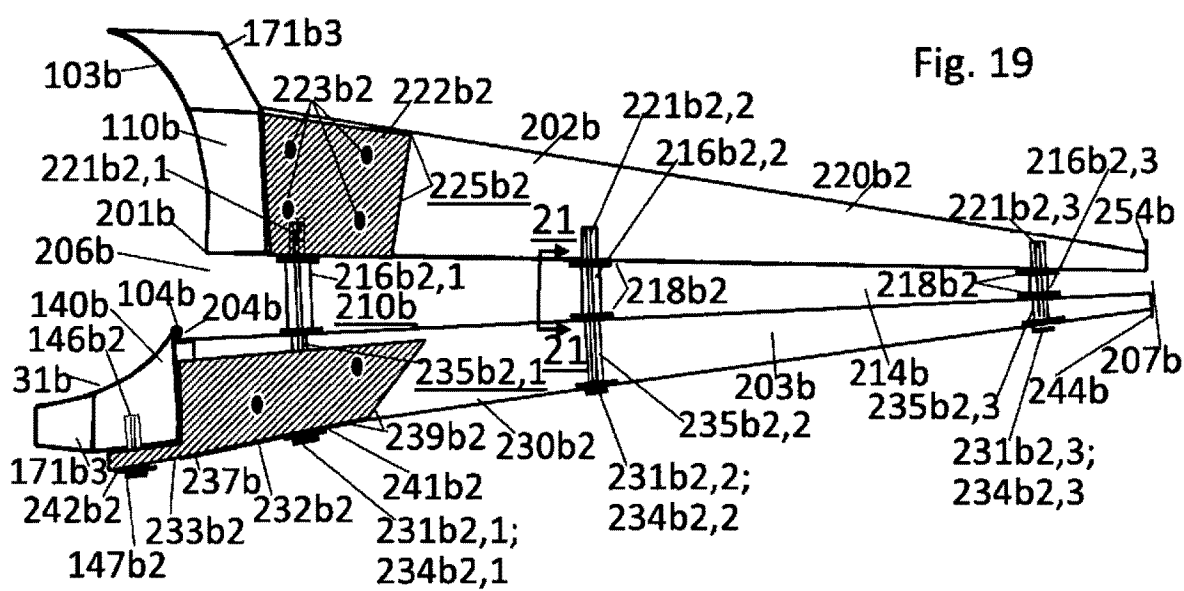
Figure 22:
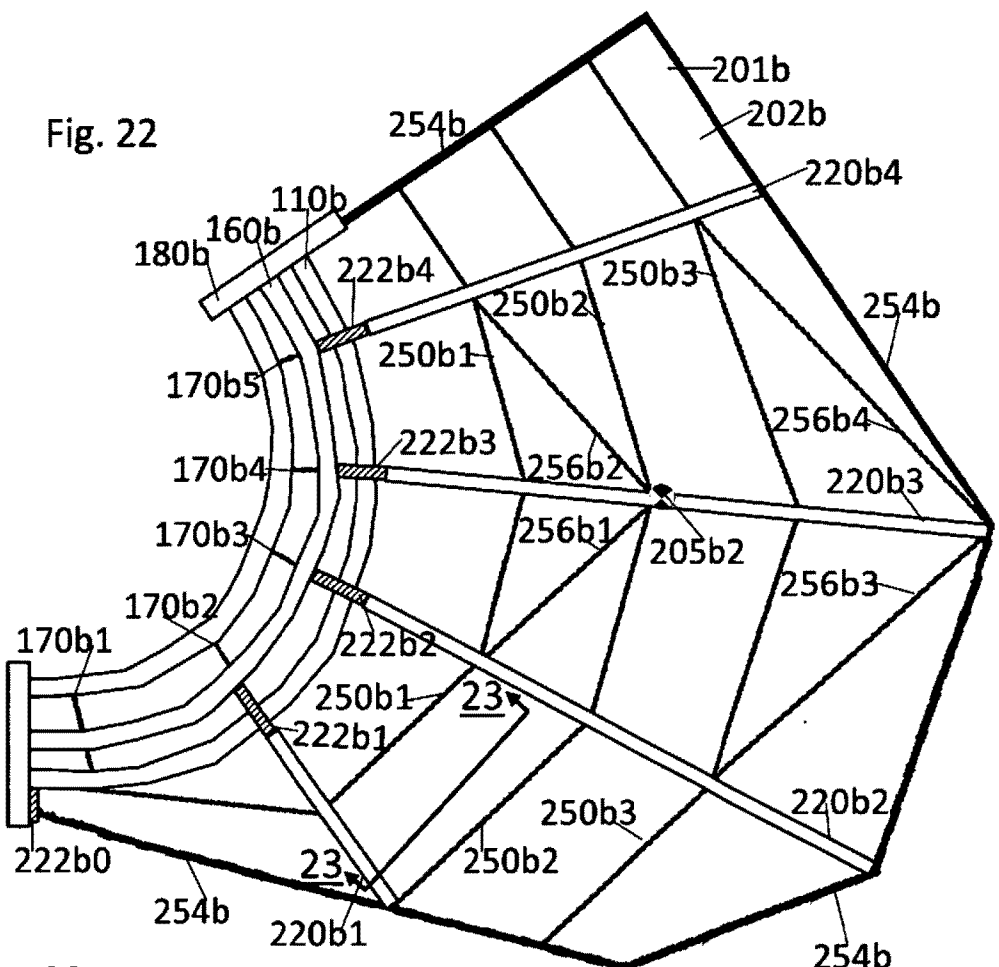
Figure 23:
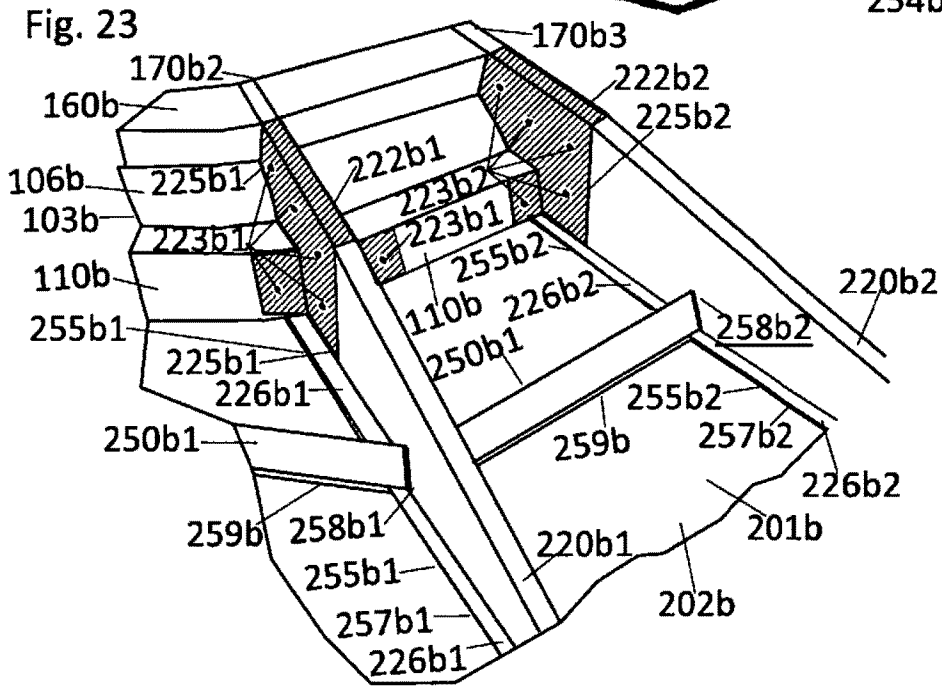
Figure 24:
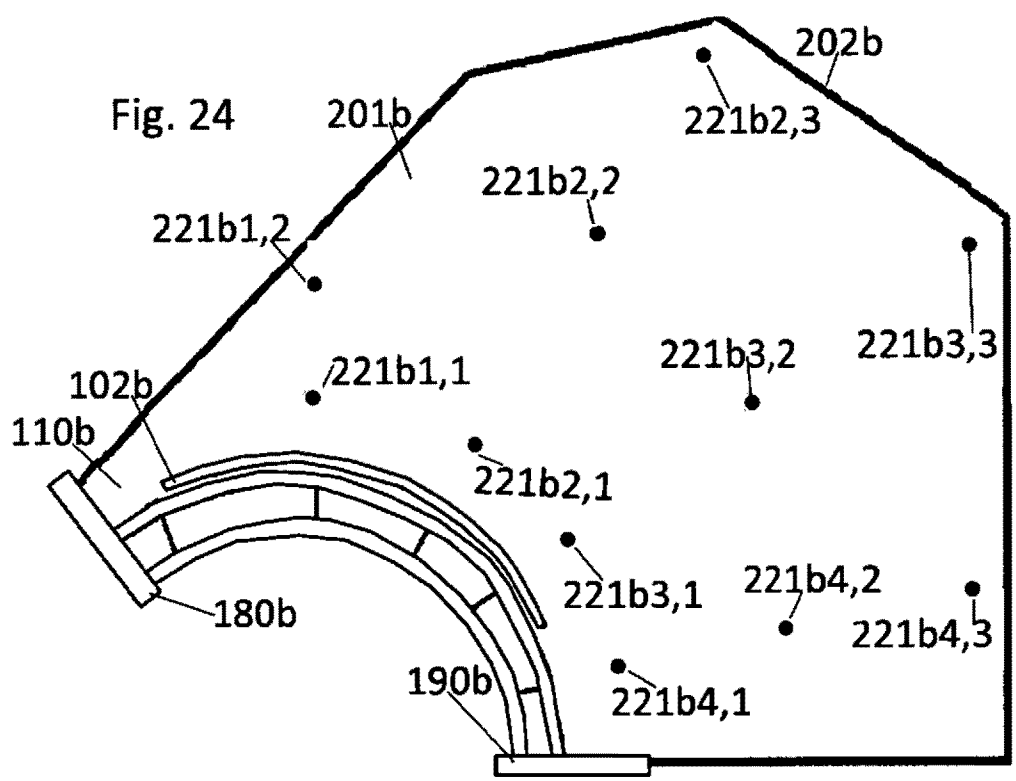
Figure 25:
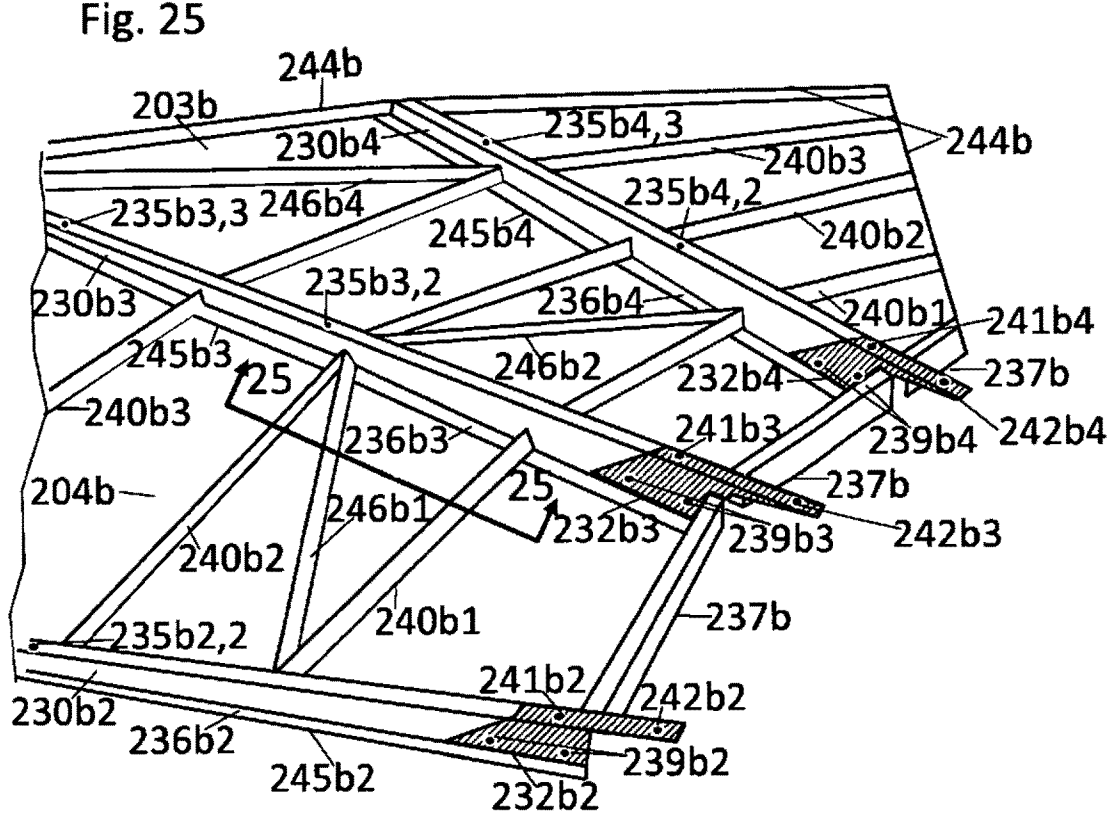
Figure 26:
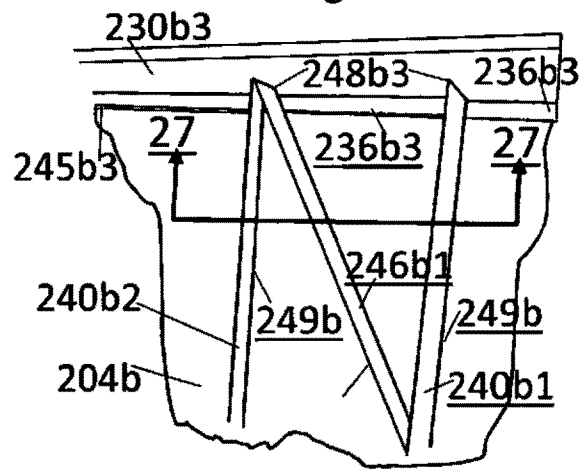
Figure 27:
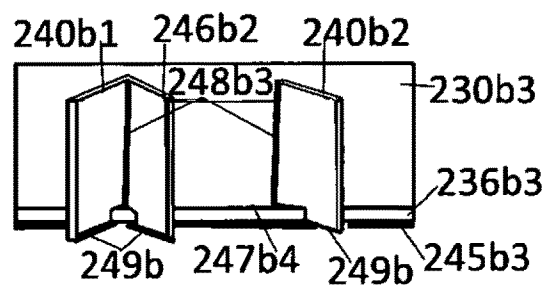

At the lifting system (18) level, torus shell (103*a*) is a pressure vessel, FIG. 8. Torus shell (103*a*) design is determined by working fluid (40) angular rates, maximum fluid pressure force, and machine (10) load carrying capability. For piecewise construction technique, torus shell (103*a*) is fabricated and fitted together using equal angular segments, FIG. 6. Pressure vessels are made of aluminum, metal, or composite materials. One specific type of pressure vessel construction is a composite overwrap pressure vessel, known as COPV. Engine bulkhead beam (180*a*) and exit bulkhead beam (190*a*) subassemblies carry additional loads to turboplant baseplate (370*a*, 370*b*) panels, FIG. 7. Baseplate (370*a*, 370*b*) panels are integrated structure panels to support the turboplant assembly (300*a*), FIG. 28, of appropriate metal or composite material construction techniques. Turboplant baseplate (370*a*) panel is attached to beam subassemblies on torus tube (100*a*), FIG. 8. Baseplate (370*b*) is not shown in FIG. 14.

Beam subassemblies (110*a*, 140*a*, 150*a*, 160*a*) sizes are determined by torus tube assembly (100*a*). Beam subassemblies structures are shown in FIG. 8, except for linear beam subassembly (110*a*), which is shown in FIG. 7. Intersection of beam subassemblies (110*a*, 140*a*, 150*a*, 160*a*) and shell beam subassemblies (170*a*1 thru 170*a*3) provides for torus tube assembly (100*a*) load bearing attach points with threaded inserts, FIG. 8. Threaded inserts for bolted interfaces are embedded as a component of beam subassemblies (110*a*, 140*a*, 150*a*, 160*a*) and shell beam elements (171*a*1 thru 171*a*3) structures. These inserts are identified as flow tube beam threaded insert (146*a*1 thru 146*a*3), concave beam threaded insert (156*a*1 thru 156*a*3) and keel beam threaded insert (166*a*1 thru 166*a*3) in FIG. 8. Threaded inserts (146*a*1 thru 146*a*3) are hidden. Threaded inserts (146*a*4, 146*a*5, 156*a*4, 156*a*5, 166*a*4, 166*a*5) are not shown in FIG. 8. Shell beam threaded inserts (176*a*1 thru 176*a*3) are shown in FIG. 8. Shell beam elements (171*a*4, 171*a*5) are not shown in FIG. 8. Threaded inserts (176*a*1 thru 176*a*5) are attachment points to waist beam (515,1), and threaded inserts (156*a*1 thru 156*a*5) are attachment points to waist beam (515,2), refer to FIG. 5.

FIG. 8 shows torus shell (103*a*), which maintains working fluid (40) pressure. In FIG. 8, torus seal (105*a*) is made of rubberized elastic material with interfaces to turboplant assembly (300*a*), FIG. 28, and tapered cavity (332*a*), FIG. 35. Torus seal (105*a*) is embedded on torus shell (103*a*) external surface, above torus shell (103*a*) by approximately 10 to 50 microns. FIG. 8 identifies internal torus cavity (25*a*) and torus cavity surface (101*a*). Torus cavity surface (101*a*) is a nearly smooth internal surface. Internal torus cavity (25*a*) allows for unobstructed flow of working fluid (40), refer to FIG. 4. Engine bulkhead beam subassembly (180*a*) provides torus linear flow subsystem (20*a*) with an interface for load carrying capability, FIG. 8.

Flow tube, concave, and keel beam engine bracket (142*a*, 152*a*, 162*a*) components are seen in FIG. 8. Linear beam engine bracket (112*a*) is seen in FIG. 11. Engine bulkhead beam (180*a*) is connected to turboplant assembly (300*a*) at turbofan bulkhead subassembly (301*a*), FIG. 28. Connecting beam engine bracket (112*a*, 142*a*, 152*a*, 162*a*) components to assembly (300*a*) by using engine bulkhead beam holes (182*a*1, 182*a*2, 182*a*3), FIG. 8, with attachment hardware. Engine bulkhead beam hole (182*a*4) is seen in FIG. 11. Brackets (112*a*, 142*a*, 152*a*, 162*a*) are components of beam subassemblies (110*a*, 140*a*, 150*a*, 160*a*), and constructed of structural materials described later.

In FIGS. 7, 8, and 14, aspiration sites (131*a*1 thru 131*a*12) allow relatively small and passive flow of external fluid, atmospheric air (41), into torus cavity (25*a*). Aspiration sites are novel features of the present invention. In FIGS. 7 and 8, aspiration sites (131*a*1 thru 131*a*4, 131*a*9 thru 131*a*12) are located on torus shell (103*a*) on torus concave surface (108*a*). Sites (131*a*1 thru 131*a*4, 131*a*9 thru 131*a*12) are located between keel beam (160*a*) and concave beam (150*a*) subassemblies. Sites (131*a*1 thru 131*a*4) are located between shell beam subassemblies (170*a*1) and (170*a*2). Aspiration sites (131*a*9 thru 131*a*12) are located between shell beam subassemblies (170*a*4) and (170*a*5). In FIGS. 7 and 14, aspiration sites (131a5 thru 131a8) are located on torus shell (103a) on torus convex surface (106a). Aspiration sites (131a5 thru 131a8) are located between keel beam (160a) and linear beam (110a) subassemblies and shell beam subassemblies (170a4) and (170a5). Each aspiration site has a constant width of approximately 0.32 centimeters with a size determined from, but not limited to, a flow rate of less than 0.25% of the total working fluid flow rate.

FIG. 9 shows the perspective view of torus aspiration subassembly (130a1) for aspiration sites (131a5 thru 131a4). Torus aspiration subassembly (130a1) includes control panel (134a) for mechanical actuator -4 hole (135a). FIG. 10 shows the perspective view of torus aspiration subassembly (130a2) for aspiration sites (131a9 thru 131a12). Torus aspiration subassembly (130a2) includes control panel (132a) for mechanical actuator -3 hole (133a). Control panels (132a and 134a) slide and articulate along torus concave surface (108a). Mechanical actuators (133a and 135a) attach to keel beam subassembly (160a). These mechanisms (133a, 135a) articulate, by mechanical or electrical devices, towards concave beam subassembly (150a) in at least 3 individual stages. Functional discussions of aspiration sites are in the OPERATION section.

In FIG. 11, beam elements (111a, 141a, 151a, 161a) are shown as a square C-channel construction with a size and shape determined by torus tube assembly (100a). C-channels are made from light weight materials, such as aluminum, plastic, or composites, with a wall thickness of approximately 0.32 centimeters. In FIG. 11, C-channel open legs are weld bonded to external torus shell (103a). Beam elements (111a, 141a, 151a, 161a) are weld bonded to engine bulkhead beam subassembly (180a), FIG. 11. Weld bonding is the process of welding high temperature to create a solid metal interface. Weld bonding also includes structural epoxy bonding for plastic or composite materials. Construction of engine bulkhead beam element (181a) is solid metal, such as steel or titanium. Beam engine bracket (112a, 142a, 152a, 162a) components attach to engine bulkhead beam element (181a) in FIG. 11. Engine bulkhead beam holes (182a1, 182a2, 182a3, 182a4) are provided for bolting together torus tube (100a) and turboplant assembly (300a). Engine bulkhead beam (180a) is attached to torus tube (100a). Engine bulkhead beam subassembly (180a) interfaces with tapered cavity bulkhead (333a), FIG. 35.

Typical beam engine bracket (112a, 142a, 152a, 162a) component construction is seen in FIG. 12. Beam brackets provide mechanical bulkhead support for torus linear flow subsystem (20a) and turboplants (27a), refer to FIG. 4. Beam bracket components are fabricated of metal, steel or titanium, for carrying structural loads. Beam bracket bolts (118a, 148a, 158a, 168a) connect beam engine brackets (112a, 142a, 152a, 162a) to beam subassemblies (110a, 140a, 150a, 160a). Beam brackets are structurally bonded to beams (110a, 140a, 150a, 160a) and bolted to engine bulkhead beam (180a) via engine bulkhead beams interface (184a1, 184a2, 184a3, 184a4).

Typical beam exit bracket (114a, 144a, 154a, 164a) components are in FIG. 13. These bracket components provide support between torus tube (100a) exit and inlet to turboplant (300b), refer FIG. 29. Exit beam bracket components are fabricated of metal, such as steel or titanium. Exit beam bracket interfaces (196a1, 196a2, 196a3, 196a4) are bonded and bolted at exit bulkhead beam (190a), FIG. 14. Exit bulkhead bracket holes (194a1, 194a2, 194a3, 194a4) attach to bulkhead beam subassemblies (190a, 301b).

Torus convex surface (106a) is shown in FIG. 14. Shell beams (171a3 thru 171a5) are identified in FIG. 14 and provide rigid support to torus shell (103a). Shell beam elements (171a3 thru 171a5) intersect with linear beam (110a) and flow tube beam (140a) subassemblies. Linear beam (110a) and flow tube beam (140a) subassemblies terminate at exit bulkhead beam (190a). Beam subassemblies (110a, 140a, 150a, 160a) are structurally bonded and welded to exit bulkhead beam (190a). Linear beam (110a), flow tube beam (140a), shell beams (171a3 thru 171a5), and torus shell (103a) are weld bonded to become an integrated structure. Linear beam (110a), flow tube beam (140a), and shell beams (171a3 thru 171a5) intersection provides for load bearing attach points, FIG. 14. Beam exit bracket components (114a, 144a) are shown in FIG. 14. Exit bracket components (114a, 144a) show as cut-offs to the bulkhead subassembly (301b) and turbofan beam bracket interface (359b), refer to FIG. 29 for side-a representation. Threaded inserts are embedded in linear beam (110a), flow tube beam (140a) subassemblies, and shell beams (171a3 thru 171a5). These insert elements are linear beam threaded inserts (115a3 thru 115a5) and flow tube beam threaded inserts (146a3 thru 146a5) in FIG. 14. Concave beam (150a), keel beam (160a), and shell beams (171a1 and 171a2) are not shown in FIG. 14. Also not shown in FIG. 14 are linear beam threaded insert (115a2), flow tube beam threaded insert (146a2), beam exit bracket (154a, 164a) components, and threaded inserts (156a3, 156a4, 156a5, 166a3, 166a4, 166a5).

In FIG. 14, the circular structure between exit bulkhead beam (190a) and exit tube plane (193a) is an exit tube (192a). Exit tube (192a) extends inside turbofan cowling (306b), refer FIG. 29 for side-a representation. The exit tube plane (193a) size is at least half the area of turbofan inlet (312b) area. FIG. 14 identifies internal torus cavity (25a), torus cavity exit (46a), and torus cavity surface (101a). Exit bulkhead beam subassembly (190a) is a load carrying structure for torus tube (100a), FIG. 7. Exit bulkhead beam (190a) includes exit bulkhead beam element (191a), exit bulkhead bracket holes (194a1 thru 194a4), and exit bulkhead bracket interfaces (196a1 thru 196a4). Construction of exit bulkhead beam (191a) is solid metal, such as steel or titanium. Exit bulkhead beam (191a) interfaces with turboplant assembly (300b) through bulkhead subassembly (301b) and with turbofan beam bracket interface (359b), refer FIG. 29 for side-a representation. Exit bulkhead beam subassembly (190a) carries additional loads through turboplant baseplate (370b), FIG. 7.

Torus tube opening (102a) is constructed by removing material from torus shell (103a) on torus convex surface (106a), FIG. 14. Approximately 25% to 30% of working fluid (40) passes from torus cavity (25a) through torus tube opening (102a). Torus tube opening (102a) is a constant width along torus shell (103a). Tube opening (102a) is positioned between linear beam subassembly (110a) and flow tube beam subassembly (140a). Torus tube opening (102a) is also located between shell beam element (171a1) and shell beam element (171a5). FIG. 15 shows a location with constant circular cross section (21a), torus cavity surface (101a), and tube opening (102a). FIGS. 15 and 16 identify small radius (65) of constant circular cross section (21a). Torus opening seal (104a) is located on torus opening seal surface (107a). Torus opening seal (104a) is an elastic and compressible material. Seal surface (107a) is on torus shell (103a), adjacent to flow tube beam subassembly (140a).

In FIG. 15, beam elements (111a, 141a, 151a, 161a) are square C-channel construction. Beam subassemblies (110a, 140a, 150a, 160a) connect to exit bulkhead beam (190a), FIG. 14. C-channels are light weight materials, such as aluminum or composites, with a wall thickness of approximately 0.32 centimeters. In FIG. 15, C-channel open legs are weld bonded to external torus shell (103a). Beams (111a, 141a, 151a, 161a) are structurally weld bonded to exit bulkhead beam (190a), FIG. 14. Shell beam element (171a4) is shown with beam elements (111a, 141a, 151a, 161a) in FIG. 15 and on torus convex surface (106a), FIG. 14.

Detailed interface between beams and exit bulkhead beam element (191a) is shown in FIG. 16. In FIG. 16, beam elements (111a, 141a, 151a, 161a) are square C-channel construction. Beam subassemblies (110a, 140a) connect to exit bulkhead beam (190a), FIG. 14. Beam subassemblies (150a, 160a) are not shown in FIG. 14. C-channels are light weight materials, such as aluminum, plastic, or composite, with a wall thickness of approximately 0.32 centimeters. In FIG. 16, C-channel open legs are weld bonded to external torus shell (103a). Construction of exit bulkhead beam element (191a) is solid metal, such as steel or titanium. Beams (111a, 141a, 151a, 161a) are structurally weld bonded to engine bulkhead beam element (191a), FIG. 16. Exit bulkhead bracket holes (194a1, 194a2, 194a3, 194a4) provide for attaching torus tube (100a) and turboplant (300b) assemblies.

Shell beam elements (171a1 thru 171a5) are fabricated with shell beam meshed facesheet (172), FIG. 17. Meshed facesheet is prior art and a common aerospace product. Modified form, perspective view in FIG. 17 shows internal mesh (174) material. Internal mesh (174) material is a bonded facesheet (177), approximately 0.32 centimeters aluminum or composite sheet material. Shell beam meshed facesheet (172) thickness can vary from 1.3 centimeter to several centimeters for different loading capabilities.

Linear Flow Assembly

Figure 18:
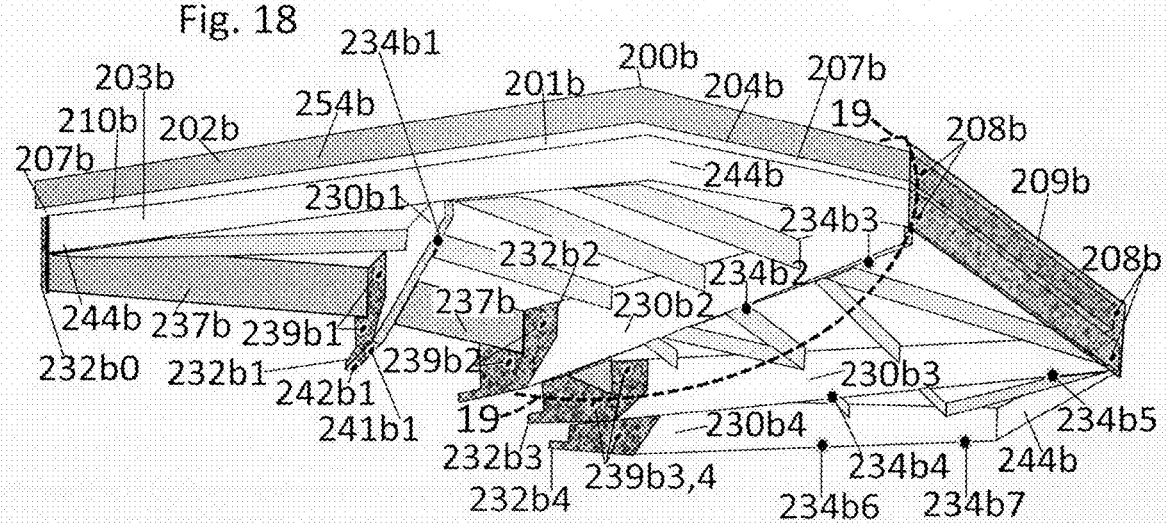
FIGS. 18 through 27 show a linear flow assembly that uses cantilever beam structures with views as follows.

FIG. 18 shows 'b' side linear flow assembly (200b) in a perspective view. Features in FIGS. 18 through 27 are linear flow assembly (200b), subassemblies, components, and elements, when designated with series '200' numerals, refer FIG. 2. Enlarged and sectional views are shown in FIGS. 19, 21, 23, and 27. The nearly identical side 'a,' linear flow assembly (200a), is similar to FIGS. 18 through 27. At the subsystem level, linear flow structure (36b) represents linear flow assembly (200b) with straight and angular edges along uniform flow exit (207b) providing for convenience of handling and storage. The perspective view drawing in FIG. 18 is linear flow assembly (200b) with two major subassemblies: cantilever subassembly (202b) and flow tube subassembly (203b). Cantilever subassembly (202b) is mostly hidden from view in FIG. 18, except for cantilever border rib (254b).

In FIG. 18, edges form cantilever border rib (254b) and flow tube border rib (244b). Flow tube cantilever beams (230b1 thru 230b4) are co-aligned to linear cantilever beams (220b1 thru 220b4). For example, beam (230b1) aligns to beam (220b1), beams (230b2) and (220b2) are aligned, beams (230b3) and (220b3) are aligned, and beams (230b4) and (220b4) are aligned. Linear cantilever beams (220b1 thru 220b4) are not shown in FIG. 18, since the beams are hidden from view. In FIG. 18, cantilever assembly bracket (209b) is attached with cantilever beam screws (208b) to provide support for cantilever beams (220b2, 220b3, 230b2, 230b3). Flow tube cantilever beam screw and washer hardware (234b1 thru 234b7) will secure two subassemblies (202b, 203b).

Figure 19:
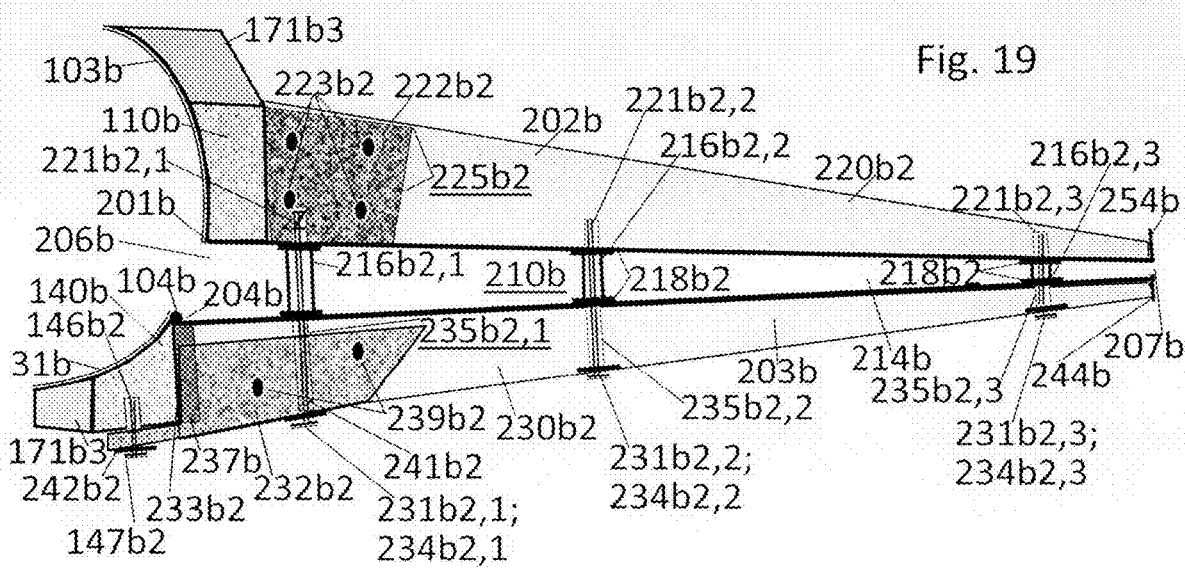
Figure 20:
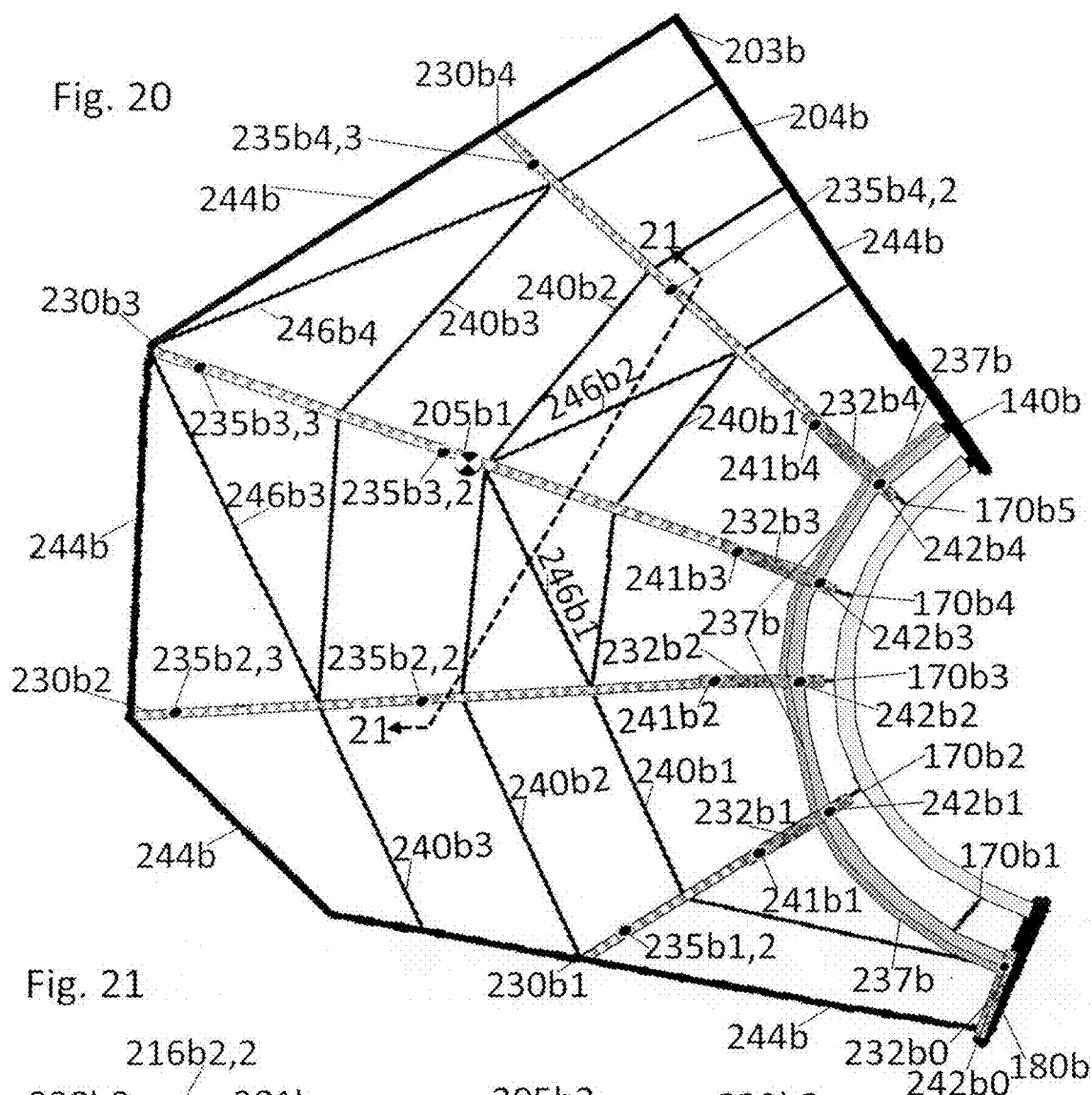
Figure 25:
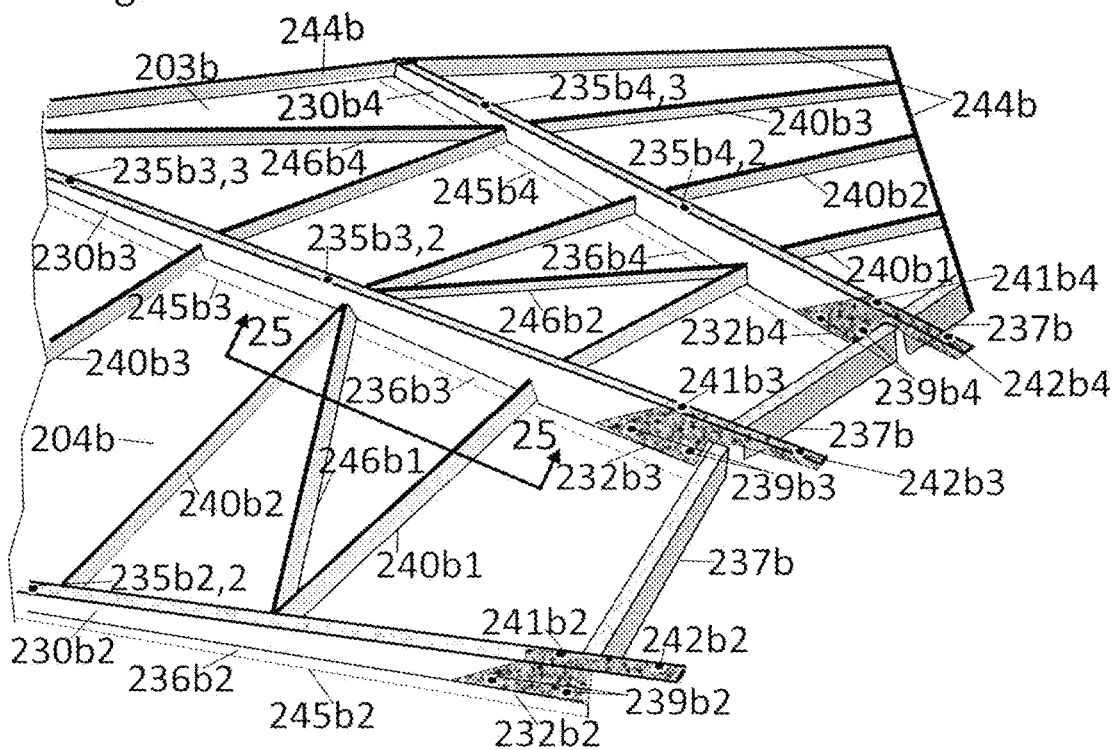

Flow tube cantilever beams (230b1 thru 230b4) include flow tube cantilever beam holes (235b1 thru 235b4), refer to FIGS. 19, 20, and 25. Flow tube cantilever beam brackets (232b1 thru 232b4) have flow tube cantilever beam bracket through-holes (241b1 thru 241b4). Flow tube cantilever beam bracket through-holes (241b2 thru 241b4) are out of view in FIG. 18. Through-holes (241b1 thru 241b4) accommodate flow tube cantilever bracket bolted hardware (231b) at linear flow opening (206b), FIG. 19. Flow tube cantilever beam brackets (232b1 thru 232b4) are shown attached to flow tube cantilever beams (230b1 thru 230b4) with flow tube cantilever bracket hardware (239b1 thru 239b4), FIGS. 18, 19. Flow tube cantilever beam bracket (232b0) attaches to engine bulkhead beam (180b), FIG. 20. Brackets are constructed from sheet metal or steel material with a sheet or wall thickness of approximately 0.16 centimeters.

FIG. 19 is an enlarged view from FIG. 18, linear flow assembly (200b). FIG. 19 includes details of linear cantilever beam (220b2) and flow tube cantilever beam (230b2). Similar design configuration details are on each matching pair of linear cantilever beams (230b1, 230b3, 230b4) and flow tube cantilever beams (220b1, 220b3, 220b4), FIG. 18. Flow tube and linear cantilever beams (230, 220) are constructed from bonded facesheet (177) materials, refer to FIG. 17. FIG. 19 shows linear flow cavity (210b) as the space between cantilever subassembly (202b) and flow tube subassembly (203b). Linear flow cavity (210b) interior is comprised of nearly flat surfaces, FIGS. 19 and 21. One half of the flat surface is part of cantilever subassembly (202b) resulting from cantilever sheet (201b). The other flat surface is part of flow tube subassembly (203b) resulting from flow tube sheet (204b). Linear pressure vessel (214b) provides pressure containment of linear flow cavity (210b). Flow tube fence beam (237b) ensures pressure seal on torus opening seal surface (107b), FIG. 15. Interface between flow tube subassembly (203b) and torus shell (103b) is along torus opening seal (104b), represented in FIGS. 14 and 15, as side 'a.'

Flow tube cantilever beams (230b1 thru 230b4) are weld bonded to flow tube sheet (204b) exterior surface, FIG. 19. Flow tube sheet (204b) is a thin flat sheet of aluminum, plastic, or composite materials, approximately 0.32 centimeters thick. Inside linear flow cavity (210b), flow tube sheet (204b) has nearly smooth internal surface finish. Linear flow opening (206b) height has a size determined from torus tube opening (102b), refer to FIG. 14. Flow tube cantilever bracket hole (242b2) provides for flow tube beam bracket hardware (147b2), which attaches flow tube subassembly (203b) to flow tube beam subassembly (140b), FIG. 19.

Flow tube and linear cantilever beams (220b2, 230b2) attach to torus shell (103b) through beam subassemblies (110b, 140b), respectively. Torus tube assembly (100b) interface is with cantilever bracket (222b) and flow tube cantilever beam bracket (232b) through linear beam subassembly (110b) and flow tube beam subassembly (140b). Cantilever beam holes (235b2) are numbered in sequence, 235b2,1; 235b2,2; 235b2,3 from flow tube beam subassembly (140b) FIG. 19. Cantilever beam hole (235b2,1) is co-aligned with flow tube cantilever beam bracket through hole (241b2). Additional hardware includes flow tube cantilever bracket bolted hardware (231b2,1; 231b2,2; 231b2, 3), flow tube cantilever beam attachment hardware (234b2, 1; 234b2,2; 234b2,3) and flow tube cantilever bracket hardware (239*b*2). Cantilever beam holes (235*b*2) are sized to accept bolts (231*b*2) and attachment hardware (234*b*2) with minimal hole clearance. Similar design approach uses brackets and through-holes on flow tube cantilever beams (230*b*1, 230*b*3, 230*b*4).

In FIG. 19, cantilever bracket (222*b*2) is attached to linear cantilever beam (220*b*2). Bracket (222*b*2) secures cantilever beam (220*b*2) to linear beam subassembly (110*b*) and shell beam element (171*b*3). Cantilever bracket (222*b*2) uses cantilever bracket bond (225*b*2) and bolted cantilever bracket hardware (223*b*2) to interface linear beam subassembly (110*b*) and shell beam (171*b*3), refer to FIG. 23. Flow tube cantilever beam bracket (232*b*2) anchors to flow tube cantilever beam (230*b*2). Flow tube cantilever beam (230*b*2), flow tube beam subassembly (140*b*), and shell beam (171*b*3) are secured by flow tube cantilever beam bond (233*b*2) and bolted with bracket hardware (239*b*2). Flow tube beam subassembly (140*b*) has threaded inserts (146*b*2). FIG. 19 shows bonded and embedded threaded insert (146*b*2) with flow tube beam bracket hardware (147*b*2), comprising screw and washer. Torus opening seal (104*b*) is located on torus shell (103*b*) adjacent to flow tube fence beam (237*b*). Flow tube fence beam (237*b*) is shown mounted up to flow tube cantilever beam (230*b*2) in FIG. 19.

Figure 21:
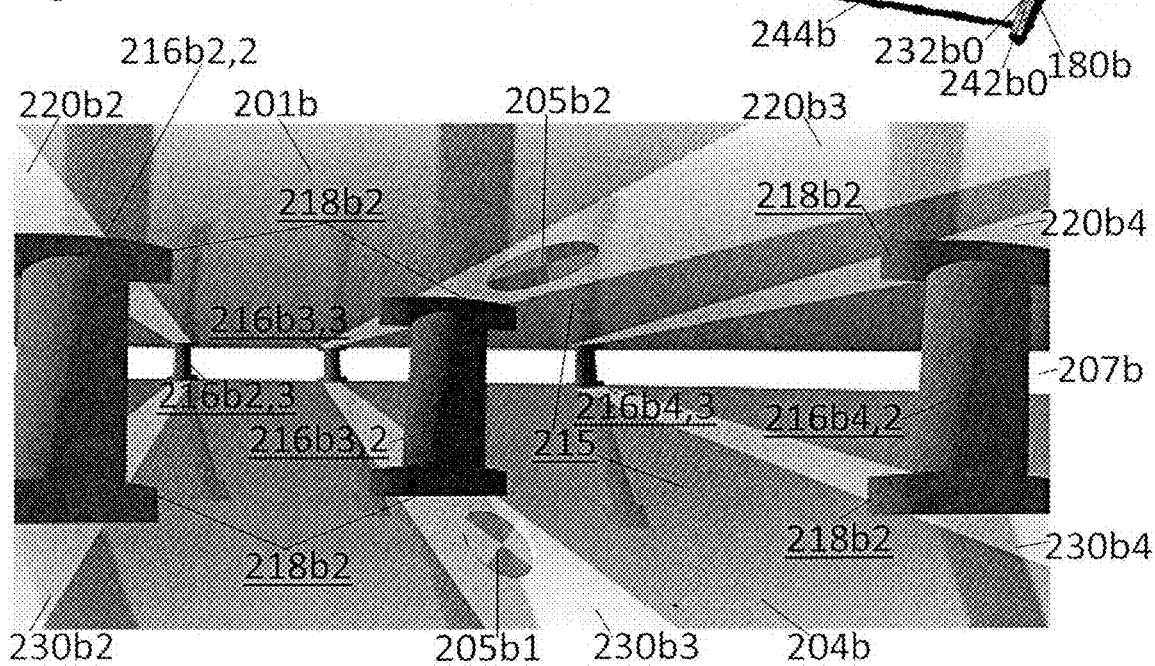

FIG. 19 shows threaded inserts (221*b*2,1; 221*b*2,2; 221*b*2,3) in cantilever subassembly (202*b*). Flow tube cantilever beam holes (235*b*2,1 thru 235*b*2,3) are pass-through holes for threaded inserts (221*b*2,1 thru 221*b*2,3) in cantilever subassembly (202*b*). These inserts accommodate flow tube cantilever bracket bolted hardware (231*b*1, 231*b*2, 231*b*3), FIG. 19. Internal spacers (216*b*2,1; 216*b*2,2; 216*b*2,3) and pressure washers (218*b*2) establish distance between cantilever subassembly (202*b*), cantilever sheet (201*b*) and flow tube subassembly (203*b*), flow tube sheet (204*b*). Internal spacer (216*b*) are a hallow barrel construction approximately 0.64 centimeters in diameter made of aluminum material. Pressure washers (218*b*) are used to maintain pressure integrity inside linear pressure vessel (214*b*) and linear flow cavity (210*b*). The internal spacers' (216*b*2,1; 216*b*2,2; 216*b*2,3) length decreases radially towards uniform flow exit (207*b*), refer to FIGS. 19 and 21. Direction of viewing for FIG. 21 is shown in FIG. 19. This results in a converging linear flow cavity (210*b*) with an overall shape and size determined by opening (206*b*) and exit (207*b*). Linear flow opening (206*b*) is approximately 1.50 centimeters at torus tube (100*b*) and is approximately 0.64 centimeters at uniform flow exit (207*b*). Uniform flow exit (207*b*) is framed by flow tube border rib (244*b*) and cantilever border rib (254*b*).

Figure 22:
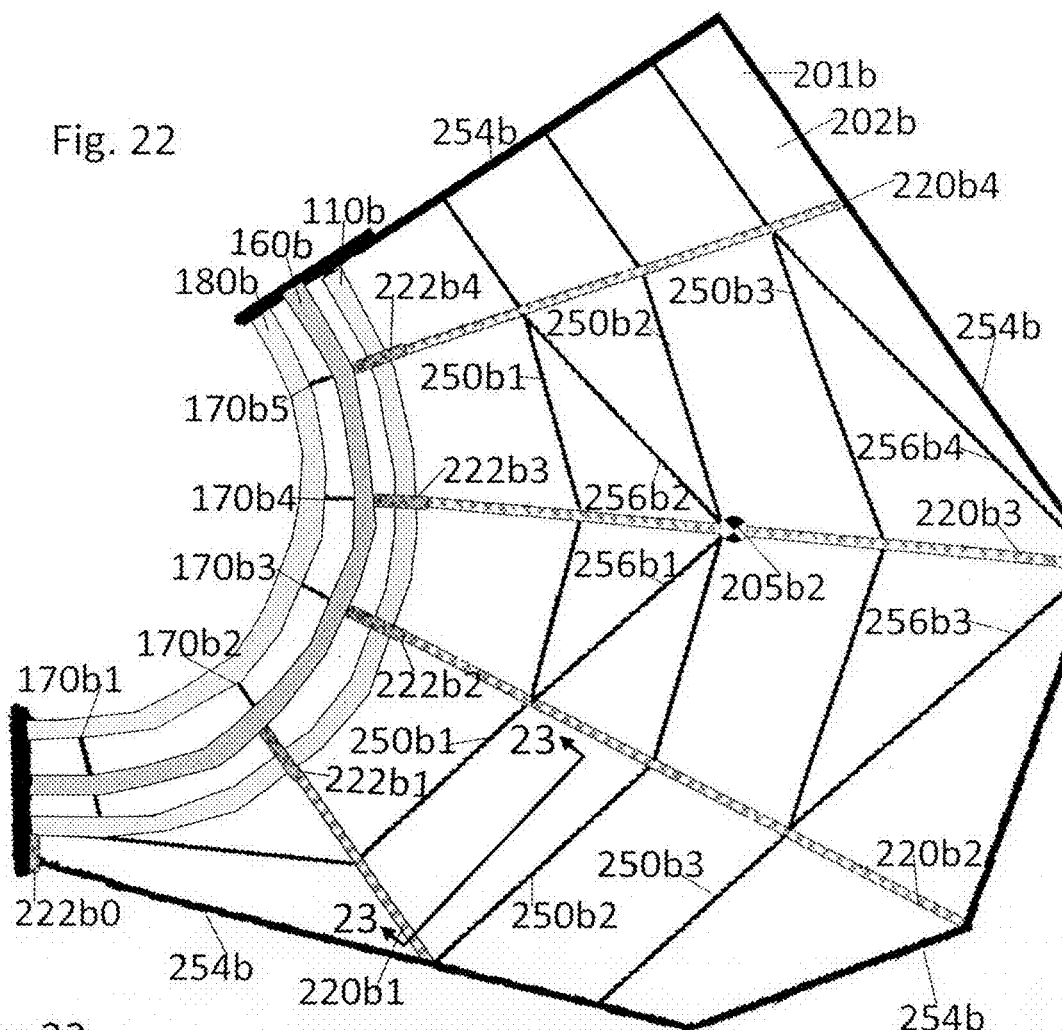

In a plan view, FIG. 20 shows flow tube subassembly (203*b*) supported with four flow tube cantilever beams (230*b*1 thru 230*b*4) with its size and shape nearly identical to cantilever subassembly (202*b*) in FIG. 22. Beams (230*b*1 thru 230*b*4) are components of flow tube subassembly (203*b*). In FIG. 20, flow tube cantilever beams attach to shell beam subassemblies (170*a*2 thru 170*a*5) and flow tube beam (140*b*) at threaded insert (146*a*2 thru 146*a*5), as side-a representation in FIG. 14. Brackets (232*b*0 thru 232*b*4) attach with flow tube cantilever beam bracket holes (242*b*0 thru 242*b*4), FIG. 20. Flow tube fence beam (237*b*) provides support between beam brackets (232*b*0 thru 232*b*4) and flow tube sheet (204*b*). Flow tube subassembly (203*b*) attaches to engine bulkhead beam subassembly (180*b*) with beam brackets (232*b*0). Beam holes (235*b*1,1; 235*b*2,1; 235*b*3,1; 235*b*4,1) are embedded in flow tube subassembly (203*b*) and not visible in FIG. 20.

Flow tube subassembly (203*b*) uses a network of flow tube concentric ribs (240*b*1 thru 240*b*3) to maintain and support a flat surface of flow tube sheet (204*b*), FIG. 20. Flow tube concentric ribs (240*b*1 thru 240*b*3) are weld bonded to the outside of flow tube sheet (204*b*). Flow tube diagonal ribs (246*b*1 thru 246*b*4) provide support for flow tube cantilever beam (230*b*3) about a flow tube subassembly (203*b*) center of mass (205*b*1). Flow tube border rib (244*b*) frames flow tube subassembly (203*b*). Flow tube concentric, diagonal and border ribs are approximately 2.5 centimeters wide and 0.32 centimeters thick of aluminum, plastic, or composite materials.

FIG. 21 is an enlarged and internal view of linear flow cavity (210*b*) from FIG. 20. This interior, perspective view of linear flow cavity (210*b*) is looking towards uniform flow exit (207*b*), FIG. 19. Internal spacers (216*b*2,2 and 216*b*2,3) are positioned between linear cantilever beam (220*b*2) and flow tube cantilever beam (230*b*2). The internal spacers (216*b*3,2 and 216*b*3,3) are seen on the cantilever sheet (201*b*) and flow tube sheet (204*b*), and centered between the linear cantilever beam (220*b*3) and the flow tube cantilever beam (230*b*3). View shows nearly smooth and flat surface of cantilever sheet (201*b*) and flow tube sheet (204*b*). Internal spacers (216*b*4,2 and 216*b*4,3) are placed on linear cantilever beam (220*b*4) and flow tube cantilever beam (230*b*4). Positioned near internal spacer (216*b*3,2) is subassemblies center of masses (205*b*1 and 205*b*2). FIG. 21 perspective view demonstrates linear flow cavity (210*b*) convergence to uniform flow exit (207*b*). Pressure washers (218*b*2) are between internal spacers (216*b*2, 216*b*3, 216*b*4) and cantilever sheet (201*b*) and flow tube sheet (204*b*) surfaces. Cantilever sheet (201*b*) and flow tube sheet (204*b*) define linear flow cavity (210*b*) and linear pressure vessel (214*b*) with a flat linear surface (215). Linear pressure vessel (214*b*) contains linear flow working fluid (443), refer FIGS. 39 and 40.

FIG. 22 shows cantilever subassembly (202*b*) in a plan view with four linear cantilever beams (220*b*1 thru 220*b*4) as components. Cantilever beams (220*b*1 thru 220*b*4) are attached with metal cantilever brackets (222*b*1 thru 222*b*4) to linear beam subassembly (110*a*), keel beam subassembly (160*b*), and shell beam subassemblies (170*a*2 thru 170*a*5) in FIG. 23. Cantilever subassembly (202*b*) is attached with metal cantilever bracket (222*b*0) to engine bulkhead beam (180*b*). Linear cantilever beams (220*b*1 thru 220*b*4) are weld bonded to cantilever brackets (222*b*0 thru 222*b*4) and cantilever sheet (201*b*) exterior surface. Cantilever sheet (201*b*) is a nearly flat sheet and made of aluminum, plastic, or composite material, approximately 0.32 centimeters thick. Inside the linear flow cavity (210*b*), cantilever sheet (201*b*) has a nearly smooth internal surface finish, FIG. 21. Cantilever subassembly (202*b*) joins to torus shell (103*b*) along a weld bonded interface on linear beam subassembly (110*b*). This interface is along torus tube opening (102*a*), represented as side-a in FIG. 14. Linear cantilever beams (220*b*1 thru 220*b*4) are constructed from the same bonded facesheet (177) materials.

Cantilever subassembly (202*b*) incorporates a network of cantilever concentric ribs (250*b*1 thru 250*b*3) to support the cantilever sheet (201*b*) nearly flat external surface, FIG. 22. Cantilever concentric ribs (250*b*1 thru 250*b*3) are weld bonded to exterior of cantilever sheet (201*b*). Cantilever diagonal ribs (256*b*1 thru 256*b*4) provide support for linear cantilever beam (220*b*3) about cantilever subassembly (202*b*) center of mass (205*b*2). Cantilever border rib (254*b*) frames cantilever subassembly (202*b*) and is bonded along cantilever sheet (201*b*) outside edge, FIG. 22. Cantilever concentric, diagonal and border ribs are approximately 2.5 centimeters wide and 0.32 centimeters thick of aluminum, plastic, or composite materials. Cantilever concentric ribs (250b1 thru 250b3) and flow tube concentric ribs (240b1 thru 240b3) are co-aligned at the linear flow assembly (200b) level. Concentric ribs generally follow torus shell (103b) and linear flow opening (206b) contours on torus convex surface (106a), shown as side-a in FIG. 14.

Figure 23:
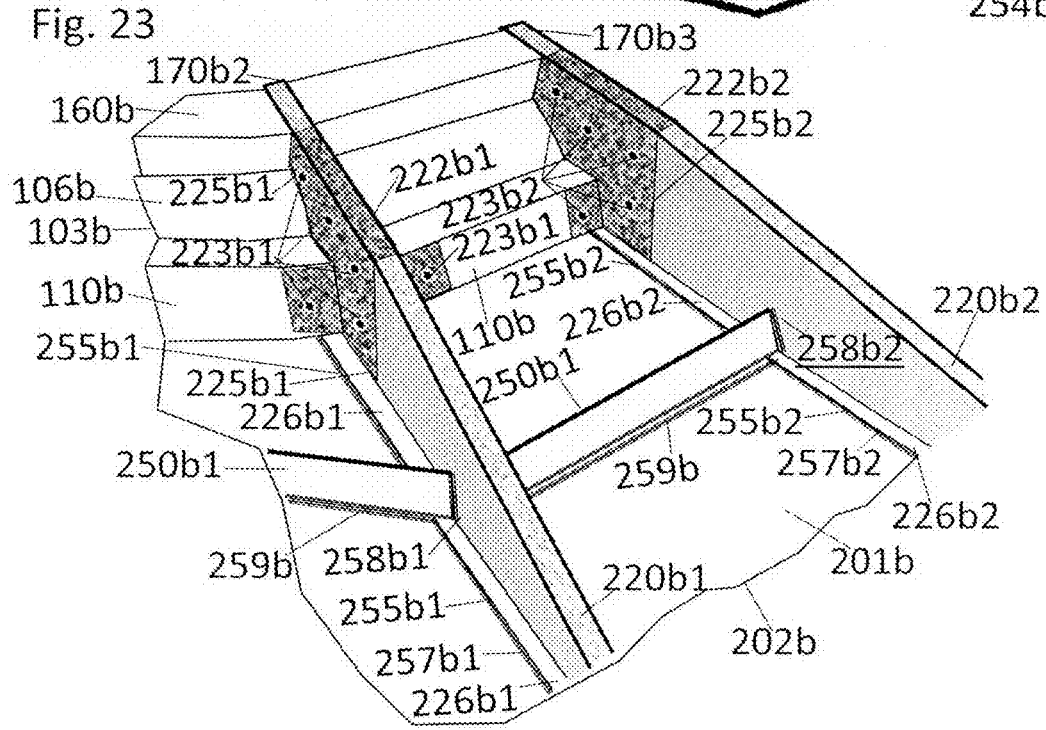

FIG. 23 is a perspective view of cantilever beams (220b1, 220b2). Similar design detail applies for cantilever beams (220b3, 220b4). In FIG. 23, cantilever subassembly (202b) attaches to linear beam subassembly (110b) and shell beam subassemblies (170b2, 170b3) with cantilever brackets (222b1, 222b2). Cantilever brackets (222b1, 222b2) are connected with cantilever bracket bonds (225b1, 225b2) via cantilever bracket hardware (223b1, 223b2). Cantilever bracket bond (225b1) and bolted hardware (223b1) interface to linear beam subassembly (110b) and shell beam (170b2). Cantilever bracket bond (225b2) and bolted hardware (223b2) interface to linear beam subassembly (110b) and shell beam (170b3). This interface provides a stable structure with keel beam subassembly (160b) and torus shell (103b). Cantilever beams (220b1, 220b2) attaches to cantilever beam doublers (226b1, 226b2) at cantilever beam bonds (257b1, 257b2). Cantilever brackets (222b1 thru 222b4) are constructed from metal, aluminum, or titanium material with a bracket wall thickness of approximately 0.16 centimeters.

Cantilever sheet (201b) shows a perspective view, FIG. 23. Rib element (250b1) bonds with cantilever sheet rib fillets (259b) and cantilever beam doubler (226b). Rib (250b1) also bonds to cantilever beam rib fillets (258b1, 258b2) and cantilever beams (220b1, 220b2). Rib element (250b) is approximately 2.5 centimeters wide and 0.32 centimeters thick and is made of aluminum, plastic, or composite materials. Ribs are formed radially over cantilever beam doubler (226b).

Figure 24:
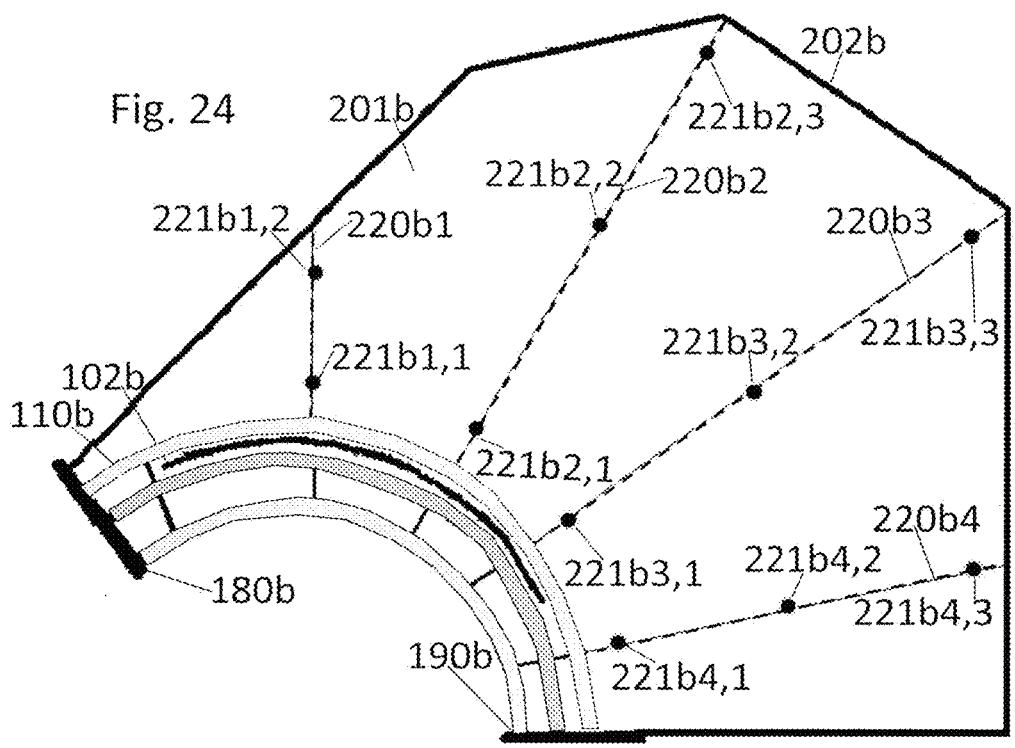

FIG. 24 shows locations of threaded inserts (221b1 thru 221b4) in a plan view on cantilever subassembly (202b) and cantilever sheet (201b) in a nearly flat surface. Threaded inserts (221b1,1; 221b1,2) are embedded and bonded in linear cantilever beam (220b1). Threaded inserts (221b2,1; 221b2,2; 221b2,3) are embedded and bonded in linear cantilever beam (220b2). Threaded inserts (221b3,1; 221b3,2; 221b3,3) are embedded and bonded in linear cantilever beam (220b3). Threaded inserts (221b4,1; 221b4,2; 221b4,3) are embedded and bonded in linear cantilever beam (220b4).

Threaded inserts (221b1 thru 221b4) co-align with flow tube cantilever beam holes (235b) along flow tube cantilever beams (230b1 thru 230b4), FIG. 25. Flow tube cantilever beam holes (235b2,2; 235b3,2; 235b3,3; 235b4,2; 235b4,3) are shown in FIG. 25. Flow tube cantilever beam screw hardware (234b) use threaded inserts (221b) as receptacles. Threaded inserts (221b1,1, 221b2,1, 221b3,1 and 221b4,1) are embedded and bonded in linear cantilever beams (220b1 thru 220b4), FIG. 24, and through cantilever brackets (222b1 thru 222b4), FIG. 22. Threaded inserts (221b1,1, 221b2,1, 221b3,1 and 221b4,1) co-align with flow tube cantilever beam bracket through holes (241b1 thru 241b4), FIG. 25. FIG. 24 shows cantilever subassembly (202b) bonded to linear beam subassembly (110b), adjacent to torus tube opening (102b). Cantilever subassembly (202b) is also bonded to engine bulkhead beam (180b) and exit bulkhead beam (190b) subassemblies.

Figure 26:
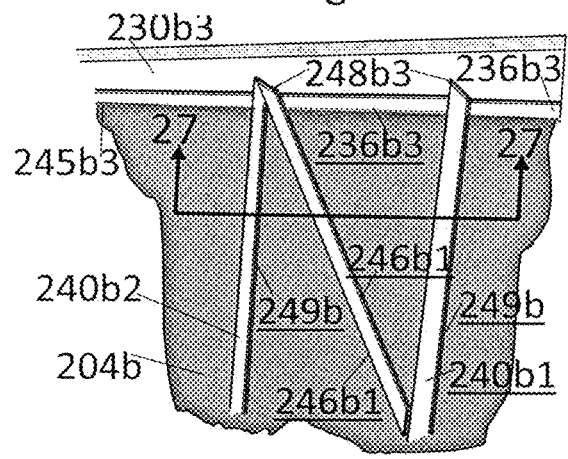
Figure 27:
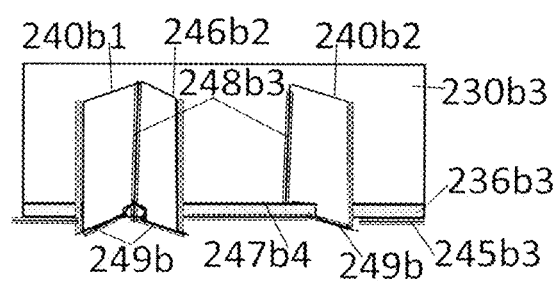

In FIGS. 25 through 27, the construction technique is shown for cantilever (202b) and flow tube (203b) subassemblies. The detailed construction technique is described as follows. Cut and formed cantilever sheet (201b) and flow tube sheet (204b) are laid on a flat surface. Two sheets (201b, 204b) size and shape are approximately determined along border rib (244b, 254b), refer FIG. 18. In order to align with torus tube (100b) along opening seal (104b), flow tube sheet (204b) is a different size from cantilever sheet (201b). Cantilever beams (220b3, 220b4) are attached to cantilever beam doublers (226b1, 226b2) at cantilever beam bonds (257b1, 257b2). Cantilever beam doublers (226b1, 226b2) attaches with cantilever beam doubler bond (255b1, 255b2) on cantilever sheet (201b) exterior surface, FIG. 24.

FIG. 25 is a sectional view of flow tube subassembly (203b). Flow tube cantilever beam doublers (236b2 thru 236b4) connect to flow tube sheet (204b) with flow tube cantilever beam doubler bonds (245b2 thru 245b4). Flow tube cantilever beams (230b2 thru 230b4) are shown with beam brackets (232b2 thru 232b4), FIG. 25. Flow tube cantilever beams (230b1 thru 230b4) are bonded to flow tube sheet (204b). Cantilever beams (230b1 thru 230b4) are constructed from bonded facesheet (177) materials, FIG. 17. Flow tube cantilever beam (230b1) and beam bracket (232b1) are not shown in FIG. 25. Flow tube cantilever beam brackets (232b1 thru 232b4) are constructed from steel or titanium materials. Flow tube cantilever beam brackets (232b2 thru 232b4) attach to flow tube cantilever beams (230b2 thru 230b4) with bracket hardware (239b2 thru 239b4). Flow tube cantilever beam bracket through holes (241b2 thru 241b4) and cantilever bracket holes (242b2 thru 242b4) include interface attach hardware.

FIG. 25 flow tube cantilever beams (230b2 thru 230b4) include beam holes (235b2 thru 235b4). Slots in flow tube cantilever beams (230b2 thru 230b4) are cut to linear flow assembly (200b) concentric ribs (240b1 thru 240b3). Flow tube diagonal ribs (246b1, 246b2, 246b4) provide additional support for flow tube cantilever beams (230b2 thru 230b4). Flow tube diagonal rib (246b3) is out of view in FIG. 25. Fence beam (237b) is bonded between beam brackets (232b1 thru 232b4), FIG. 25. Flow tube border rib (244b) forms and is bonded along flow tube sheet (204b) edge.

FIG. 26 is a sectional view to highlight flow tube cantilever beam (230b3), flow tube diagonal rib (246b1), and concentric ribs (240b1, 240b2) design interface. In FIG. 26, ribs form radially over beam doubler (236b3). Flow tube cantilever beam (230b3) attaches with flow tube cantilever doubler bond (245b3) to beam doubler (236b3). Flow tube concentric ribs (240b1 thru 240b3) bond with flow tube sheet fillets (249b). Rib (240b3) is out of view in FIG. 26. In FIG. 26, concentric ribs (240b1, 240b2) bond with flow tube beam rib fillets (248b). Ribs (240b1 thru 240b3) are bonded with fillets to beam doublers (236b), FIG. 26. Cantilever beam doubler (236b3) connects to flow tube sheet (204b) with doubler bond (245b3). Ribs (240b1, 240b2) are approximately 2.5 centimeters wide and 0.32 centimeters thick made of aluminum, plastic, or composite materials.

FIG. 27 shows detailed bonding interfaces between flow tube cantilever beam (230b3), flow tube diagonal rib (246b2), and concentric ribs (240b1, 240b2). Bonded interfaces include doubler bond (245b3), flow tube cantilever beam bond (247b4), flow tube beam rib fillets (248b3), and flow tube sheet fillets (249b).

Turboplant Assembly

Figure 28:
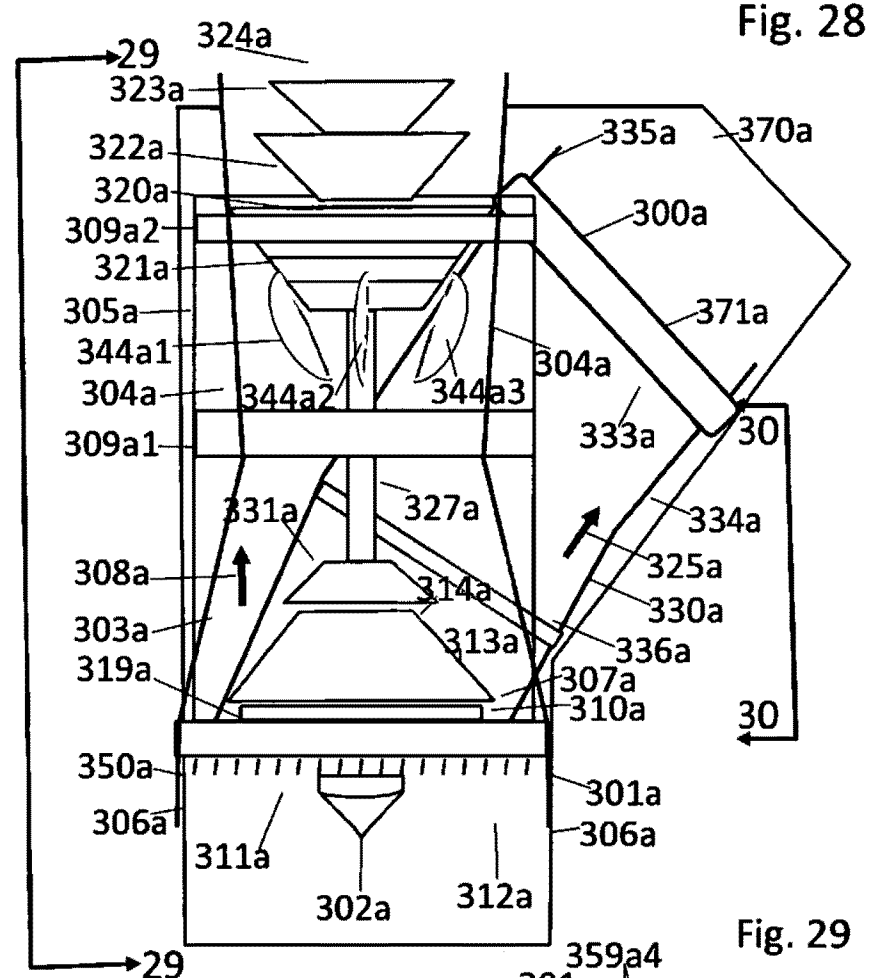

FIG. 28 shows 'a' side turboplant assembly (300a) as an overview. Features in FIGS. 28 through 37 are turboplant assembly, subassemblies, components, and elements, when designated with series '300' numeral, refer FIG. 2. The nearly identical side 'b,' turboplant assembly (300b), is similar to FIGS. 28 through 37. Subassemblies include: turbofan bulkhead (301a), compressor (310a), turbine (320a), turbofan tube (330a), stator (350a), thermal pressure seal (360a), and turboplant baseplate (370a). Turbine subassembly (320a) is separated and removed from turbofan tube subassembly (330a) with mechanical, thermal and pressure interfacing through the thermal pressure seal subassembly (360a), FIG. 30.

FIG. 28 is the plan view of turboplant assembly (300a). Turboplant housing (304a) is an annular converging and diverging structure with size determined from compressor (310a) and turbine (320a) subassemblies. Turboplant housing (304a) is a metal structure of high strength steel adjacent to turbofan tube subassembly (330a) and separate from turboplant housing structure (305a). Turboplant housing structure (305a) is a fabricated metal box structure, supports turboplant housing (304a), and interfaces with turbofan tube subassembly (330a). Turbofan tube (330a) is a pressure vessel of high strength steel and contains compressor subassembly (310a). Housing structure (305a) includes turboplant housing beams (309a1, 309a2) and turbofan housing ribs (326a), FIG. 29. Housing beams (309a1, 309a2) are fabricated from facesheet (177) or metal materials. Turbofan housing ribs (326a) is approximately 1.3 centimeters wide and 0.32 centimeters thick and made of metal or composite materials.

In FIG. 28, the turboplant flow separates between compressor section (307a) and turbine bypass cavity (303a). Within compressor section (307a), a compressor flow (325a) represents most of the turboplant flow and results in the working fluid (40). Inside turbine bypass cavity (303a), there is a turbine bypass flow (308a), which is much smaller flow than compressor flow (325a). Compressor section (307a) is of high strength steel construction supported by compressor ribs (337a1, 337a2), FIG. 30. Ribs (337a1, 337a2) are approximately 2.5 centimeters wide and 0.32 centimeters thick made of metal or composite materials. Compressor section (307a) has turbofan hub (302a), low pressure turbofan (311a), turbofan inlet (312a), and compressors (313a, 314a). Compressor shell (334a) is a pressure vessel supported by compressor shell beam (336a) and stator subassembly (350a). Compressor gearbox (319a) size is determined from compressor cavity (331a) cross section, is industry standard hardware, and mounts to stator subassembly (350a). Compressor subassembly (310a) is a multi-stage axial air compression device, which is designed for increasing total fluid pressure (404) and the working fluid (40) flow rate into compressor cavity (331a). Compressor subassembly (310a) forces approximately 90% of compressor flow (325a) into compressor cavity (331a). Compressor section (307a) cross section approximate size determines the 90% turbofan inlet (312a) area. Remaining 10% (approximate) is turbine bypass flow (308a), which supplies turbine subassembly (320a) and turbine bypass cavity (303a).

Power applies from turbine (320a) to compressor subassembly (310a) via multi spool drive shaft (327a). Multi spool drive shaft (327a) is modified application of industry standard hardware. Compressor gearbox (319a) distributes turbine (320a) power to compressors (313a, 314a). Low pressure turbofan (311a) connects with spool shaft (315a) through spool shaft hole (318a), FIG. 28, and turbofan bearing (367a), FIG. 29. Spool shaft hole (318a) allows turbine power through compressor shell (334a), FIG. 28. Materials and construction are industry standard for compressor gearbox (319a) and multi spool drive shaft (327a). Turboplant baseplate (370a) is constructed from facesheet material (177), or metal sheet materials, and supports turboplant assembly (300a), including turbine bypass cavity (303a).

Figure 29:
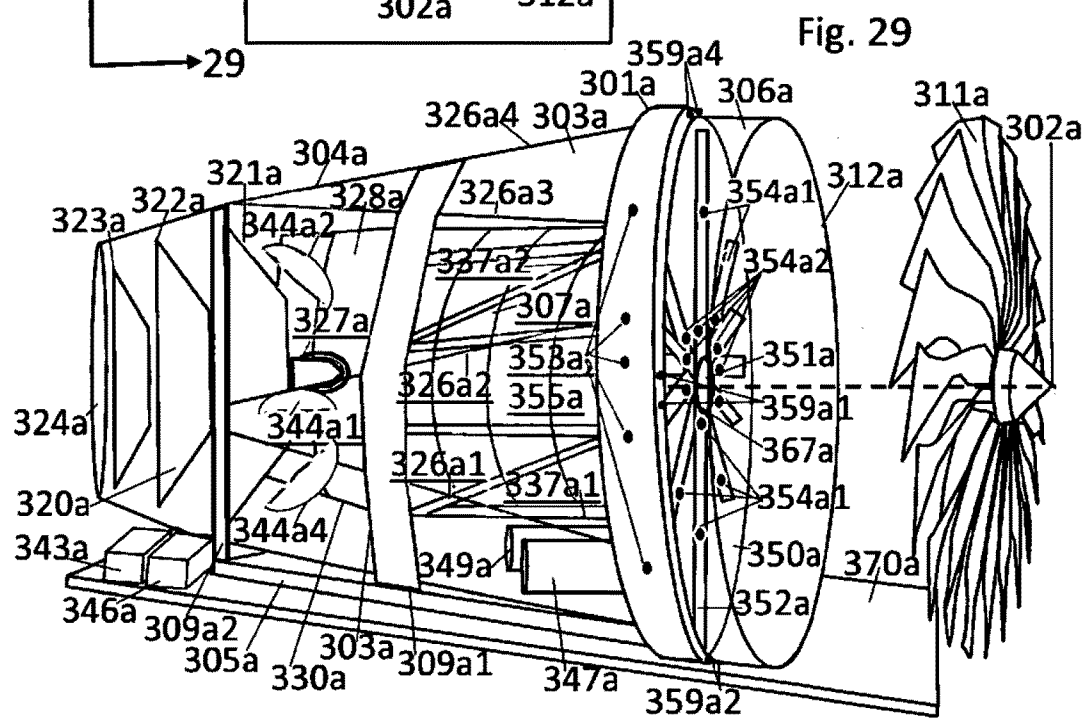

Turbine subassembly (320a) is external of turbofan tube subassembly (330a), in FIGS. 28 and 29. Low pressure turbine (321a), intermediate pressure turbine (322a), and high pressure turbine (323a) connect via multi spool drive shaft (327a) through spool shaft hole (318a) to compressor gearbox (319a) for turbines (322a, 323a). Spool shaft hole (318a) is enclosed by thermal pressure seal subassembly (360a) shown in FIG. 30. Turbine subassembly (320a) starts with combustion process from turbine fuel subassembly (344a1 thru 344a4), FIGS. 28 and 29. Turbine fuel process is managed with electronic fuel control (343a) and powered by battery storage (346a), FIG. 37. Gas combustion byproducts are expelled through turbine exhaust duct (324a) at housing (304a) exit.

FIG. 29 is a perspective view of turbine (320a) with interfaces to turbofan tube subassembly (330a). FIG. 29 shows turbofan inlet (312a) and turbofan (311a). Turbofan (311a) is centered about stator hole (351a). Turbofan bulkhead subassembly (301a) provides turboplant assembly (300a) structural stability. Both turboplant housing (304a) and turbofan cowling (306a) attach to bulkhead (301a). Turbofan inlet (312a) is formed by turbofan cowling (306a). Turbofan cowling (306a) has approximately twice the exit tube (192a) area, FIG. 14, and has an approximate size determined by low pressure turbofan (311a). Turbofan housing ribs (326a1 thru 326a4) and turboplant housing structure (305a) is weld bonded to bulkhead (301a). Compressor section (307a) attaches to stator subassembly (350a) at stator shell beam (356a), FIGS. 29 and 30, with stator attachment hardware (354a1). Stator attachment hardware (354a2) is for mounting compressor gearbox (319a). Stator subassembly (350a) has an equal number of stator vanes (352a) as mount point (353a) and stator mount hardware (355a) to bulkhead (301a). Bulkhead (301a) provides for mounting of electric generator (347a) and turboplant starter (349a). Electric generator (347a) and starter (349a) drive shafts pass through compressor shell (334a) and attach to compressor gearbox (319a).

Turbofan bulkhead subassembly (301a) interfaces with turbofan beam bracket interface (359a1 thru 359a4), FIG. 29. Turbofan beam bracket interface (359a1 thru 359a4) distributes structural loads for housing structure (305a) at bulkhead (301a), exit bulkhead beam (190a), and beam exit brackets (114a, 144a, 154a, 164a), refer FIG. 13. Bracket interface (359a1) secures linear beam exit bracket (114a). Beam bracket interface (359a2) ties to flow tube beam exit bracket (144a). Bracket interface (359a3) is associated with concave beam bracket (154a), hidden in FIG. 29. Beam bracket interface (359a4) ties to keel beam exit bracket (164a). Turboplant housing (304a) and turbofan cowling (306a) are weld bonded interface to bulkhead (301a). Tapered cavity bulkhead (333a) and tapered flange (335a) interface will secure housing structure (305a) with tapered cavity bulkhead bracket (338a), FIG. 30. Tapered flange (335a) is at turboplant assembly (300a) exit (371a). Bracket (338a) construction uses sheet metal or steel material with a sheet or wall thickness of approximately 0.16 centimeters. Construction of turbofan bulkhead (301a) and tapered cavity bulkhead (333a) is solid metal, such as steel or titanium.

Figure 30:
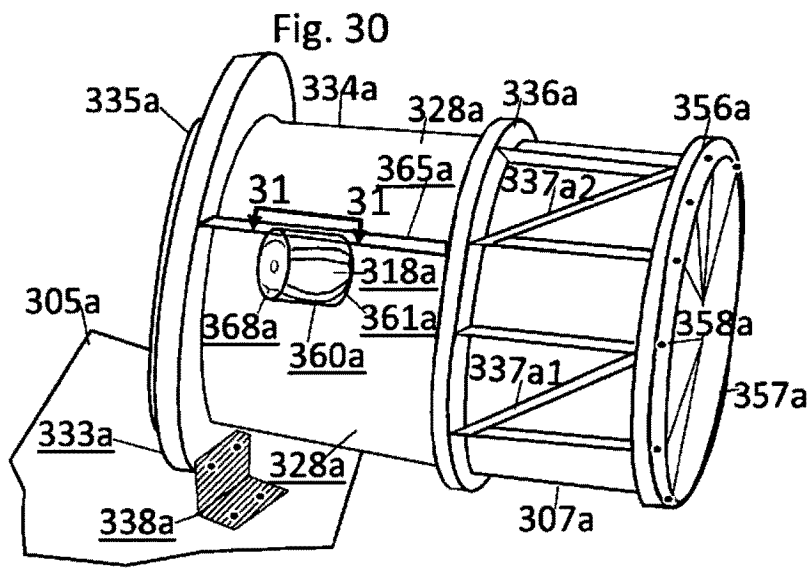
Figure 31:
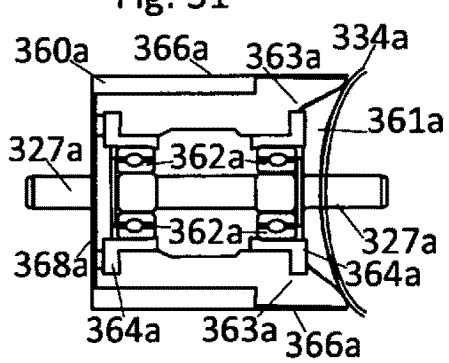
FIGS. 31 and 33 are enlarged views.

FIG. 30 is a perspective view of turbofan tube subassembly (330a), without turbine (320a) or compressor (310a) subassemblies. Thermal pressure seal subassembly (360a) provides passage for multi spool drive shaft (327a) through compressor shell (334a). Thermal pressure seal (360a)

maintains working fluid pressure with a pressure seal (361a) and supports drive shaft (327a) at spool shaft hole (318a), in the enlarged partial view of FIG. 31. Compressor cavity (331a) maintains pressure integrity with the pressure seal (361a). Thermal pressure seal subassembly (360a) also keeps heat outside of compressor cavity (331a) with a thermal seal (363a) and aft thermal shield (368a), FIG. 31. Turboplant shell mounting (366a) attaches to compressor shell (334a). Thermal pressure seal (360a) is metal fabricated subassembly with double roller bearings (362a). Thermal pressure seal (360a) is thermally enclosed in a bearing housing (364a) and supported by seal bracket (365a). Seal bracket (365a) is between compressor shell beam (336a) and tapered cavity bulkhead (333a), FIG. 30. Multi spool drive shaft (327a) is made of titanium. Thermal barrier shield (328a) is made of thermal resistant material, such as titanium.

Compressor section (307a) is shown with compressor ribs (337a1, 337a2) and compressor shell (334a), FIG. 30. Ribs span between compressor shell beam (336a) and stator shell beam (356a). Stator shell beam (356a) interfaces with stator subassembly (350a) at stator shell beam inserts (358a) locations near compressor section inlet (357a). Compressor shell (334a) attaches to housing structure (305a) with tapered cavity bulkhead bracket (338a). Bracket construction uses sheet metal or steel material with a wall thickness of approximately 0.16 centimeters. Compressor shell (334a) is high strength steel and titanium material. Shell (334a) can withstand internal compressor cavity (331a) pressure and thermal heating from turbine (320a), FIG. 30. Tapered flange (335a) interfaces with compressor section (307a) at turboplant assembly exit (371a).

Figure 32:
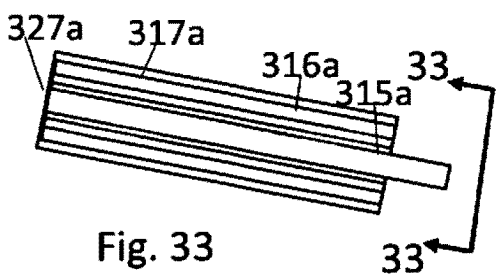
FIGS. 32 and 35 are sectional views.
Figure 33:
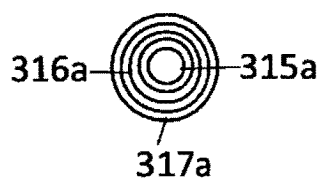

Multi spool drive shaft (327a) is a modified and adapted aerospace design from axial turboplant. Basic design of multi spool drive shaft (327a) is prior art. FIG. 32 shows sectional view of each axial compressor stage individually connected in series to dedicated concentric spool shaft: low pressure spool shaft (315a), intermediate pressure spool shaft (316a), and high pressure spool shaft (317a). Multi spool drive shaft (327a) design uses standard aerospace materials such as steel or titanium. Multi spool drive shaft (327a) applies mechanical power from turbine (320a), via thermal pressure seal subassembly (360a), and through compressor shell (334a) to compressor gearbox (319a). Drive shaft (327a) has a concentric design with an enlarge view in FIG. 33.

Figure 34:
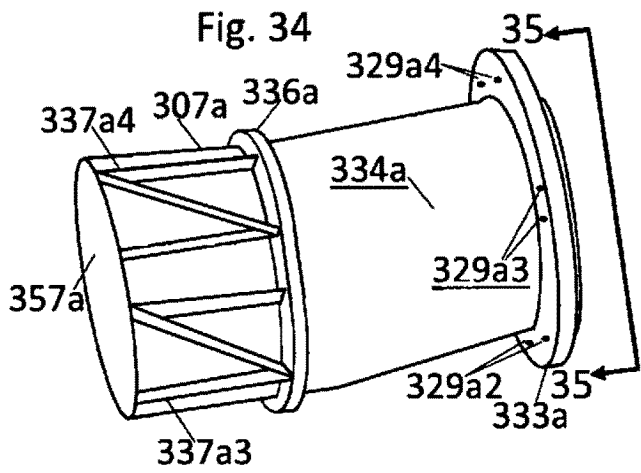

Tapered cavity bulkhead (333a) attachment points are bulkhead beam attachments (329a2, 329a3, 329a4), FIG. 34. Bulkhead beam attachment (329a1) is not seen in FIG. 34. Bulkhead (333a) interfaces to engine bulkhead beam (180a) with engine bulkhead beam holes (182a1 thru 182a4), refer to FIG. 8. Bulkhead (333a) has an accommodation for bolting hardware to attachment beam engine brackets (112a, 142a, 152a, 162a), refer FIG. 12. Compressor section (307a) shows compressor ribs (337a3, 337a4) structures. Stator shell beam (356a) is located near compressor section inlet (357a) and was removed from FIG. 34.

Figure 35:
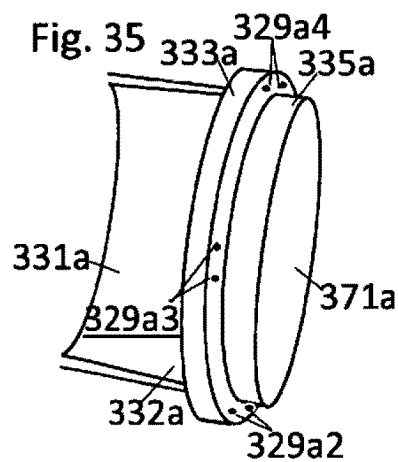
Figure 36:
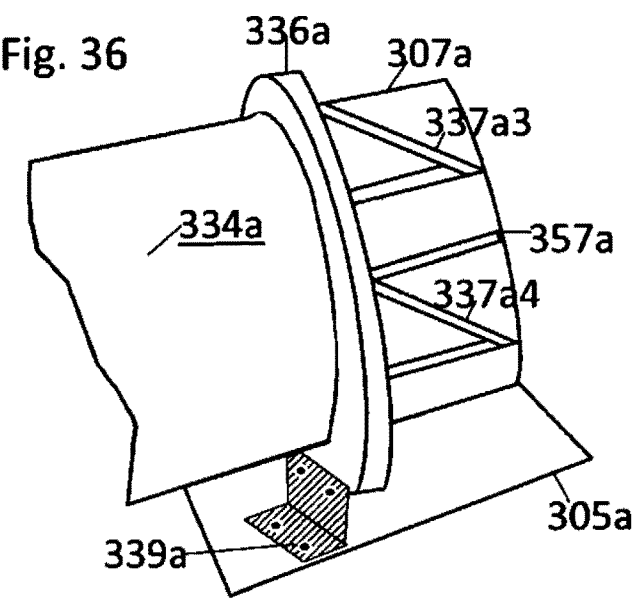
Figure 37:
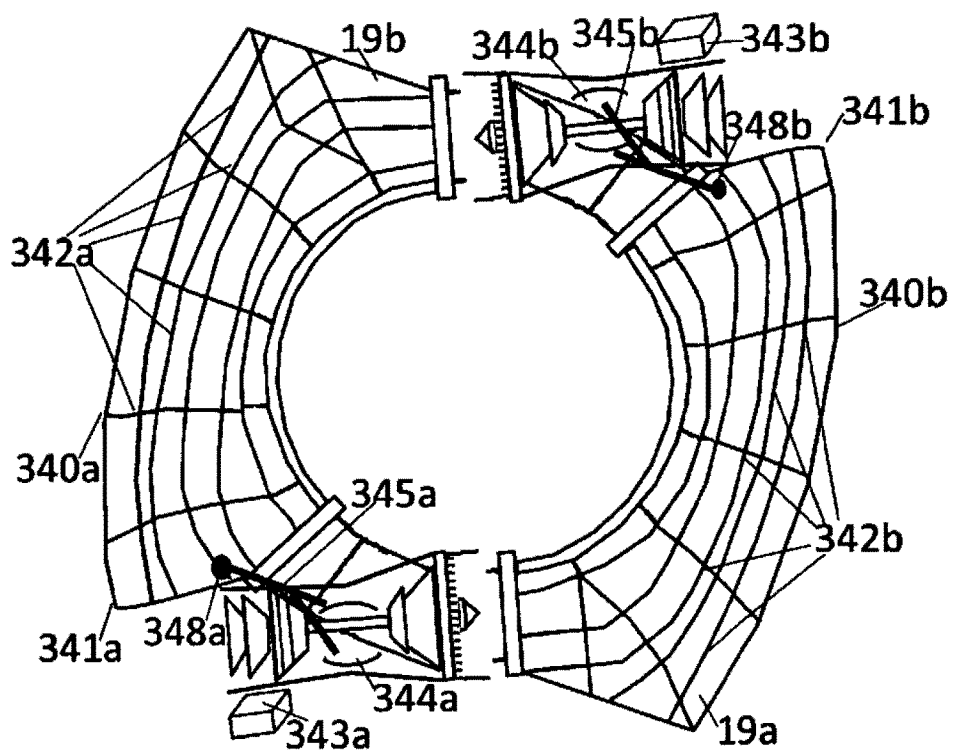
Figure 38:
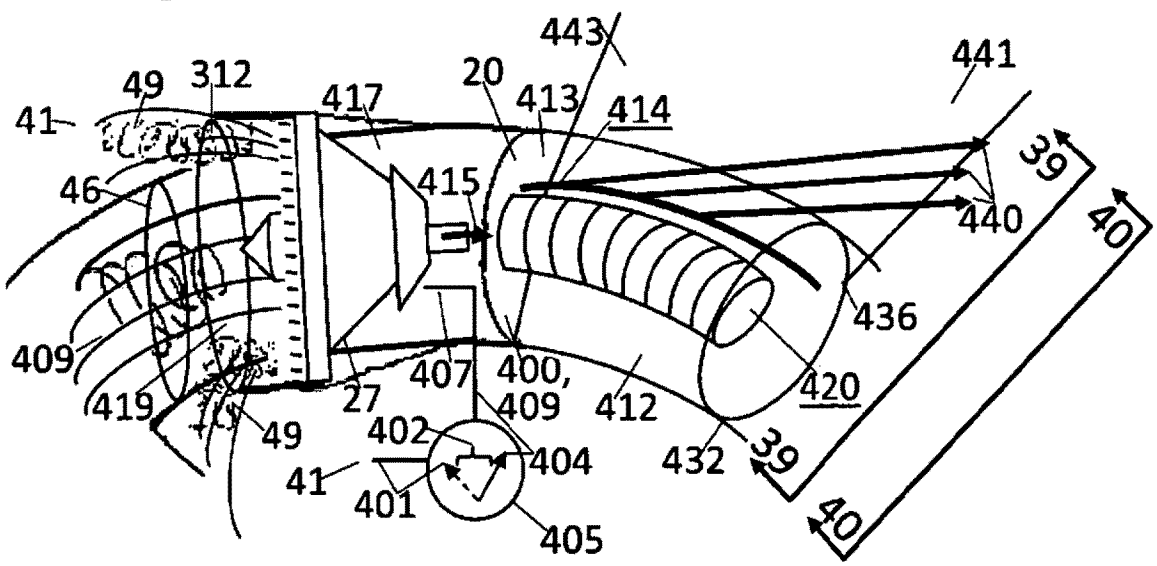
Figure 39:
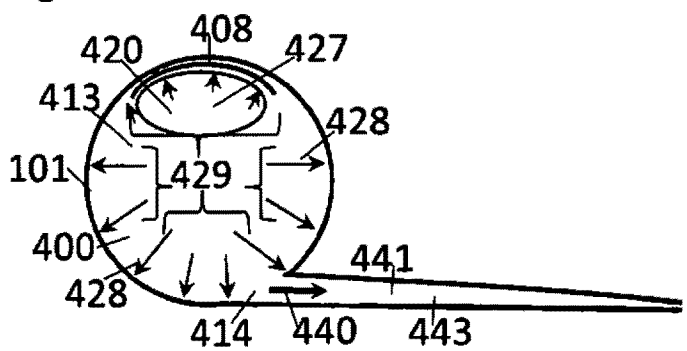
Figure 40:
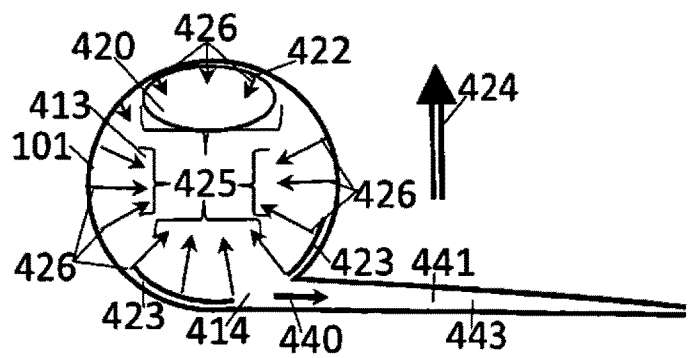
Figure 62:
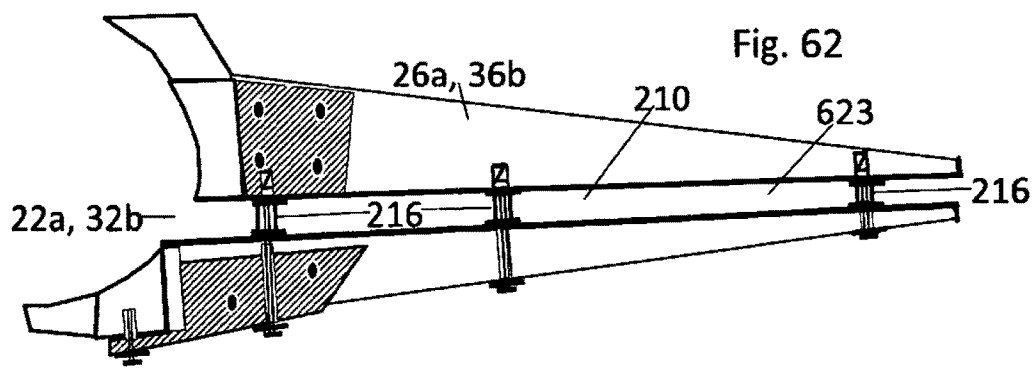
Figure 63:
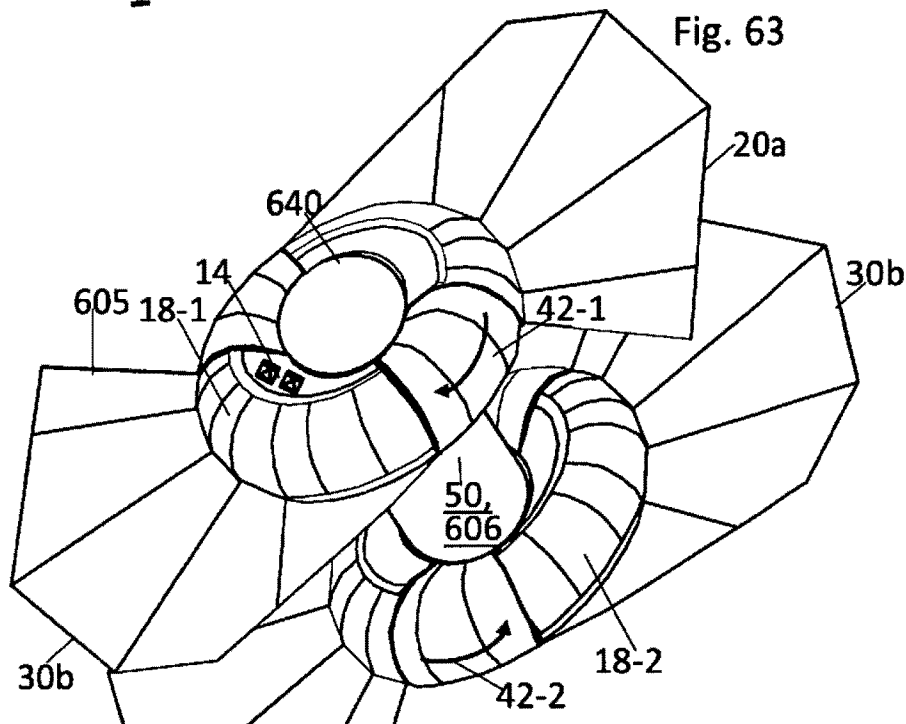
Figure 64:
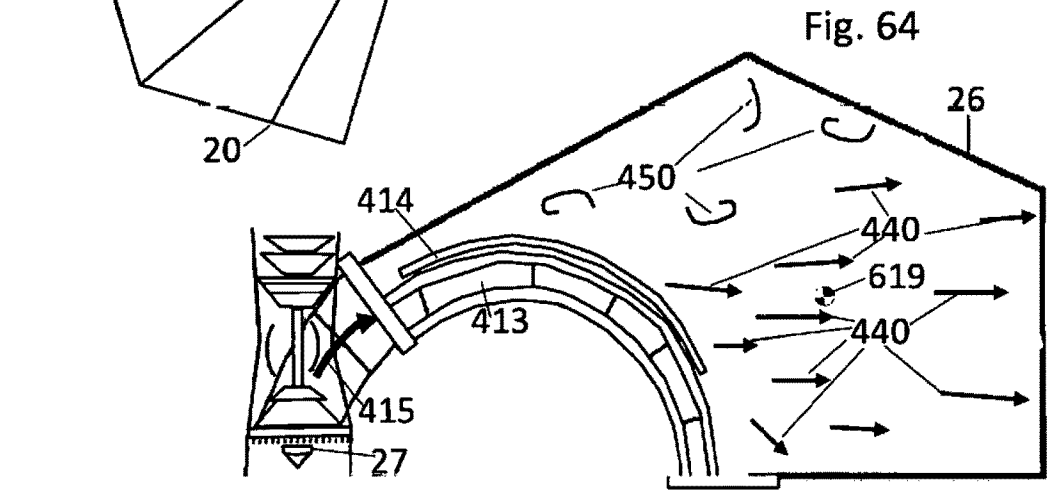
Figure 65:
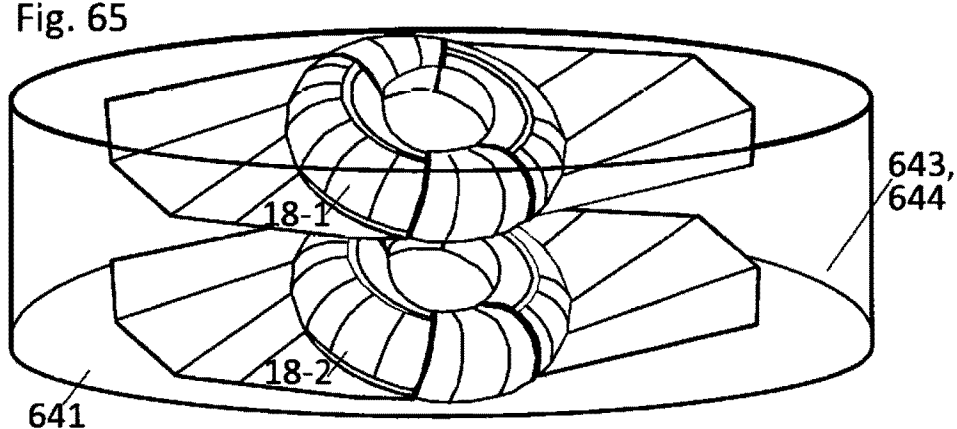
Figure 66:
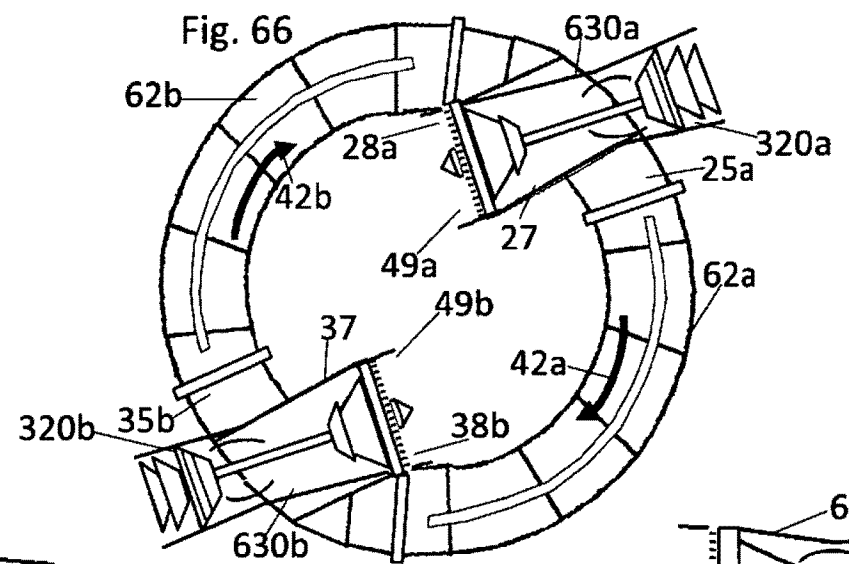
Figure 67:
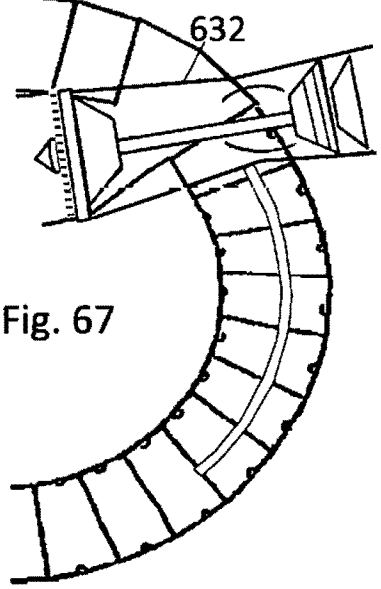
Figure 68:
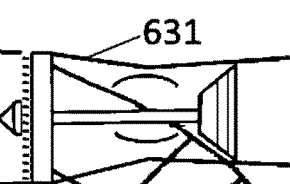

FIG. 35 is a sectional view of tapered cavity (332a). Tapered cavity (332a) has a size determined by an outside dimension of torus seal (105a), refer to FIG. 8. Tapered cavity (332a) circumferentially overlaps torus seal (105a) and provides for a tight tolerance sealed pressure joint. Tapered flange (335a) interfaces with tapered cavity bulkhead (333a) and forms external structure for tapered cavity (332a). Tapered cavity (332a) is located in compressor cavity (331a) at turboplant assembly exit (371a).

Figure 36:
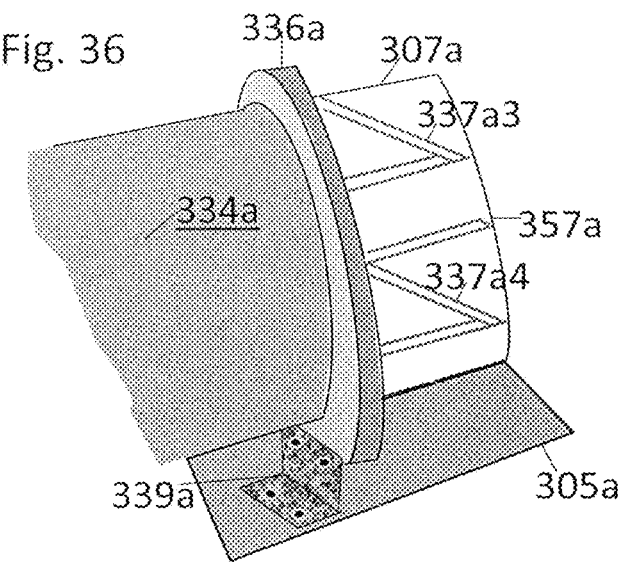
FIGS. 29, 30, 34, and 36 are perspective views.

FIG. 36 is a perspective view of compressor section (307a) for mounting to turboplant housing structure (305a) with compressor shell beam bracket (339a). Compressor shell beam bracket (339a) is a bonded and bolted interface to housing structure (305a). Compressor ribs (337a3, 337a4) are located on compressor shell (334a). Stator shell beam (356a) is located near compressor section inlet (357a) and is not shown in FIG. 36.

Figure 37:
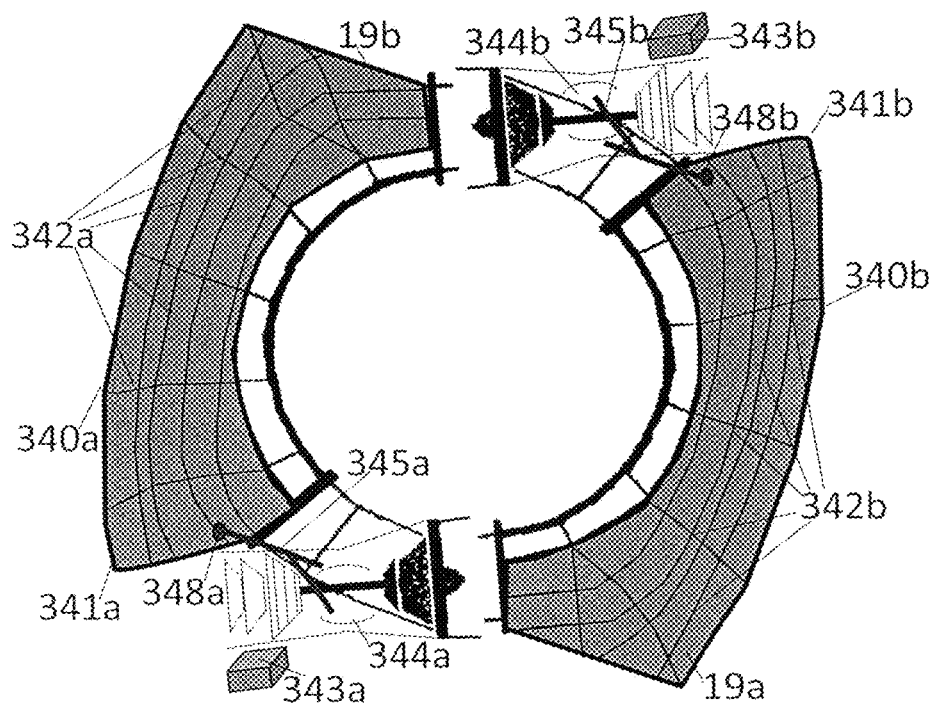
FIGS. 28 and 37 show turboplant including turbines, compressors, fuel reservoirs, and drive shafts as plan views.

FIG. 37 shows fuel tank subassemblies (340a, 340b) in a plan view. Fuel storage tanks (341a, 341b) are attached to linear flow structures (26a, 36b) at flow tube subassemblies (203a, 203b). Subassemblies (203a, 203b) are removed from FIG. 37. Fuel tank ribs (342a, 342b) provide for structural support. Fuel tank ribs (342a, 342b) are approximately 1.3 centimeters wide and 0.32 centimeters thick and made of aluminum, plastic, or composite materials. Tank fuel lines (345a, 345b) and electronic fuel controls (343a, 343b) manage fuel resources (19a, 19b). Turboplant fuel pumps (348a, 348b) are inside fuel tanks (341a, 341b). Fuel supply equipment is considered standard industry hardware. Electrical accessories are shown mounted in FIG. 29, including electric generator (347a) for electrical power generation, turboplant starter (349a), and battery storage (346a).

Subsonic Working Fluid

Figure 38:
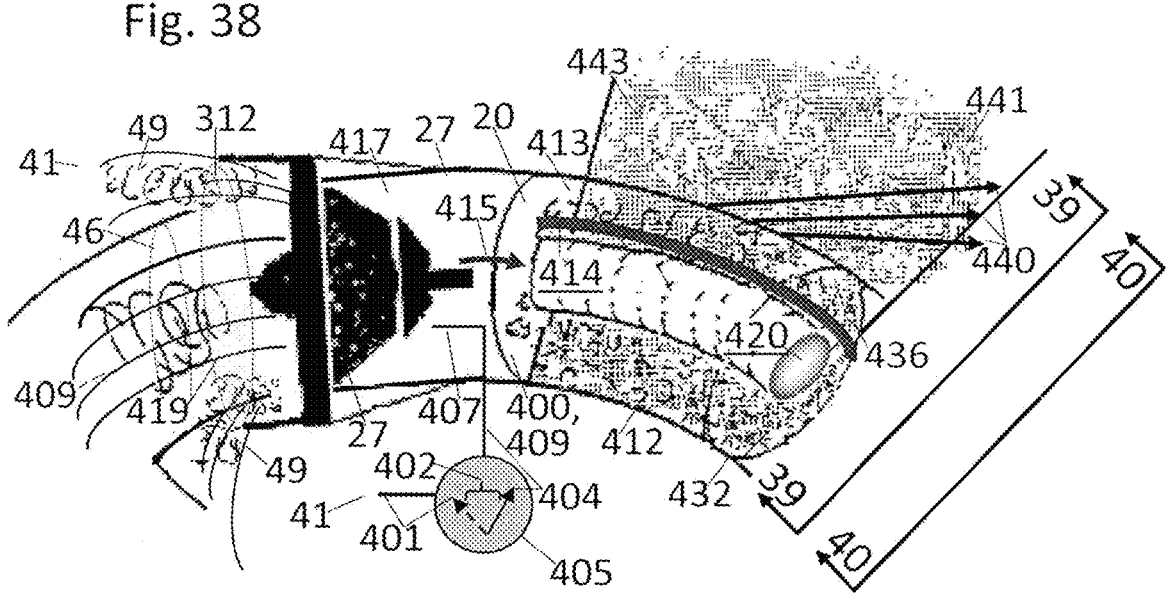

FIG. 38 shows circulating subsonic working fluid (400) within nearly confined toroid volume (413) in perspective view. In this section, side 'a' or 'b' designations are not used. Subsonic working fluid (400) is applicable to both 'a' and 'b' subsystems. Air (41) transforms into subsonic working fluid (400) after passing through lifting system (18), FIG. 2. Turboplants (27, 37) increases atmospheric air (41) pressure within turboplant confined volume (417) resulting in flow tube working fluid (409), FIG. 38. Atmospheric air (41) provides constant reservoir for subsonic working fluid (400) and resource for turboplants (27, 37).

FIG. 38 shows fluid pressure gauge (405) with readings open to atmospheric total pressure (401). Gauge pressure (405) dashed line is initial measurement of total pressure (401). Total pressure (401) of atmospheric air (41) is measured outside torus linear flow subsystem (20) and turboplant (27). Total fluid pressure (404) is measured inside nearly confined toroid volume (413). From gauge (405) readings, difference in total fluid pressure (404) and atmospheric total pressure (401) is atmospheric air pressure rise (402). Atmospheric air pressure rise (402) is controlled by turboplant (27). Torus tube flow (415) is centerline flow, and not limited to, measurements inside turboplant confined volume (417). Total fluid pressure (404) and torus tube flow (415) measurements are made with pressure pitot tube (407) to accuracies of 3%. Confined pressure ratio is the product of total fluid pressure (404) divided by atmospheric total pressure (401). Subsonic turboplants have confined pressure ratio up to 30, or total fluid pressure (404) of approximately 450 psia. Turboplant (27) provides turbofan suction (49), when turboplant (27) forces working fluid (400) into turboplant confined volume (417).

Atmospheric air (41) is forced into nearly confined toroid volume (413) at large angular flow rates, FIG. 38. Angular rate is defined by local torus tube flow (415) divided by large torus radius (61), FIG. 4. Torus tube flow (415) has a maximum subsonic speed of 335 meters per second for working fluid (40) at standard sea level conditions. In addition, torus tube flow (415) is measured along torus centerline (66), FIGS. 6, 42 and 43. When working fluid (40) angular flow rate is increased above 9 Hz, an energy boundary condition is met. At this point, confined turbulent flow (412) will transition into fixed position toroidal flow field (410) and poloidal flow field (420), FIG. 44. Working fluid (40) angular rates are not limited to 9 Hz. For example, a search and rescue lifting system (18) has an angular rate of 53.3 Hz with large torus radius (61) of 1 meter and maximum subsonic working fluid (400), torus tube flow (415) of 335 meter per second.

Ram flow (419) is an effect of flow tube working fluid (409) at turbofan inlet (312), FIG. 38. Ram flow (419) allows for recirculation of flow tube working fluid (409). Turbofan inlet (312) area is determined from approximately twice the area of torus cavity exit (46). These dimensions allow for turboplant (27) to ingest ram flow (419) and provide turbofan suction (49) of atmospheric air (41), which is a novel feature of the present invention. Poloidal flow field (420) strength is a direct result from turboplant (27) the total fluid pressure (404), an unobvious feature in the present invention. Uniform flow field (440) results from fluid flow opening (414), and is generally perpendicular to torus tube flow (415) inside turboplant confined volume (417), which is an unobvious feature. The perspective view in FIG. 38 does not show uniform flow field (440) at right angles to torus tube flow (415), refer to FIGS. 41 and 44. Linear flow working fluid (443) is inside the nearly confined linear flow volume (441) in FIG. 38.

Figure 39:
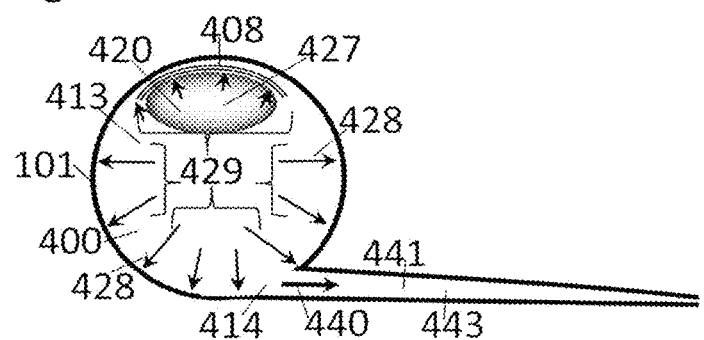

FIG. 39 shows an enlarge view from FIG. 38 of subsonic working fluid (400), including poloidal flow field (420), nearly confined toroid volume (413), uniform flow field (440), and nearly confined linear flow volume (441). Detailed in FIG. 39 is working fluid (400) fluid pressure distribution (429). Fluid pressure distribution (429) is pointed outward against torus cavity surface (101) in radial directions. Fluid pressure distribution (429) is the directional sum of all local normal pressure (428). Poloidal flow field (420) is a low pressure cell (427) within confined toroid volume (413). Low pressure cell (427) locally reduces fluid pressure distribution (429) on torus cavity surface (101), represented as effective pressure area (408). Uniform flow field (440) results moving flow tube working fluid (409) through fluid flow opening (414) and into nearly confined linear flow volume (441).

Figure 40:
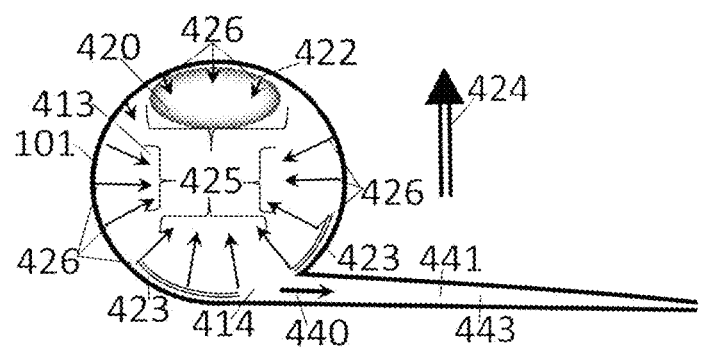
Figure 62:
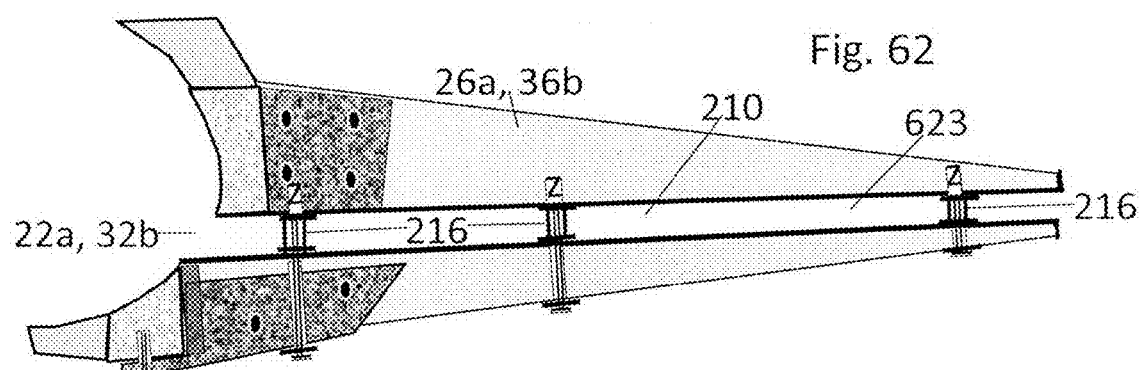

FIG. 40 shows an enlarge view from FIG. 38, similar to FIG. 39. Difference being, FIG. 40 is free body diagram (422) representing all the many normal pressure forces (426). Resultant force (424) comes by pressure force distribution (425) of many incremental normal pressure forces (426) on the torus cavity surface (101), FIG. 40. Applied force area (423) is defined from resultant force (424) divided by fluid pressure distribution (429). Resultant force (424) is directly proportional to applied force area (423). Resultant force (424) is perpendicular to a plane formed by uniform flow field (440). The resultant force (424) relates to subsonic working fluid (400) transfer of rotational energy, which is fully described in OPERATION section.

Flow tube working fluid (409), FIG. 41, moves from nearly confined toroid volume (413) through fluid flow opening (414), and into nearly confined linear flow volume (441). Location of fluid flow opening (414) is along working fluid (400) internal concave flow surface (436), FIG. 38. Rate of flow tube working fluid (409) through fluid flow opening (414) is determined by approximately 25% to 30% of turboplant (27) flow rate and is controlled by size of fluid flow opening (414). There are two flow patterns inside confined linear flow volume (441), uniform flow field (440) and turbulent linear field (450). Turbulent linear field (450) is located adjacent to linear flow suction (446) of linear flow structure (26, 36). Uniform flow field (440) leaves the nearly confined linear flow volume (441) at uniform flow exit (207).

FIG. 41 illustrates linear flow suction (446) and linear exit flow (442). Uniform flow field (440) pressure causes linear flow suction (446) and linear exit flow (442). Uniform flow field (440) dominates the converging and nearly confined linear flow volume (441). Uniform flow field (440) is predominately in a perpendicular direction to torus tube flow (415) exiting turboplant (27), FIG. 38. Uniform flow field (440) velocity reaches maximum value near cantilever and flow tube subassemblies (202, 203) center of mass (205). As uniform flow field (440) leaves confined linear flow volume (441), it is identified as linear exit flow (442).

Air aspiration flow (430) is an action of atmospheric air (41) being drawn into nearly confined toroid volume (413). Aspiration flow (430) is along working fluid (400) internal convex flow surface (432) and internal concave flow surface (436), FIGS. 38 and 41. Amount of aspiration flow (430) is controlled and determined by aspiration sites (131a1 thru 131a12) size, refer FIGS. 7, 8, 9, 10, and 14. By controlling aspiration flow (430), fluid pressure distribution (429) is altered inside confined toroid volume (413). Fluid pressure distribution (429), FIG. 39, and flow details are explained in FIGS. 42 and 43. Aspiration flow (430) changes fluid pressure distribution (429) and alters effective pressure area (408), FIG. 39, which effects resultant force (424), FIG. 40. FIG. 43 is reduced view of FIG. 44.

Detailed discussion on conservation of angular momentum for torque free motion is in the OPERATION section and applies to FIGS. 42 and 43. Stable toroidal flow field (410) contains poinsot flow field (411). Poinsot flow field (411) align with torus tube flow (415), having positive (411,p) and adverse (411,a) directions. Adverse poinsot flow field (411,a) is directed opposite torus tube flow (415). The fixed location of poinsot flow field (411) are governed by torque free conservation of angular momentum within nearly confined toroid volume (413), FIG. 43. Poinsot flow field (411) is a true vector fluid flow field, since the vector field has both magnitude and direction. Torus knot (421) is provided for reference, FIG. 43. Since these locations are fixed, aspiration sites (131) are also fixed for implementation of air aspiration flow (430) and controls, refer FIGS. 7, 8, 9, 10, and 14.

Largest values for poinsot flow field (411) are near the internal convex flow surface (432) and internal concave flow surface (436), FIG. 42. Positive poinsot flow field (411,p) adds fluid velocity to torus tube flow (415). While adverse poinsot flow field (411,a) reduces fluid velocity to torus tube flow (415). Maximum fluid velocity differences are approximately 20% between internal convex flow surface (432) and internal concave flow surface (436). Use and location of aspiration flow (430) provides relief to toroidal flow field (410) along internal convex flow surface (432) and internal concave flow surface (436). Effects of adverse poinsot flow field (411,a) are greatest along those surfaces, refer FIG. 42. Poinsot flow field (411) are an unobvious feature in the embodiments of the present invention.

Physical attributes of subsonic working fluid (400) are shown in FIG. 44, without turboplants (27, 37). Working fluid (400) three independent flow fields include uniform flow field (440), toroidal flow field (410), and poloidal flow field (420). Each of the flow fields has unique direction, magnitude, and independent angular momentum. Each flow field has fixed stable positions within confined toroid volume (413) and confined linear flow volume (441). Each stable independent flow field result from fundamental rotational energy transfer process with changes in angular momentum tied to a conservative field. Transfer of rotational energy is called fluid energy flow (418), FIG. 45, described in OPERATION section. Resultant force (424) reaction results uniquely from the energy transfer. Poloidal flow field (420) is embedded within toroidal flow field (410) and localized in confined toroid volume (413). Toroidal flow field (410) has turbulent flow (412) feature, FIG. 38, and is cyclic within confined toroid volume (413). Uniform flow field (440) is directed straight line field, confined in linear flow volume (441). Location of linear exit flow (442) is shown in FIG. 44. Unified toroidal flow field (410) and poloidal flow field (420) dynamics is an anapole field (416).

Superposition or physical combination of uniform flow field (440) and poloidal flow field (420) is a novel feature in the present invention and is called sigma effect (444), FIG. 44. The sigma effect (444) results from straight line uniform flow field (440) and poloidal flow field (420). Resultant force (424) and sigma effect (444) relates to fundamental principles of energy motion in a conservative field: including conservation of mass momentum with equal and opposite reaction forces. Superposition of flow fields is a basic study in aerodynamic theory.

There are several ramifications for this design. For example, there is an alternative design of two independent lifting systems (18-1, 18-2) attached with a carrier subsystem (50). With this double tori embodiment, resultant force (424) is applied in either direction based on the configuration, FIG. 61. One design variant is adapted for exoatmospheric (in-space) operations with fully recirculating working fluid (400), FIG. 46. Further, the machine (10) can operate as an unpiloted or piloted controlled cargo carrier. These ramifications are sample applications detailed in the OPERATION and ALTERNATIVE EMBODIMENTS sections below.

Operation

In this section, side 'a' or 'b' designations are not used. Machine (10) operation is based on torque free conservation of angular momentum within nearly confined toroid volume (413), FIG. 44 in perspective view, which applies to both sides 'a' and 'b.' Angular momentum is a product of subsonic working fluid (400) angular flow rates and mass moments of inertia. Mass moments of inertia are defined by working fluid (400) mass distribution within nearly confined toroid volume (413) and nearly confined linear flow volume (441). Working fluid (400) mass moments of inertias are defined about the origin at torus centroid (60). There are three independent working fluid (400) mass moments of inertia, including major, transverse, and minor. Major mass moment of inertia is the largest mass distribution, relates to toroidal flow field (410), represents the minimum rotational energy state, and is the most stable. For confined toroid forms, major mass moment of inertia is approximately twice the value of minor mass moment of inertia and represents lowest rotational energy state. Minor mass moment of inertia relates to the smallest mass distribution and is associated with poloidal flow field (420). In the physics of rotational dynamics, minimum angular momentum represents the maximum rotational energy state and is conditionally stable about minor mass moment of inertia. Transverse mass moment of inertia value is approximately 20% larger than minor mass moment of inertia.

Large angular rate motion of subsonic working fluid (400) is a unique embodiment in the present invention, from the torque free conservation principles of angular momentum and rotational kinetic energy. Angular momentum and rotational kinetic energy exist simultaneously for minimum (poloidal flow field, 420) and maximum (toroidal flow field, 410) inertial axes, FIG. 44. Conservation principles identify poloidal flow field (420) as maximum rotational energy state and toroidal flow field (410) as minimum energy state. Physical process of energy transfers is always stable while moving from distinct maximum to minimum energy states. This energy process results in the operating machine being in dynamic equilibrium, continuously. This operational condition of dynamic equilibrium in torus tube flow (415) is observable during experimental testing.

For working fluid (400) torque free conservation of angular momentum, rotational energy can transfer in one distinctive direction from maximum energy state poloidal flow field (420) to minimum energy state toroidal flow field (410). The conservation of angular momentum and rotational energy transfer is a different method of assessing external resultant force (424) reaction, compared to applied force area (423) approach in SUBSONIC WORKING FLUID section. FIG. 45 shows the mechanism for transferring of fluid energy flow (418) via uniform fluid flow field (440). Similar to torque free conservation of angular momentum, fluid energy flow (418) transfers along the transverse mass moment of inertia, associated with uniform fluid flow field (440) of linear flow working fluid (443). This dynamic, stable energy exchange is analogous to reservoir of water falling over a dam, where the water's fluid energy flow is transferred from maximum to minimum energy state. For working fluid (400) in FIG. 40, resultant force (424) is extracted as an external force during the stable energy exchange from maximum to minimum state. Verifiable model test data supports this energy state transfer with at least a 10% reduction in subsonic working fluid (400) angular momentum.

Transferring angular momentum and rotational energy is nearly an isothermal process at low atmospheric pressure rise (402). In real fluids, there is heat transfer due to friction for working fluid (400) that flows through fluid flow opening (414) between confined linear flow volume (441) and confined toroid volume (413). Energy effects from fluid friction in confined toroidal volume (413) are less than 3% at small atmospheric pressure rise (402). During model experiments, little or no heat energy transfer was observed or measured in working fluid (400) at low atmospheric pressure rise (402), indicating nearly isothermal process. Since little heat energy is needed for subsonic working fluid (400), this isothermal operational feature adds to the machine (10) efficiency. With subsonic turboplants having atmospheric pressure rise (402) up to 30 times atmospheric air (41), working fluid (400) thermal heating processes will be considered.

Machine (10) operation uses two external resources for functional utility: atmospheric air (41) and fuel resource (19), refer to FIG. 2. When air and fuel are combined within lifting system (18) supporting combustion and causing subsonic working fluid (400), lifting system becomes an operational machine (10). Fuel tank subassembly (340) enables fuel resource (19) to be provided to turboplants (27, 37), and atmospheric air (41) is ubiquitous below the stratosphere with an altitude of less than 30 kilometers. Operational scenarios include machine (10) ascent and descent in atmospheric air. Modes of operation include control, translation, and hovering.

For ascent capability, the machine (10) resultant force (424) is greater than machine (10) mass multiplied by earth's gravitational acceleration, 9.8 meters per second per second. To generate machine (10) resultant force (424), an operator initiates turboplant starter (349) on both turboplants (27, 37). Adding fuel to turbine subassembly (320) with electronic fuel control (343) causing an increase compressor subassembly (310) rotation speed. This action moves working fluid (400) inside torus linear flow subsystems (20, 30), resulting in the machine (10) accelerating due to resultant force (424). If the acceleration is greater than earth's gravity acceleration, machine (10) will ascend. When acceleration from resultant force (424) is less than earth's gravity acceleration, machine (10) will descend towards the earth. If the machine is hovering in level flight, then the machine acceleration is slightly above 1 g. Machine (10) can translate from one point to another on earth's surface with constant acceleration greater than 1 g. With an acceleration of greater than 1 g and optimal 45 degree ascent flight path angle, machine (10) reaches an apogee, which is the highest point of a trajectory. With a descending acceleration of less than 1 g, machine (10) can maneuver to minimal force landing on the earth surface.

The primary method to maintain machine (10) attitude is throttle control (14) with turboplants (27, 37) and electronic fuel control (343). For example, turboplant (27) with added fuel (19) increases the resultant force (424) in torus linear flow subsystem (20), which rotates the machine (10) towards torus linear flow subsystem (30) with lesser fuel. Turboplant (27) is coupled due to ram flow (419) into downstream turboplant (37). Electronic fuel control (343) uses feedback controllers to automatically manage coupling between turboplants (27, 37). The controllers ensure control, while lifting system (18) turns to the direction of torus linear flow subsystem (30) with lesser applied fuel (19). When lifting system (18) turns, an added torque is applied by the change in direction of working fluid (400) angular momentum. The added torque is 90 degrees to the initial lifting system (18) turn direction. Additional body torque is adjusted with flywheel compensator (58).

Operations require control and handling of machine's (10) attitude. Small differences in nearly identical turboplants (27, 37) can affect lifting system (18) performance. Trimming imbalances in turboplants (27, 37) performance is done with air aspiration flow (430). Controlling amounts of aspiration flow (430) through torus linear flow subsystems (20, 30) aspiration sites (131) alters working fluid (400) flow, which affects magnitude and direction of resultant force (424) and machine (10) acceleration. Also, small center of gravity offset from unbalanced payloads can cause uncompensated torques, which can be adjusted with air aspiration flow (430).

Alternative Embodiments

FIGS. 46 through 68 are illustrations of alternative embodiments, where the design variants are designated with series '600' numerals. Side 'a' and 'b' designators are used, where appropriate. Numerals with dash designations are used for different alternative embodiment configurations. For example, curve beam designs are identified as -1 for solid beam and -2 for composite beams. One alternative embodiment is an adaptation for in-space (exo-atmospheric) propulsion with recirculation of working fluid and stored supply of atmospheric air. The alternative embodiment for in-space applications, known as Solar Electric Propulsion (SEP), results in propellant-less, clean propulsion. This technology reduces duration of higher orbit transfer and increases payload mass to higher in-space orbits.

Alternative embodiment in FIG. 46 provides an electric motor compressor assemblies (650a, 650b) in plan view. This embodiment includes electric motor gearbox (609a, 609b), not shown in FIG. 46, recirculation ducts (629a, 629b, 633a, 633b, 646a, 646b, 648a, 648b), volute pump flows (658a, 658b), and forced secondary linear flows (659a, 659b). Each compressor assemblies (650a, 650b) has an input power of, but not limited to, 10 kilowatts. With at least two 10 kilowatt compressor assemblies (650a, 650b), total system power is 20 kilowatts. These electric motor compressor assemblies (650a, 650b) rotate at speeds greater than 500 Hz. Compressor assemblies (650a, 650b) have confined pressure ratio of, but not limited to, 2% and 50% total pressure inside nearly confined toroid volumes (413a, 413b), refer FIG. 38. Recirculation volute motor (655), recirculation volute pump (654), and recirculation volute housing (653) provide volute pump flows (658a, 658b).

In FIG. 46, aspiration fluid flow from volute pump (654) forces volute pump flow (658) through torus tube aspiration ducts (646a, 646b) and into torus cavities (25a, 35b) via aspiration sites (131a, 131b). FIGS. 47 and 48 show secondary linear flows (659a, 659b) and linear flow motor pumps (656a, 656b). Working fluid for secondary linear flows (659a, 659b) comes from nearly confined toroid volumes (413a, 413b), refer FIGS. 38 and 46. Fluid flow is forced through linear flow ducts (648a, 648b) into torus linear flow subsystems (20a, 30b).

Turboplant suction slots (649a, 649b) provide for ingesting working fluid into electric motor compressor assemblies (650a, 650b) with a size determined by torus linear flow subsystems (20a, 30b) cross-section area ratio. Minimum of 2 to 1 area ratio is provided for suction slots (649a, 649b) area and torus linear flow subsystems (20a, 30b) cross-section area. In FIG. 46, linear flow exit ducts (629a, 629b) provide for collecting linear exit flow fields (442a, 442b). Recirculation flows (642a, 642b) are from linear exit fields (442a, 442b) to compressor assemblies (650a, 650b) inlet. Compressor assemblies (650a, 650b) provide turbofan suction (49) at turbofan inlets (312a, 312b). Turbofan suction (49) allows for linear exit flow fields (442a, 442b) to be ingested into compressor assemblies (650a, 650b). Recirculation ducts (633a, 633b) designs include pressure joints (651a, 651b) with no loss of working fluid. Linear flow motor pumps (656a, 656b) take less than 2% of working fluid (40) from torus linear flow subsystems (20a, 30b). Linear flow motor pumps (656a, 656b) are applied to forced secondary fluid flows (659a, 659b) into linear flow ducts (648a, 648b).

In-space SEP electric power assembly (660) originates with solar array (662). Power is stored in battery subassembly (664), FIGS. 51 and 49 in a plan view. Power processing subassembly (665) regulates voltage from solar array (662) and battery subassembly (664) to electronic motor controller (652), FIG. 49, via signal lines (not shown), input power (666) and return power (667) lines. Electronic motor controller (652) provides separate electronic throttle control (657) to electric motor compressor assembly (650), recirculation volute motor (655), and linear flow motor pumps (656) speed. Electric ground (668) for the electrical power assembly (660) is identified.

FIG. 51 shows reservoir panel (638) for mounting propellant tank reservoir (635) and oxidizer tank reservoir (634) in perspective view. Propellant tank lines (627) and oxidizer tank lines (626) are not shown in FIG. 51. Propellant tank mounting (637) and oxidizer tank mounting (636) supplies are on the backside of reservoir panel, out of view in FIG. 51. Working fluid reservoir (640), in FIGS. 51 and 50, provide for pressure regulation of working fluid to recirculation ducts (629a, 629b, 633a, 633b, 645a, 645b, 646a, 646b), bypass compressor manifolds (647a, 647b), and forced linear flow ducts (648a, 648b) in FIG. 46. Working fluid reservoir (640) has pressure of at least 50 atmosphere and is depicted as a cylindrical tank with half the tank (640) shown in FIG. 51. Reservoir panel (638) attaches to turboplant baseplate (370*a*, 370*b*), represented in FIGS. 28 and 29 as side 'a.' Working fluid reservoir (640) has a reservoir flow regulator (639) for managing regulated pressure line (628). FIG. 50 shows a switching reservoir flow regulator (639). Working fluid reservoir (640) tank pressure is also used to pressurize propellant tank reservoir (635), oxidizer tank reservoir (634), and propellant lines (627).

FIG. 52 recirculation assembly is similar to electric motor recirculation assembly in FIG. 46, with difference being the power plants consisting of turboplants (27*a*, 37*b*), including turboplant combustors (29*a*, 39*b*). The fueled turboplants (27*a*, 37*b*) have significantly higher thrust performance compared to existing solar electric for in-space propulsion, because of fuel propellant consumption. In addition, existing chemical rockets uses rocket propellant for their working fluid, where in this embodiment, propellant is only used to power turboplants (27*a*, 37*b*), separate from working fluid (40). Turboplants (27*a*, 37*b*) provide recirculation flow with bypass compressor manifolds (647*a*, 647*b*) for working fluid (40). Bypass compressor manifolds (647*a*, 647*b*) redirect less than 5% of compressor flow (325). Redirected flow goes to linear flow suction ducts (645*a*, 645*b*) and torus tube aspiration ducts (646*a*, 646*b*). Torus tube aspiration ducts (646*a*, 646*b*) are located on torus concave surfaces (108*a*, 108*b*) of torus linear flow subsystems (20*a*, 30*b*). In FIG. 52, torus tube aspiration duct (646*c*) is located out of view on convex surfaces (106*a*, 106*b*). Linear flow suction ducts (645*a*, 645*b*) and torus tube aspiration ducts (646*a*, 646*b*) are pressure sealed.

Three variable width aspiration sites (613*a*3, 613*a*4, 613*a*5) are shown in FIG. 53 with largest width towards keel beam subassembly (160*a*). Torus tube aspiration duct (646*a*) is removed in FIG. 53. Linear flow exit ducts (629*a*, 629*b*) provide for collection of linear exit flow fields (442*a*, 442*b*), FIG. 52. Compressor recirculation ducts (633*a*, 633*b*) and low pressure turbofan (311) provide suction at turbofan inlets (312*a*, 312*b*) for recirculation flows (642*a*, 642*b*). Recirculation duct designs include pressure joints (651*a*, 651*b*). FIG. 52 identifies several alternative subsystem embodiments. Linear flow honeycomb panel (620*a*) and linear flow composite plate (621*b*) provide for structurally strengthening torus linear flow subsystems (20*a*, 30*b*). Flow tube external rib structures (615*a*, 615*b*) provide for adding load carrying capability to torus linear flow subsystems (20*a*, 30*b*). Turboplants (27*a*, 37*b*) and torus linear subsystems (20*a*, 30*b*) are attached with structural bonded interfaces (607*a*, 607*b*).

Alternative embodiments for two curve beam designs (617*a*) are shown in plan view, FIG. 54. Shell beam (170*a*) and exit bulkhead beam (190*a*) subassemblies are shown in FIG. 54. In FIG. 54, curve beam alternative embodiment designs are shown. Curve beam design (617) style identification is solid beam -1 and composite beam -2. Solid beam (617*a*-1) is shown for semicircular beam form, and composite beam (617*a*-2) is identified for two separate beam shapes. Curve beam forms (618) identification is I-beam -1, triangular -2, and semicircular -3 beams. Curve beam forms include 'I' beam (618*a*-1), triangular (618*a*-2), and semicircular (618*a*-3).

FIG. 55 shows plan view of an alternative embodiment for racetrack subsystems (601*a*, 601*b*) with a size determined from geometric torus (62). Linear flow structures (26, 36) are not shown in FIG. 55. Racetrack subsystems (601*a*, 601*b*) result from altering geometric torus (62) angular displacement (64) and chord arc length (63), refer to FIG. 6. For example, in FIG. 55, racetrack subsystems (601) form results from chord arc length larger than geometric torus (62) chord arc length (63). FIG. 55 illustrates design with extended kepler tubes (603) located forward of turboplant inlet (28*a*, 38*b*). Kepler tubes (603) can be located aft of turboplants (27*a*, 37*b*) and are part of torus linear flow subsystems (20*a*, 30*b*), not shown in FIG. 55. Not to limit alternative racetrack subsystems (601*a*, 601*b*), alternative configuration includes an oversized and extended turboplants (27*a*, 37*b*), not shown in FIG. 55.

In FIG. 55, there are two alternative designs for torus linear flow subsystems (20*a*, 30*b*) noncircular cross section (602). Noncircular cross sections (602) have cross sectional dimension that vary from constant circular cross section (21*a*, 31*b*) along torus linear flow subsystem (20*a*, 30*b*) between engine bulkhead beams (180*a*, 180*b*) and exit bulkhead beams (190*a*, 190*b*) subassemblies. Constant circular cross section (21*a*, 31*b*) along torus linear flow subsystem (20*a*, 30*b*) are shown in FIGS. 5 and 15. Noncircular cross sections (602) results from an oblate cross section (604), oblate pill cross section (614), prolate cross section (608), and prolate pill cross section (611). Oblate pill cross section (614) and prolate pill cross section (611) are shown in a plan view, FIGS. 56 and 58. FIG. 57 shows a noncircular cross section (602) of an oblate form, which is an elliptical cross section oriented about its shorter axis, relative to large torus radius (61). FIG. 59 shows a noncircular curve cross section of a prolate form, which is an elliptical cross section oriented about its longer axis, relative to large torus radius (61). These alternative designs result from independently and individually rotating oblate cross section (604), oblate pill cross section (614), prolate cross section (608), and prolate pill cross section (608) about the large torus radius (61), refer FIG. 6. The plane of rotation is constant at 90° about the large torus radius (61). Location of fluid flow opening (414) is provided for visualizing the noncircular cross section dimensions.

System performance is affected by size and shape of torus opening (22*a*, 32*b*) and nearly confined linear flow volume (441), refer FIG. 41. FIG. 60 shows an approach to variable area opening (610). An alternative embodiment has torus opening (22*a*, 32*b*) height varies along torus linear flow subsystems (20*a*, 30*b*) circumferential length on external convex surfaces. Linear flow structures (26*a*, 36*b*) is not shown in FIG. 60. Torus linear flow (20*a*, 30*b*) maximum variable opening height is perpendicular to initial torus tube flow (415), FIG. 60. In FIG. 61, linear flow structures (26*a*, 36*b*) follows linear flow opening variable area (624) and has linear flow cavity variable height (625) within nearly confined linear flow volume (441). Another linear flow structures (26*a*, 36*b*) embodiment is linear flow cavity constant height (623), FIG. 62 with constant height along torus opening (22*a*, 32*b*) length. Finally, alternate embodiment construction techniques use a mandrel to form or fabrication linear flow structures (26*a*, 36*b*) from a single piece of material, such as metal or plastic, instead of building from two linear flow subassemblies.

Figure 63:
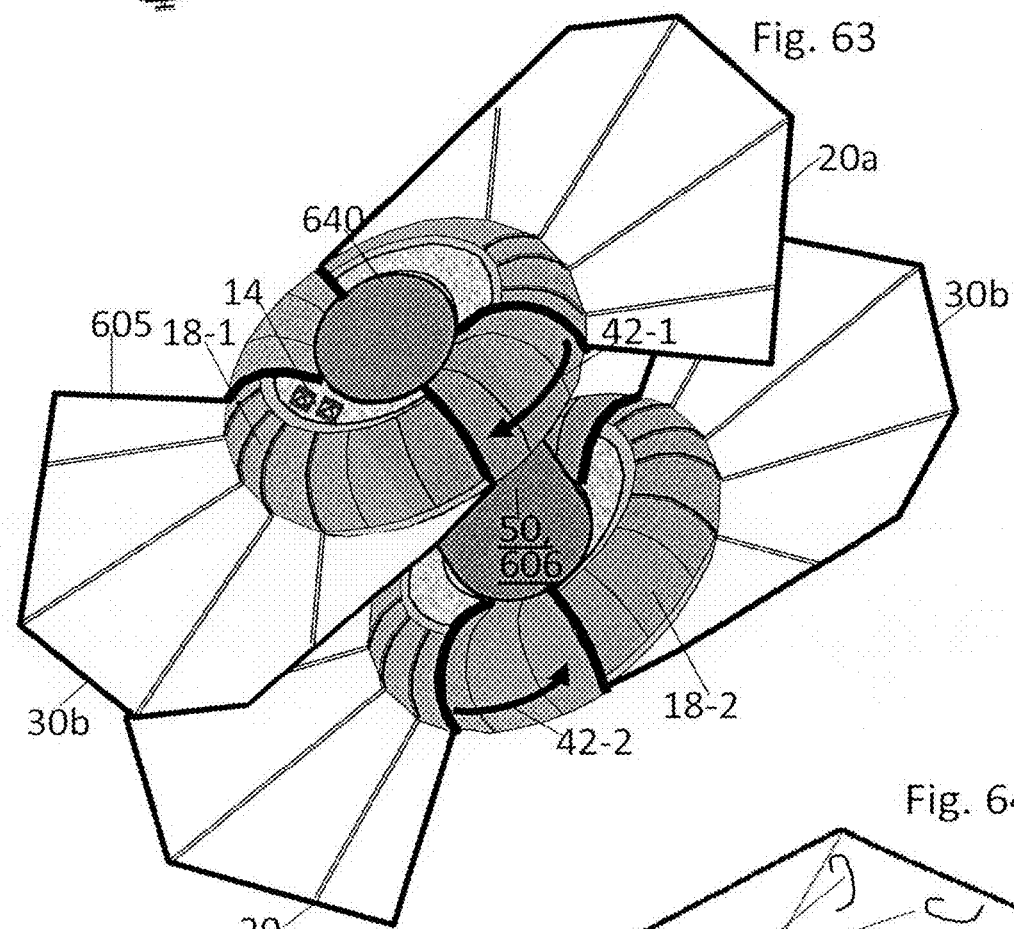

Alternative embodiment for double stacked tori system (605) configuration is illustrated in FIG. 63. Double stacked tori system (605) is shown without turboplants (27*a*, 37*b*) for applications in atmospheric air (41). This alternate system embodiment includes two nearly identical lifting systems (18-1, 18-2) attached to load bearing central cylinder (606). Central cylinder (606) can be the carrier subsystem (50). Central cylinder (606) size is determined by torus linear flow subsystems (20*a*, 30*b*) center diameter and double stacked tori (605) height. Each lifting system (18-1, 18-2) operates independently and provides oppositely directed working fluid velocities (42-1, 42-2). Lifting system (18-1) orientation is offset 90° to second lifting system (18-2) relative to major mass moment of inertia, not shown in FIG. 63. An operator can control attitude (pitch, roll, and yaw) by throttle control (14) of double stacked tori system (605) configuration with independent lifting systems (18-1, 18-2). An additional alternative design has working fluid reservoir (640) tank, and reservoir flow regulator (639), FIG. 49. Central cylinder (606) size is determined by working fluid reservoir (640) tank.

Figure 64:
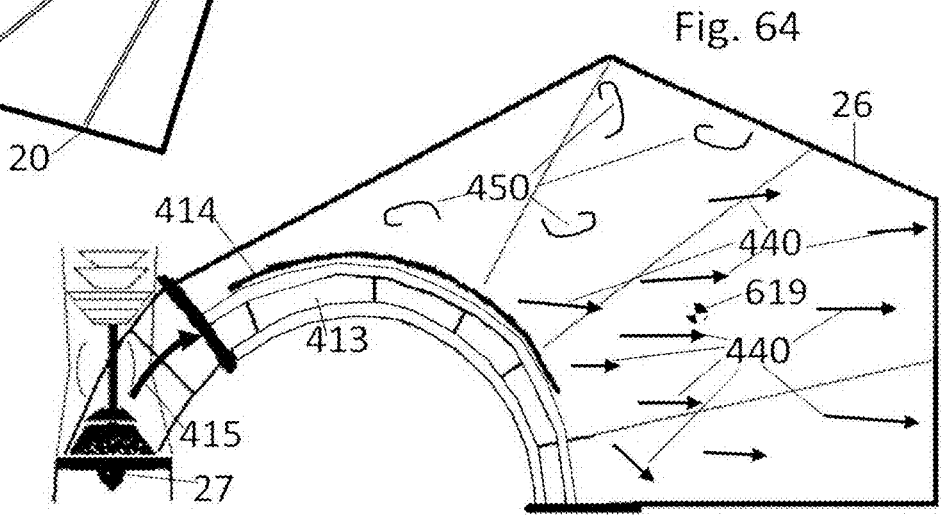

FIG. 64 is similar to FIG. 41, except for the linear flow structure (26) size. By changing linear flow structure (26) size and shape, the linear flow structure (26) center of gravity is realigned to near center of uniform flow field (440). This alternative embodiment identifies linear flow center of gravity (619). Torus linear flow subsystem performance is improved by relocating linear flow center of gravity (619), reduction in turbulent linear field (450) and increases in uniform flow field (440) velocity. This alternative design change also improves performance of the lifting system (18).

Figure 65:
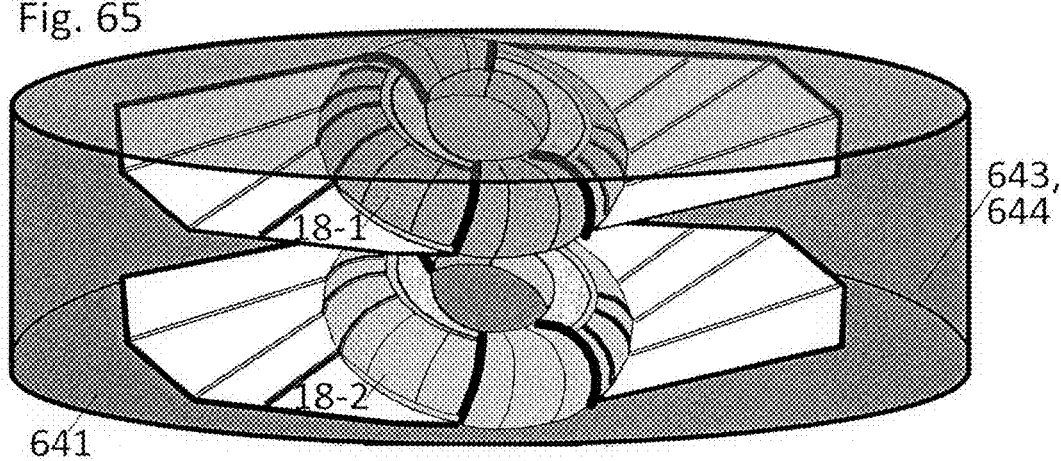

FIG. 65 alternative embodiment involves the placement of one or more nearly identical lifting systems (18-1, 18-2) completely within a cylindrical enclosure reservoir (641) represented as a confined volume. Lifting systems (18-1, 18-2) use electric motor compressor assemblies (650a, 650b), not shown in FIG. 65. Cylindrical enclosure reservoir (641) is hermetically sealed, such that working fluid (40) can circulate within cylindrical enclosure reservoir (641). Cylindrical enclosure reservoir (641) is supplemented by working fluid reservoir (640). FIG. 65 does not show working fluid reservoir (640) tank. Gaseous working fluids (644) are accommodated in working fluid reservoir (640), to include but not limited to helium, neon, argon, xenon, and other noble gases. Noble gases by their atomic structure are stable, inert, resist chemical bonding, and are generally nonreactive. Gaseous working fluids (644) are contained in cylindrical enclosure reservoir (641). Cylindrical enclosure reservoir (641) replaces recirculation systems identified in FIGS. 46 and 52. Cylindrical enclosure reservoir (641) provides lifting system (18) structural support and external structural interfaces. As an alternative in FIG. 65, liquid working fluids (643) can circulate within cylindrical enclosure reservoir (641). Liquid working fluids (643) are contained in cylindrical enclosure reservoir (641). Liquid working fluids (643) include but not limited to water, liquefied cryogenic, freon, alcohol, and other liquids in soluble state.

Figure 66:
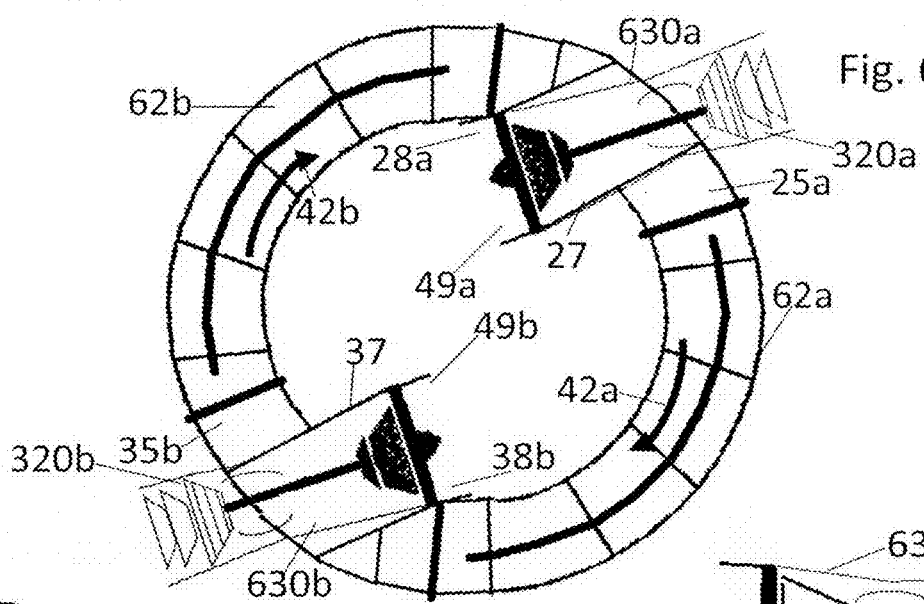

The alternative torus linear flow subsystems (20a, 30b) and turboplants (27a, 37b) configurations are shown in FIG. 66. Linear flow structures (26a, 36b) are not shown. FIG. 66 shows turboplants (27a, 37b) external turboplant mounting (630a, 630b) to torus flow subsystems (20a, 30b). Turbine subassemblies (320a, 320b) are mounted external to torus cavities (25a, 35b) similar to the first embodiment. At turboplant inlets (28a, 38b), turbofan suction (49a, 49b) ingests atmospheric air (41) into nearly confined torus linear flow subsystems (20a, 30b). Working fluid velocities (42a, 42b) are nearly confined within torus cavities (25a, 35b) of torus linear flow subsystems (20a, 30b).

Figure 67:
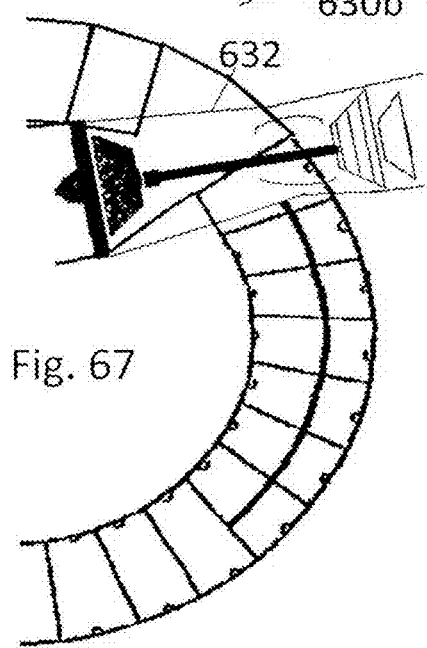
Figure 68:
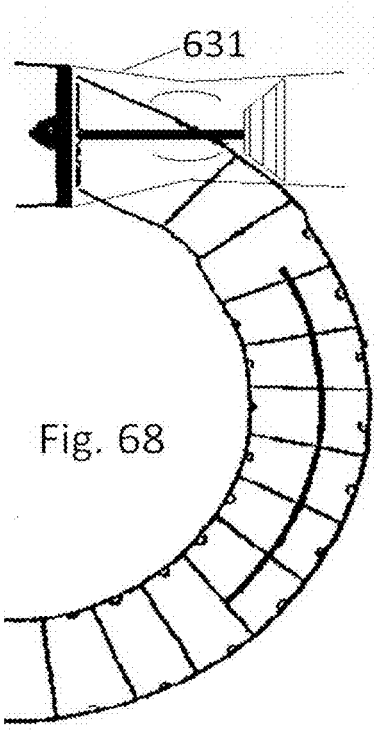

An alternative embodiment for two spool turboplant (632) is in FIG. 67. Turboplants (27a, 37b) configuration as a multi spool turboplant is the first embodiment. Two spool turboplant (632) in FIG. 67 contains two turbines and two compressor/fan subassemblies. Slightly different alternative embodiment is shown in FIG. 68 with one spool turboplant (631) assembly with a single turbine and one turbofan subassemblies.

CONCLUSION, RAMIFICATIONS and SCOPE

Accordingly, the reader can see at least one novel embodiment of lifting machines. Unique embodiments are identified for methods in generating resultant force from circulating working fluid. The patent application demonstrates more than one alternative embodiment of lifting system capability for transporting useful payloads.

This patent application identifies specific, unobvious features. The unobvious features are embodied in this patent application as new and unexpected results. These results are identified as discovery, which are being disclosed in this patent application. Each discovery has been observed, verified, and measured during model testing and experimental operations. In summary, the unobvious features include, but not limited to: 1) machine and method producing stable resultant force with throttle control and aligns with lifting system, 2) uniform fluid flow field exists inside the linear flow cavity with fixed position, 3) poloidal flow field has nearly identical total fluid pressure value as the turboplant assembly pressure rise representing maximum rotational energy with fixed in position, 4) existence of poinsot flow field that satisfies conservation of angular momentum with fixed position, and 5) toroidal flow field achieves dynamic equilibrium and stability resulting from the transfer of maximum rotational energy to minimum rotational energy state, as discussed in OPERATION section. Finally, the working fluid operates at nearly isothermal conditions, which provides the machine with significant energy efficiency and performance.

The detailed descriptions of different and alternative embodiments should not be construed as limitations on scope, but examples of many ramifications and design embodiments. Different applications include, but not limited to, orbit transfer vehicles, medical evacuation, civil police, fire, search, and rescue. This patent application scope is determined by embodiments illustrated, described, and suggested; and by appended CLAIMS with their legal equivalents.

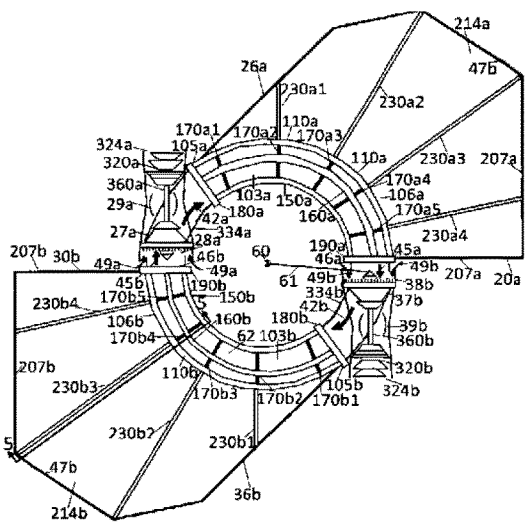

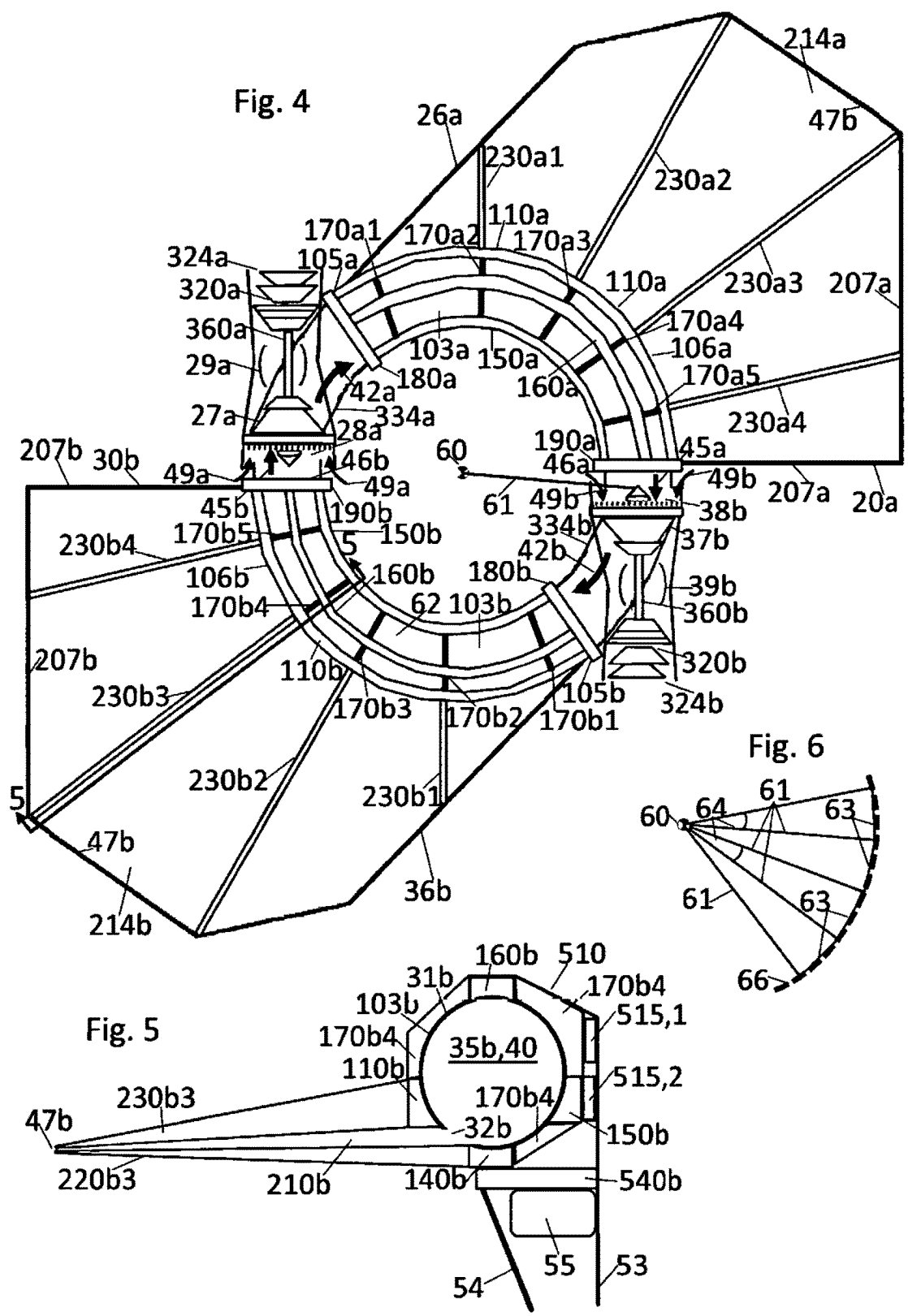

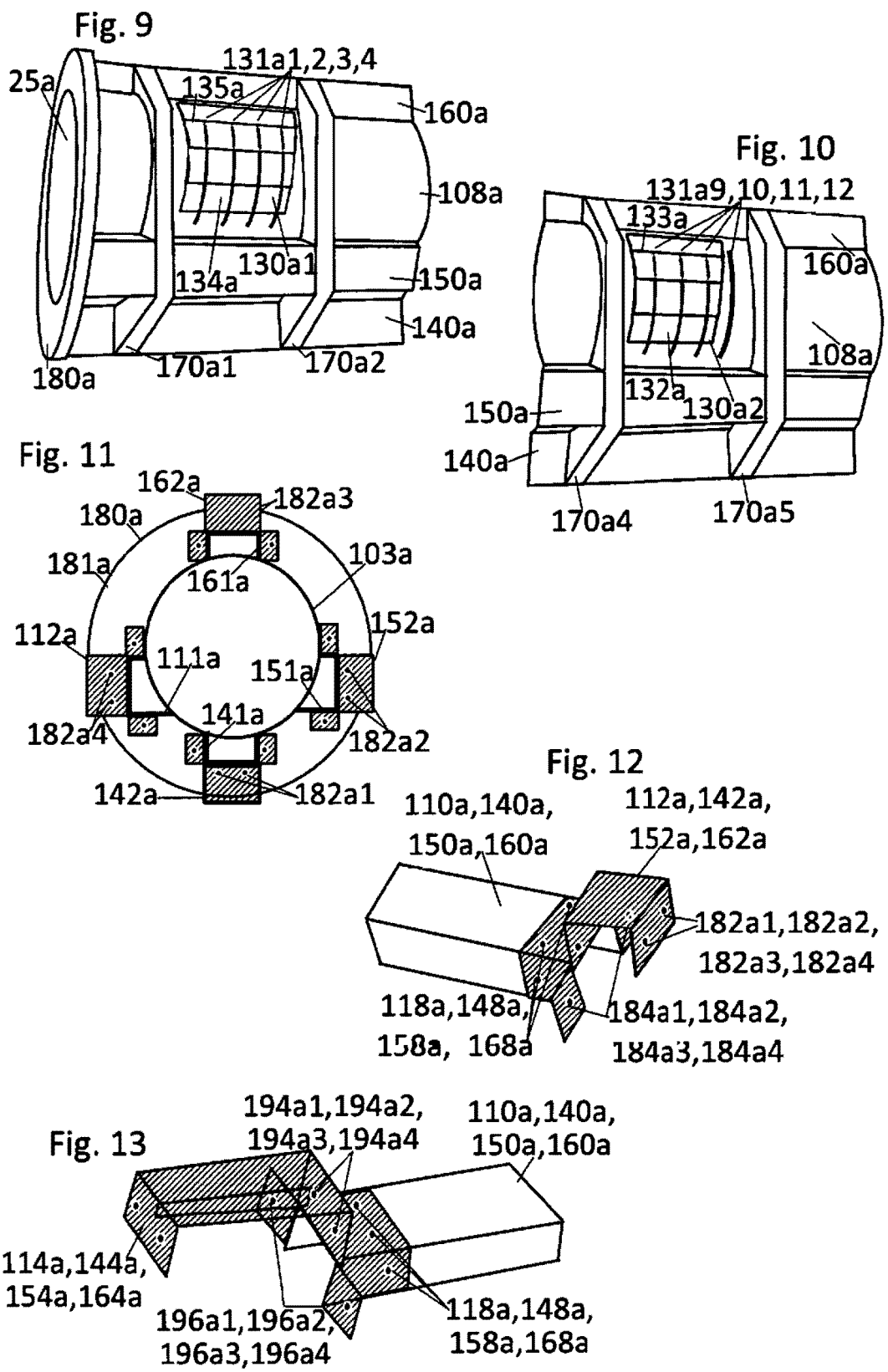

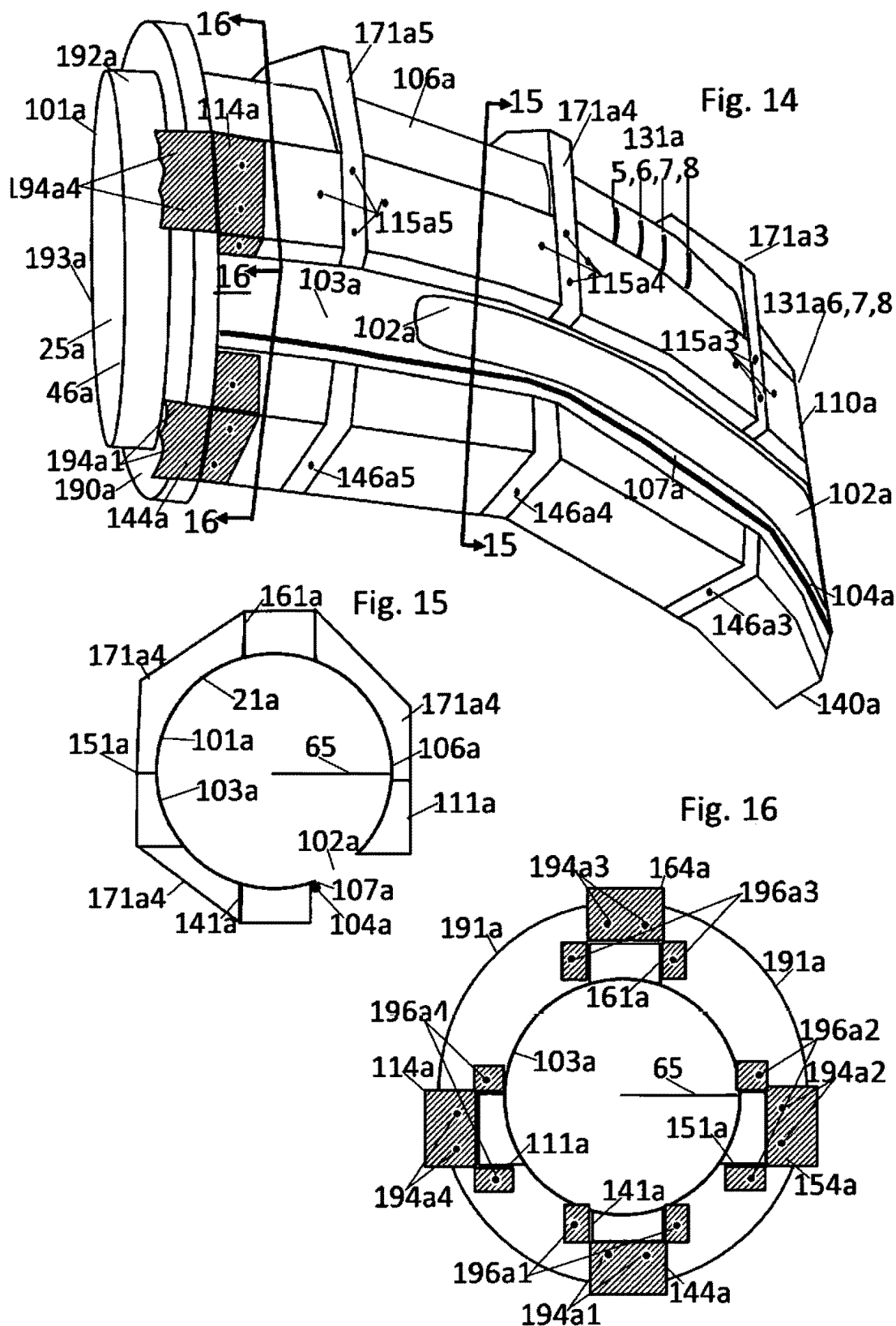

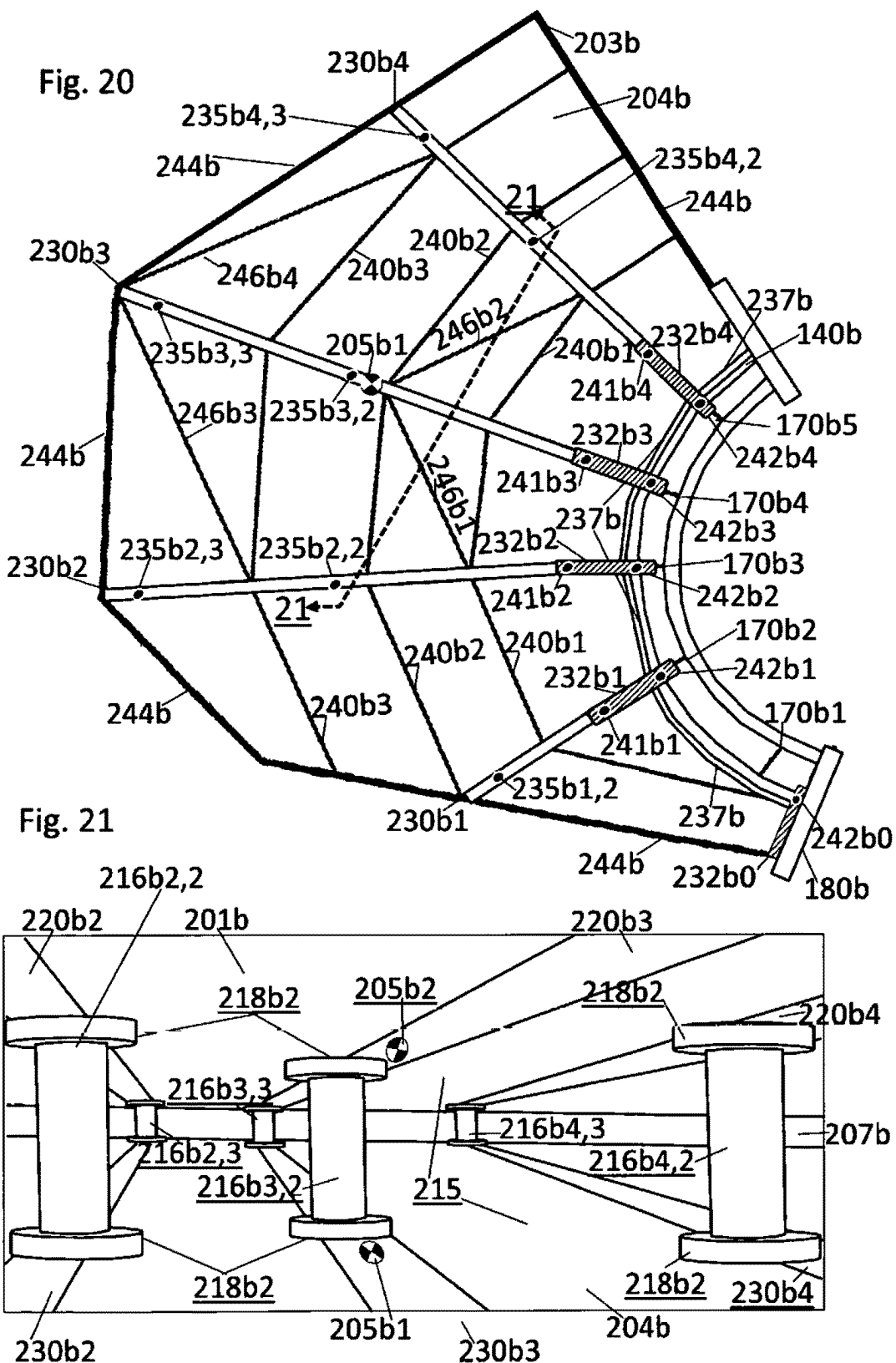

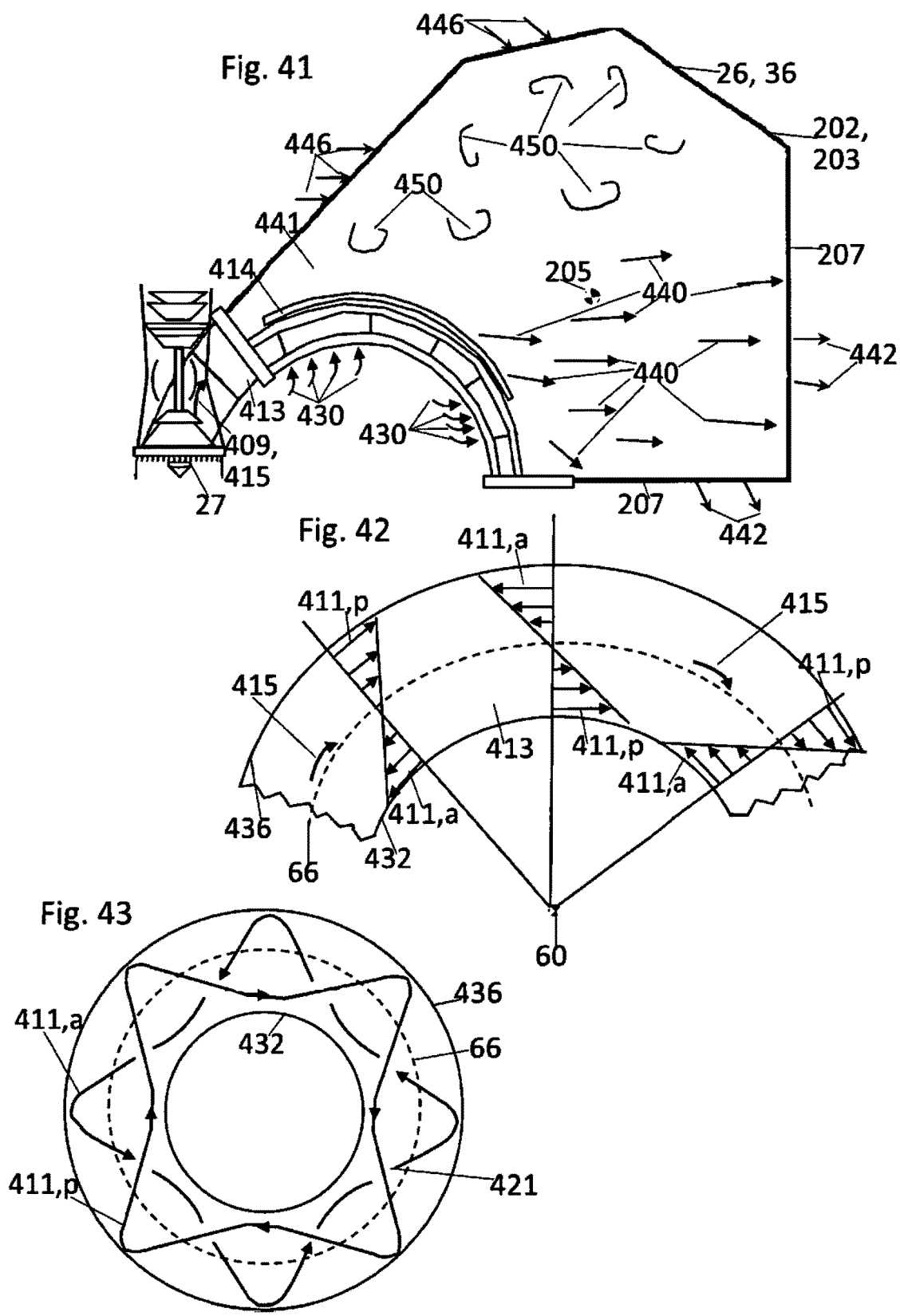

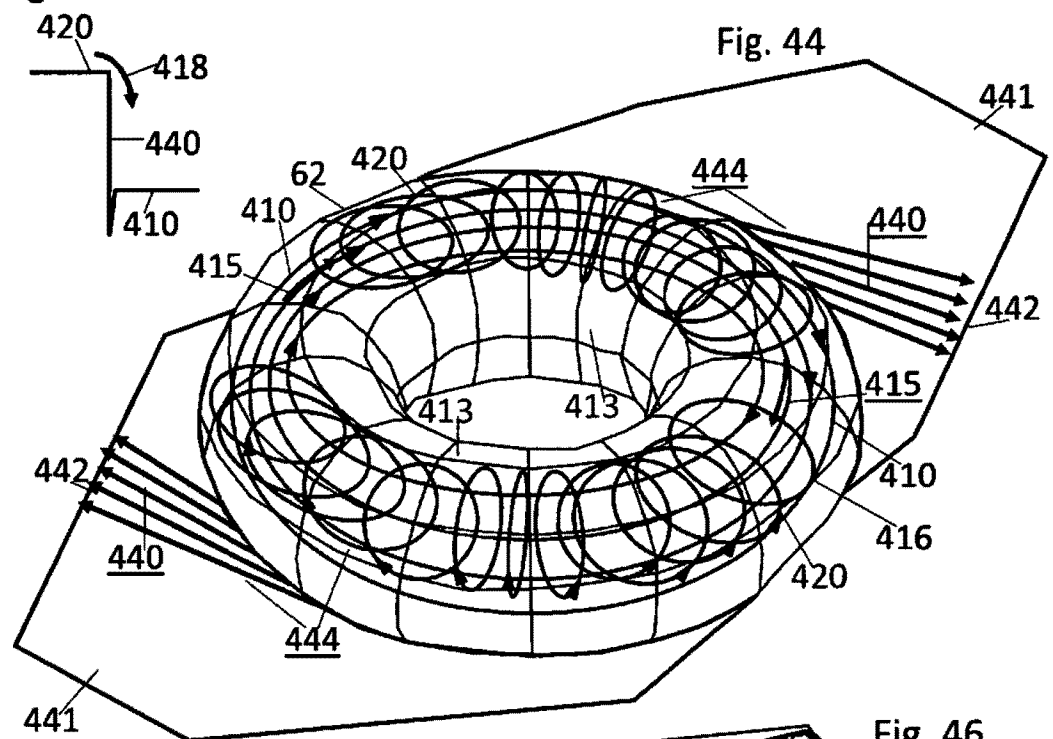
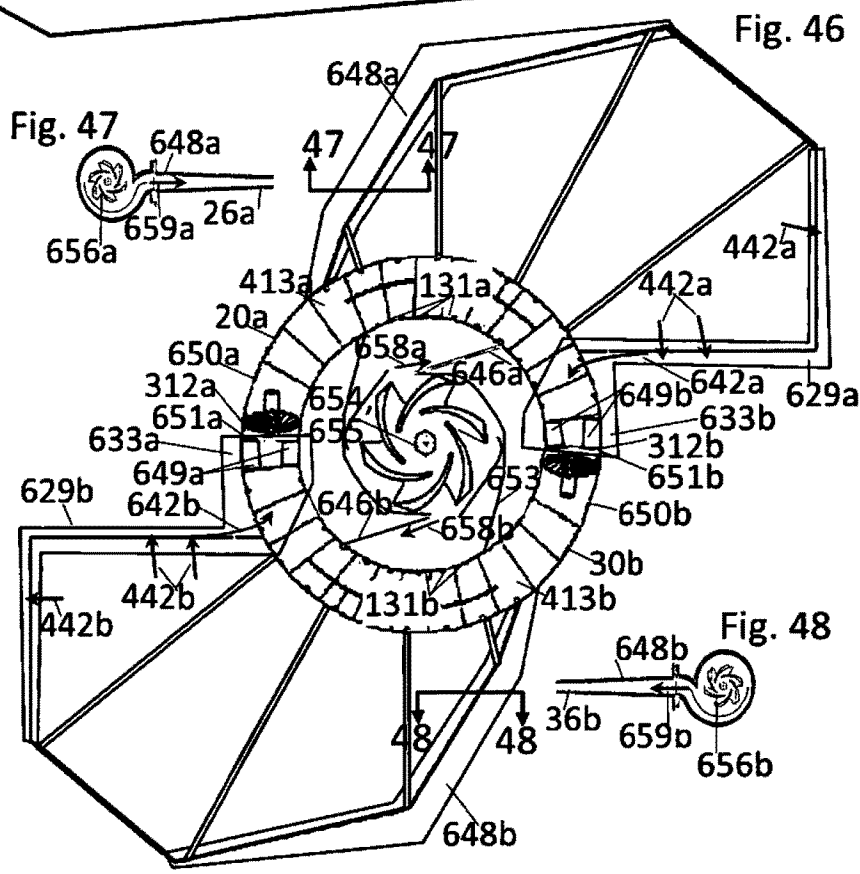

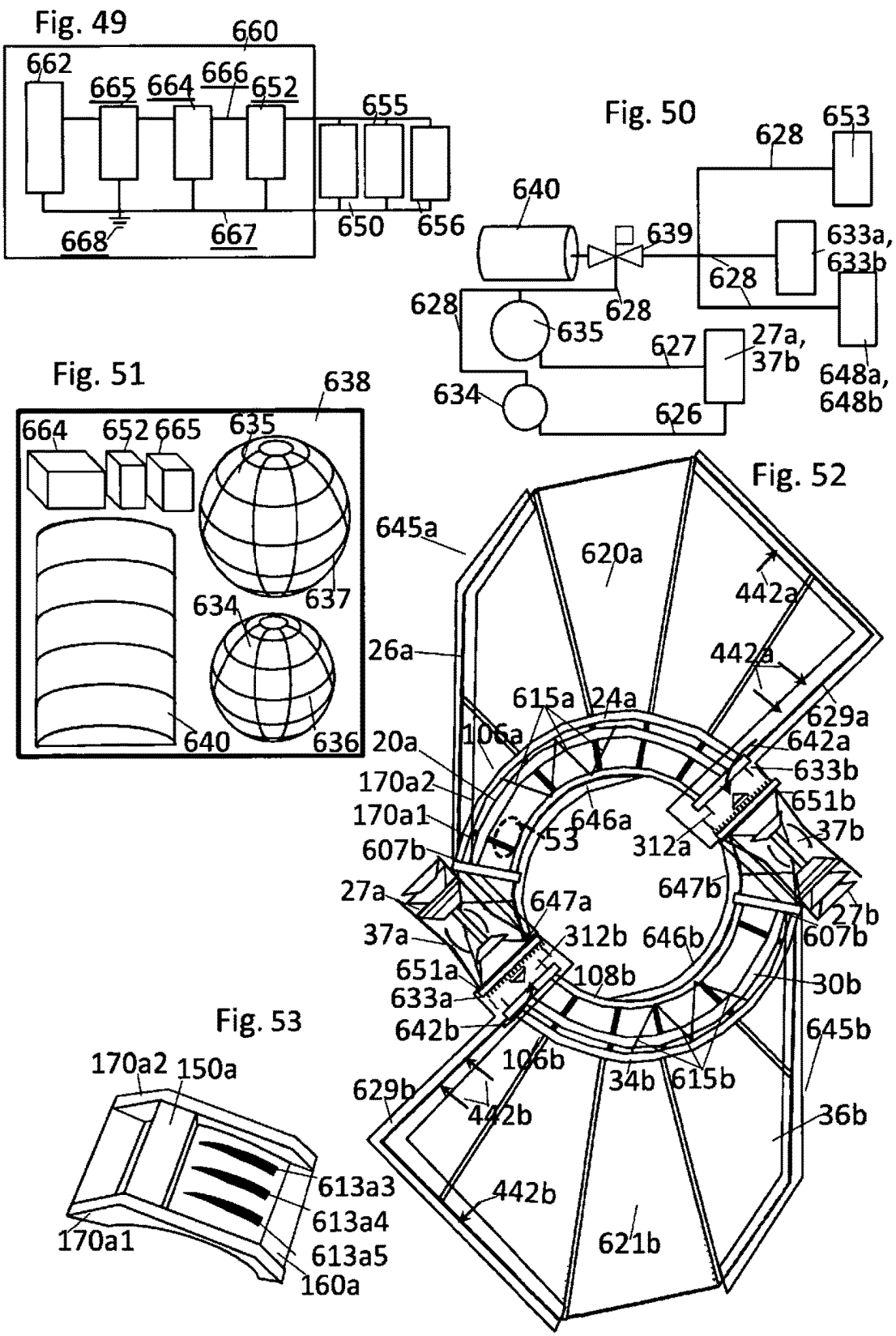

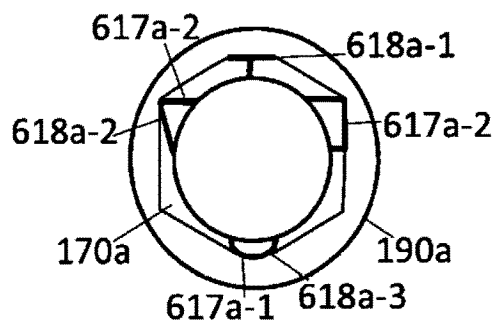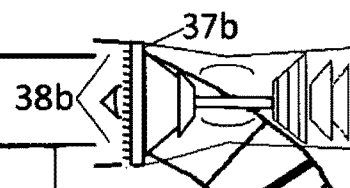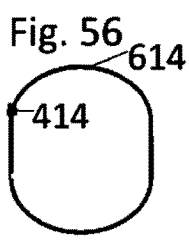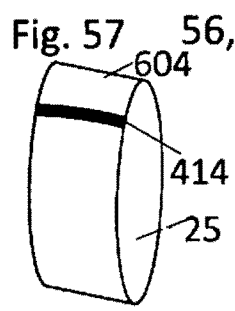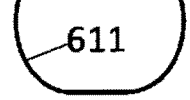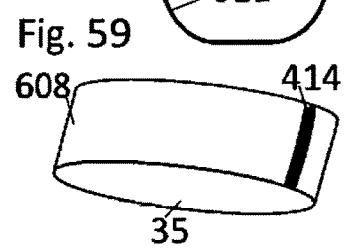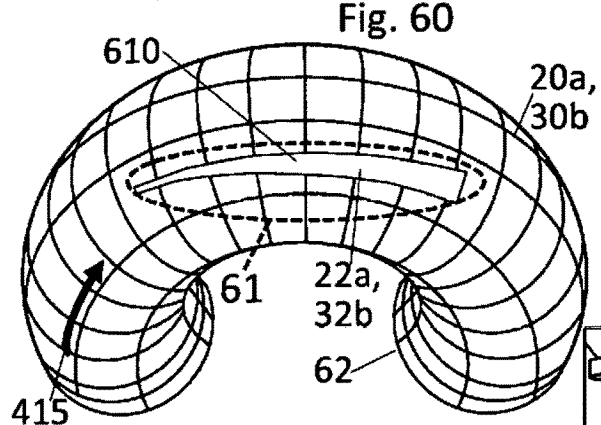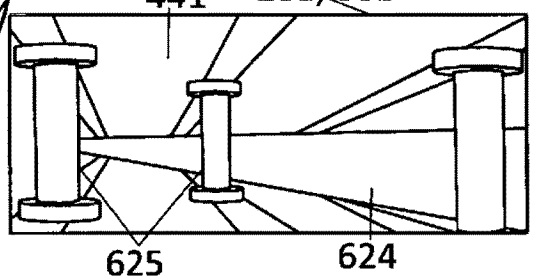

The invention claimed is:
1. A machine for lifting payloads, comprising:
  a. an aero cover, and a carrier subsystem located below the aero cover such that the carrier subsystem is capable of holding a payload;
  b. a turboplant confined volume having a torus cavity for containing an atmospheric air pressure rise of a working fluid inside the torus cavity, wherein the turboplant confined volume is operatively connected to the aero cover, the carrier subsystem, and a plurality of torus linear flow subsystems, wherein the plurality of torus linear flow subsystems extend away from the turboplant confined volume;
  c. a turboplant assembly located within the turboplant confined volume, wherein the turboplant assembly includes a combustor for combusting a fuel resource and wherein the turboplant assembly further includes an auxiliary panel located adjacent to the aero cover such that the auxiliary panel includes a throttle control of the turboplant assembly; and
  d. whereby the machine creates a resultant force from the plurality of the torus linear flow subsystems such that the machine is able to lift the payload.

2. The machine of claim 1, wherein the carrier subsystem is located in a geometric center of the machine and the carrier subsystem is further comprised of:
- a carrier shell having a flywheel compensator mounted on the carrier shell;
- a cargo stowage located adjacent to the carrier shell; and
- a carrier baseplate located on one end of the carrier shell for enclosing the carrier shell.

3. The machine of claim 1, wherein the machine ingests atmospheric air at a turboplant inlet;
- wherein the turboplant inlet is used for ingesting a ram fluid flow into a compressor cavity in the turboplant assembly from a torus cavity exit located adjacent to the turboplant assembly;
- the machine includes a compressor shell located around the turboplant confined volume, wherein the compressor shell is part of a geometric torus;
- wherein the turboplant assembly further includes a compressor subassembly, a turbine subassembly, a turbofan tube subassembly, a fuel tank subassembly, a stator subassembly, and a thermal pressure seal subassembly;
- wherein the fuel tank subassembly and the turbine subassembly include reservoir tanks for separating the fuel resource from the working fluid;
- the machine includes a turboplant starter operatively connected to the turboplant assembly;
- the machine includes the thermal pressure seal subassembly for assisting in containing the atmospheric air pressure rise of the working fluid inside the torus cavity;
- wherein the compressor subassembly is operatively connected to the turbine subassembly through the turbofan tube subassembly in order to position a multi spool drive shaft partially within a turbine bypass cavity and partially within the compressor cavity;
- a plurality of recirculation ducts and a plurality of pressure joints for providing the working fluid with a uniform flow exit into the turbofan tube subassembly using a plurality of linear flow exit ducts;
- the machine includes a thermal shield located at one end of the compressor cavity; and
the machine includes a plurality of bypass compressor manifolds, wherein the bypass compressor manifolds and the compressor subassembly direct the working fluid to a plurality of linear flow suction ducts and a torus tube aspiration duct.

4. The machine of claim 1, wherein the torus linear flow subsystems provide for structural load carrying of the turboplant assembly and a linear flow assembly;
- wherein a torus tube assembly includes the torus shell, a linear beam subassembly, a flow tube beam subassembly, a concave beam subassembly, a keel beam subassembly, a shell beam subassembly, an engine bulkhead beam subassembly, and an exit bulkhead beam subassembly;
- wherein the linear beam subassembly, the flow tube beam subassembly, the concave beam subassembly, the keel beam subassembly, the shell beam subassembly, the engine bulkhead beam subassembly, and the exit bulkhead beam subassemblies are externally mounted to the torus shell such that a confined toroid volume includes a torus cavity surface;
- an exit tube having a torus cavity exit area, wherein the torus cavity exit area represents half of a turbofan inlet area;
- wherein the torus shell comprises part of a geometric torus with a constant circular cross section; and
- wherein the torus tube assembly includes a torus tube opening, wherein the torus tube opening comprises a constant height on the torus tube assembly; and
- a torus aspiration subassembly.

5. The machine of claim 1, wherein the torus linear flow subsystems comprise a linear flow structure having a structural support along a torus convex surface of a torus tube assembly;
- wherein a linear flow assembly includes a cantilever subassembly and a flow tube subassembly;
- wherein the linear flow assembly includes a plurality of linear cantilever beams and a plurality of flow tube cantilever beams, which are aligned, wherein the cantilever beams attach externally to the linear flow assembly, wherein the linear flow assembly includes an internal surface; and
- wherein a linear flow opening includes a varying height along the linear flow opening length; and
- wherein a height of a linear flow cavity decreases from the linear flow opening to a uniform flow exit through the use of a plurality of internal spacers.

6. The machine of claim 1, further comprising a plurality of racetrack subsystems;
- wherein the racetrack subsystems include the torus linear flow subsystems, wherein the torus linear flow subsystems assist in containing the atmospheric air pressure rise of the working fluid contained inside the torus cavity with a constant circular cross section; and
- wherein the racetrack subsystems of the turboplant include a larger angular displacement than the geometric torus.

7. The machine of claim 1, wherein the machine includes;
- a double stacked tori system, wherein the double stacked tori system produces a counter rotation of the working fluid contained within the plurality of the torus linear flow subsystems;
- wherein the double stacked tori system includes a counter rotation of the working fluid contained within the torus linear flow subsystems;
- wherein the double stacked tori system contains the working fluid pressure rise inside the plurality of torus linear flow subsystems;
- wherein the double stacked tori system is operatively connected to a carrier shell;
- wherein the double stacked tori system includes a central cylinder for connecting the double stacked tori system, wherein the working fluid reservoir is attached to a reservoir flow regulator; and
- wherein the double stacked tori system includes a cylindrical enclosure reservoir for supplying the working fluid to the double stacked tori system.

8. The machine of claim 1, wherein the turboplant assembly includes a turbofan inlet that is located adjacent to a torus concave surface of the torus linear flow subsystem;
- wherein the turboplant assembly is mounted onto the torus concave surface of the torus linear flow subsystem; and
- wherein the turboplant assembly includes a compressor subassembly mounted inside the torus cavity, wherein the turboplant assembly ingests atmospheric air into a compressor cavity adjacent to the torus concave surface.

9. The machine of claim 1, further comprising a torus aspiration subassembly for transferring atmospheric air through the turboplant confined volume and into the torus cavity using a plurality of constant width aspiration sites;

wherein the torus aspiration subassembly further includes more than one torus aspiration subassembly on a torus concave surface;

wherein the torus aspiration subassembly further includes more than one torus aspiration subassembly on a torus convex surface;

wherein the torus aspiration subassembly further includes a mechanical actuator for altering the aspiration sites, wherein the mechanical actuator changes the amount of atmospheric air into the torus cavity through the plurality of aspiration sites; and wherein the aspiration sites transfer the working fluid through a torus tube aspiration duct, wherein the torus aspiration subassembly further includes a volute pump flow with a recirculation volute motor, a recirculation volute housing, and a recirculation volute pump.

10. The machine in claim 1, wherein the turboplant assembly further comprises a one spool turboplant and a spool shaft hole for containing the atmospheric air pressure rise of a working fluid inside the torus cavity;

wherein the one spool turboplant is positioned partially within a turbine bypass cavity;

wherein the one spool turboplant is positioned partially within the compressor cavity in order to connect a turbine subassembly and a compressor subassembly via a thermal pressure seal subassembly through the turboplant confined volume; and wherein the one spool turboplant includes a thermal shield.

11. The machine of claim 1, wherein the turboplant assembly further comprises a two spool turboplant and a spool shaft hole for containing an atmospheric air pressure rise of a working fluid inside the torus cavity;

wherein the two spool turboplant is positioned partially within a turbine bypass cavity;

wherein the two spool turboplant is positioned partially within a compressor cavity in order to connect a turbine subassembly and a compressor subassembly via a thermal pressure seal subassembly through the turboplant confined volume; and wherein the two spool turboplant includes a thermal shield.

12. The machine in claim 1, wherein the machine comprises; an electric motor compressor assembly;

wherein the electric motor compressor assembly further electronic motor controller having an electric power source for throttling of the electric motor compressor assembly;

wherein the electric motor compressor assembly recirculation duct for transferring the working fluid into the electric motor compressor assembly;

wherein the recirculation duct includes pressure joints;

wherein a recirculation volute motor and a recirculation volute pump are mounted to the torus linear flow subsystem;

wherein the electric motor compressor assembly includes a torus tube aspiration duct, wherein the recirculation volute motor and the recirculation volute pump force the working fluid into the torus cavity; and wherein the electric motor compressor assembly includes a linear flow motor pump for providing a secondary linear flow.

13. The machine in claim 1, wherein the torus tube assembly is further comprised of:

an oblate cross section such that the oblate cross section provides the atmospheric pressure rise of the working fluid contained inside the torus cavity;

a prolate cross section such that the prolate cross section provides the atmospheric pressure rise of the working fluid contained inside the torus cavity;

an oblate pill cross section such that the oblate pill cross section provides the atmospheric pressure rise of the working fluid contained inside the torus cavity; and a prolate pill cross section such that the prolate pill cross section provides the atmospheric pressure rise of the working fluid contained inside the torus cavity.

14. A method for generating a resultant force from a confined toroid volume, comprised of the steps of:

a. forcing an atmospheric air from outside a confined toroid volume into a turboplant confined volume;

b. creating a poloidal flow field inside the confined toroid volume;

c. generating a resultant force directly from an applied force area within the confined toroid volume;

d. creating a toroidal flow field within the confined toroid volume;

e. generating a working fluid velocity inside the confined toroid volume such that the poloidal flow field is embedded within the toroidal flow field;

f. generating the working fluid velocity inside the confined toroid volume, thereby resulting in a subsonic working fluid within the poloidal flow field and the toroidal flow field;

g. ingesting a ram flow at a torus cavity exit from a flow tube working fluid within the confined toroid volume; and h. providing a fluid flow opening of a constant height about an internal concave flow surface of the confined toroid volume.

15. The method in claim 14, wherein the method further includes the steps of:

providing a torus tube flow with an angular rate sufficient for the poloidal flow field to create a low-pressure cell within the confined toroid volume, wherein a fluid pressure distribution from the low-pressure cell creates an effective pressure area;

providing the poloidal flow field with the fluid pressure distribution from a fluid energy flow, wherein the fluid pressure distribution from the poloidal flow field exerts a local normal pressure providing for a multitude of normal pressure forces;

further providing the low pressure cell with the fluid pressure distribution resulting from a total fluid pressure;

providing a poloidal flow field fixed position within the confined toroid volume;

locating the torus tube flow at a toroidal flow field centerline; and providing the toroidal flow field with the fluid pressure distribution from the fluid energy flow, wherein the fluid pressure distribution from the toroidal flow field exerts the local normal pressure;

providing for the fluid energy flow in transferring between the poloidal flow field and the toroidal flow field;

whereby the resultant force represents the fluid pressure distribution multiplied by the effective pressure area.

16. The method in claim 14, wherein the method is further comprised of the steps of:

providing the toroidal flow field such that air aspiration flows enter along an internal concave flow surface of the confined toroid volume;

altering a fluid pressure distribution inside the confined toroid volume;

providing the toroidal flow field such that the air aspiration flows enter along an internal convex flow surface of the confined toroid volume; and providing the air aspiration flows such that the air aspiration flows alter the fluid pressure distribution inside the confined toroid volume.

17. The method for generating said resultant force in claim 14, wherein the method is further comprised of the steps of:

creating a resultant turbulent linear flow field and a uniform flow field within the confined linear flow volume, wherein the uniform flow field is generally perpendicular to a torus tube flow;

providing the uniform flow field that reaches a maximum velocity value near a linear flow structure center of gravity;

aligning the uniform flow field with the linear flow structure center of gravity; and providing a uniform flow field fixed position within a confined linear flow volume.

18. The method in claim 14, wherein the method is further comprised of the step of:

providing a gaseous working fluid, selected from the group comprising of helium, neon, argon, xenon, and other noble gases, wherein the gaseous working fluid is confined within the confined toroid volume and within a confined linear flow volume.

19. The method in claim 14, wherein the method is further comprised of the steps of:

providing a liquid working fluid within the confined toroid volume and within a confined linear flow volume; and providing the liquid working fluid selected from the group comprising water, liquefied cryogenic fluid, freon, alcohol, and other liquids in soluble state.

* * * * *

UNITED STATES PATENT AND TRADEMARK OFFICE
CERTIFICATE OF CORRECTION

| | |
|---|---|
| PATENT NO. | : 10,604,255 B2 |
| APPLICATION NO. | : 15/613189 |
| DATED | : March 31, 2020 |
| INVENTOR(S) | : Dennis S. Lee |

Page 1 of 22

It is certified that error appears in the above-identified patent and that said Letters Patent is hereby corrected as shown below:

Delete title page and replace with the attached title page consisting of corrected illustrative figure.
Delete Drawing Sheets 1-20 and replace with the attached Drawing Sheets 1-20.
Column 10, Line 1, change 'Detailed Description of First Embodiment' to --DETAILED DESCRIPTION OF FIRST EMBODIMENT--.
Column 13, Line 33, change 'Torus Tube Assembly' to --TORUS TUBE ASSEMBLY--.
Column 17, Line 40, change 'Linear Flow Assembly' to --LINEAR FLOW ASSEMBLY--.
Column 22, Line 62, change 'Turboplant Assembly' to --TURBOPLANT ASSEMBLY--.
Column 26, Line 24, change 'Subsonic Working Fluid' to --SUBSONIC WORKING FLUID--.
Column 29, Line 36, change 'Operation' to --OPERATION--.
Column 31, Line 48, change 'Alternative Embodiments' to --ALTERNATIVE EMBODIMENTS--.
Column 42, Line 6, change 'group comprising of helium, neon, argon, xenon, and' to --group comprising helium, neon, argon, xenon, and--.

Signed and Sealed this
Fourteenth Day of July, 2020

Andrei Iancu
*Director of the United States Patent and Trademark Office*

(12) United States Patent
Lee

(10) Patent No.: US 10,604,255 B2
(45) Date of Patent: Mar. 31, 2020

(54) LIFTING SYSTEM MACHINE WITH METHODS FOR CIRCULATING WORKING FLUID

(71) Applicant: Dennis S. Lee, Gaithersburg, MD (US)

(72) Inventor: Dennis S. Lee, Gaithersburg, MD (US)

(73) Assignee: Dennis S. Lee, Gaithersburg, MD (US)

( * ) Notice: Subject to any disclaimer, the term of this patent is extended or adjusted under 35 U.S.C. 154(b) by 267 days.

(21) Appl. No.: 15/613,189

(22) Filed: Jun. 3, 2017

(65) Prior Publication Data

US 2018/0347508 A1    Dec. 6, 2018

(51) Int. Cl.
| | |
|---|---|
| *B64C 39/06* | (2006.01) |
| *B64D 27/16* | (2006.01) |
| *F02K 3/12* | (2006.01) |
| *F02C 6/08* | (2006.01) |
| *F02K 99/00* | (2009.01) |
| *F02C 9/18* | (2006.01) |
| *F01D 15/02* | (2006.01) |

(52) U.S. Cl.
CPC ........... *B64C 39/064* (2013.01); *B64D 27/16* (2013.01); *F01D 15/02* (2013.01); *F02C 6/08* (2013.01); *F02C 9/18* (2013.01); *F02K 3/12* (2013.01); *F02K 99/00* (2013.01); *F05D 2220/90* (2013.01)

(58) Field of Classification Search
CPC ....... B64C 39/00; B64C 39/001; B64C 39/06; B64C 39/062; B64C 39/064
See application file for complete search history.

(56) References Cited

U.S. PATENT DOCUMENTS

| | | | | |
|---|---|---|---|---|
| 3,051,415 A | * | 8/1962 | Meadows | ............ B64C 39/001 244/23 C |
| 3,051,417 A | * | 8/1962 | Meadows | ............ B64C 39/001 244/23 C |
| 3,752,419 A | * | 8/1973 | Richter | ............ B64C 39/001 244/23 C |
| 4,197,869 A | | 4/1980 | Moncrieff-Yeates | |
| 4,519,562 A | * | 5/1985 | Willis | ............ B64C 29/00 244/12.2 |
| 5,111,757 A | | 5/1992 | Reindl et al. | |
| 5,666,012 A | | 9/1997 | Gongwer | |
| 6,351,937 B1 | | 3/2002 | Matsuda et al. | |
| 6,412,232 B1 | | 7/2002 | Provitola | |
| 6,464,459 B2 | | 10/2002 | Illingworth | |

(Continued)

OTHER PUBLICATIONS

John D. Anderson, Fundamentals of Aerodynamics, Fifth Edition, McGraw-Hill, Inc., 2010, Chapters 2, 3, 7, 10 and 15.

(Continued)

*Primary Examiner* — Joseph W Sanderson
(74) *Attorney, Agent, or Firm* — James R. McDaniel

(57) ABSTRACT

An apparatus configured with two subsystems comprising a torus tube, linear flow, and turboplant assemblies that form of cavity for externally supplied and rotating subsonic working fluid. The working fluid rotation is provided by turboplant assemblies with throttle control. The rotating working fluid inside the cavities will conserve angular momentum. As a result of the conservation of angular momentum, poinsot flow fields are seen within the working fluid. A stable, resultant force is generated from the pressure and area forces inside the cavity. The apparatus usage is either with manual operation or as an unmanned, autonomous vehicle.

19 Claims, 20 Drawing Sheets